(12) United States Patent
Sinur et al.

(10) Patent No.: US 12,405,018 B2
(45) Date of Patent: Sep. 2, 2025

(54) SYSTEM AND METHOD FOR CONTROLLING INDOOR AIR QUALITY

(71) Applicant: Broan-NuTone LLC, Hartford, WI (US)

(72) Inventors: Richard R. Sinur, Hartford, WI (US); Kyle Anderson, Hartford, WI (US); Jeremy Yingst, Hartford, WI (US); Eric Theriault, Hartford, WI (US); Loic Ares, Hartford, WI (US); Jason Asmus, Hartford, WI (US); Seddik Rougab, Hartford, WI (US)

(73) Assignee: Broan-NuTone LLC, Hartford, WI (US)

(*) Notice: Subject to any disclaimer, the term of this patent is extended or adjusted under 35 U.S.C. 154(b) by 821 days.

(21) Appl. No.: 17/417,471

(22) PCT Filed: Jan. 7, 2020

(86) PCT No.: PCT/US2020/012487
§ 371 (c)(1),
(2) Date: Jun. 23, 2021

(87) PCT Pub. No.: WO2020/146315
PCT Pub. Date: Jul. 16, 2020

(65) Prior Publication Data
US 2022/0154954 A1    May 19, 2022

Related U.S. Application Data

(60) Provisional application No. 62/789,501, filed on Jan. 7, 2019.

(51) Int. Cl.
*F24F 11/00* (2018.01)
*F24F 11/30* (2018.01)
(Continued)

(52) U.S. Cl.
CPC .......... *F24F 11/0001* (2013.01); *F24F 11/30* (2018.01); *F24F 11/65* (2018.01);
(Continued)

(58) Field of Classification Search
None
See application file for complete search history.

(56) References Cited

U.S. PATENT DOCUMENTS

| 6,726,111 B2 | 4/2004 | Weimer et al. |
| 7,044,397 B2 | 5/2006 | Bartlett et al. |

(Continued)

FOREIGN PATENT DOCUMENTS

| CA | 2297682 | 8/2001 |
| CA | 2600529 | 9/2007 |

(Continued)

OTHER PUBLICATIONS

English Translation of portions of Office Action for Chinese Patent Application No. 201980077675.7, mailed Jun. 10, 2023 (6 pages).

(Continued)

*Primary Examiner* — Tuan S Nguyen
(74) *Attorney, Agent, or Firm* — Barnes & Thornburg LLP

(57) ABSTRACT

A system and method for obtaining environmental data—namely air quality information—from various devices contained within a structure is disclosed herein. The various devices contain sensors that can obtain environmental data, which is then analyzed by the system to determine if any level of a component within the data is outside of a predefined threshold range. If the system determines that the level of the component is outside of the predefined threshold range for that given component, the system will carry out certain steps in order to bring the level within the predetermined threshold range. These steps include selecting the (Continued)

appropriate appliance and the proper operating conditions to most efficiently bring the level back within the predetermined threshold range. Once the system has determined that the level is back within the predetermined threshold range, the system will instruct the selected appliance to turn OFF.

30 Claims, 61 Drawing Sheets

(51) Int. Cl.
  *F24F 11/65* (2018.01)
  *F24C 15/20* (2006.01)
  *F24F 7/06* (2006.01)
  *F24F 11/56* (2018.01)
  *F24F 11/58* (2018.01)
  *F24F 110/65* (2018.01)
  *F24F 110/70* (2018.01)
  *F24F 110/72* (2018.01)

(52) U.S. Cl.
  CPC .............. *F24C 15/2021* (2013.01); *F24F 7/06* (2013.01); *F24F 11/56* (2018.01); *F24F 11/58* (2018.01); *F24F 2110/65* (2018.01); *F24F 2110/70* (2018.01); *F24F 2110/72* (2018.01)

(56) References Cited

U.S. PATENT DOCUMENTS

| | | | |
|---|---|---|---|
| 7,475,828 | B2 | 1/2009 | Bartlett et al. |
| 7,632,178 | B2 | 12/2009 | Meneely, Jr. |
| 7,979,163 | B2 | 7/2011 | Terlson et al. |
| 8,100,746 | B2 | 1/2012 | Heidel et al. |
| 8,147,302 | B2 | 4/2012 | Desrochers et al. |
| 8,755,942 | B2 | 6/2014 | Bonilla et al. |
| 9,109,981 | B2 | 8/2015 | Sharp |
| 9,347,678 | B2 | 5/2016 | Stakutis et al. |
| 9,494,324 | B2 | 11/2016 | Livchak et al. |
| 9,618,222 | B1 | 4/2017 | Hussain et al. |
| 9,618,224 | B2 | 4/2017 | Emmons et al. |
| 9,618,948 | B2 | 4/2017 | Yamaguchi et al. |
| 9,677,772 | B2 | 6/2017 | Siegel et al. |
| 9,924,243 | B2 | 3/2018 | Lupien et al. |
| 9,946,670 | B2 | 4/2018 | Klein et al. |
| 10,082,299 | B2 | 9/2018 | Livchak et al. |
| 10,085,585 | B2 | 10/2018 | Siegel et al. |
| 10,126,009 | B2 | 11/2018 | Flaherty et al. |
| 10,234,158 | B2 | 3/2019 | Laughman et al. |
| 10,242,129 | B2 | 3/2019 | Flaherty et al. |
| 10,281,896 | B1 | 5/2019 | Goodman et al. |
| 10,305,323 | B2 | 5/2019 | Wester et al. |
| 10,309,668 | B2 | 6/2019 | Song et al. |
| 10,347,112 | B2 | 7/2019 | Myllymäki |
| 10,458,668 | B2 | 10/2019 | Emmons et al. |
| 10,462,184 | B1* | 10/2019 | Gu ........................... H04W 4/33 |
| 10,490,055 | B2 | 11/2019 | Myllymaki |
| 10,514,177 | B2 | 12/2019 | Hussain et al. |
| 10,527,307 | B2 | 1/2020 | Saffre et al. |
| 10,529,215 | B2 | 1/2020 | Brown |
| 10,598,398 | B2 | 3/2020 | Wiley et al. |
| 10,655,884 | B2 | 5/2020 | Iura et al. |
| 10,712,038 | B2 | 7/2020 | Ribbich et al. |
| 10,837,665 | B2 | 11/2020 | Ajax et al. |
| 10,859,283 | B1 | 12/2020 | Goodman et al. |
| 10,867,254 | B2 | 12/2020 | Benazzouz et al. |
| 10,907,844 | B2 | 2/2021 | Ribbich et al. |
| 10,915,669 | B2 | 2/2021 | Flaherty et al. |
| 10,928,084 | B2 | 2/2021 | Ajax et al. |
| 11,009,248 | B2 | 5/2021 | Salem et al. |
| 2005/0260946 | A1 | 11/2005 | Kim |
| 2006/0278216 | A1 | 12/2006 | Gagas et al. |
| 2009/0057430 | A1 | 3/2009 | Cherewatti |
| 2013/0226849 | A1 | 8/2013 | Benazzouz et al. |
| 2015/0032264 | A1 | 1/2015 | Emmons |
| 2015/0096335 | A1 | 4/2015 | Haidak et al. |
| 2015/0096352 | A1* | 4/2015 | Peterson ............ H04M 1/72445 73/31.02 |
| 2015/0156031 | A1* | 6/2015 | Fadell ................... G08B 27/003 700/90 |
| 2015/0204558 | A1 | 7/2015 | Sartain |
| 2015/0369507 | A1 | 12/2015 | Flaherty et al. |
| 2016/0066068 | A1 | 3/2016 | Schultz et al. |
| 2016/0131376 | A1 | 5/2016 | Yoon |
| 2016/0231014 | A1 | 8/2016 | Ro et al. |
| 2016/0318368 | A1 | 11/2016 | Alger et al. |
| 2016/0361452 | A1 | 12/2016 | Blackley |
| 2017/0084156 | A1 | 3/2017 | Myllymäki |
| 2017/0168467 | A1 | 6/2017 | Liu et al. |
| 2017/0176030 | A1 | 6/2017 | Emmons et al. |
| 2017/0328591 | A1 | 11/2017 | Kelly et al. |
| 2017/0350611 | A1 | 12/2017 | Su et al. |
| 2018/0156483 | A1 | 6/2018 | Kim et al. |
| 2018/0156484 | A1 | 6/2018 | Kim et al. |
| 2018/0158315 | A1 | 6/2018 | Sloo et al. |
| 2018/0299150 | A1 | 10/2018 | Ajax et al. |
| 2018/0299151 | A1 | 10/2018 | Ajax et al. |
| 2018/0299159 | A1 | 10/2018 | Ajax et al. |
| 2019/0154285 | A1 | 5/2019 | Pham et al. |
| 2019/0221089 | A1 | 7/2019 | Wedig et al. |
| 2019/0288553 | A1 | 9/2019 | Wester et al. |
| 2019/0360717 | A1 | 11/2019 | Chae |
| 2019/0363576 | A1 | 11/2019 | Wester et al. |
| 2020/0011559 | A1 | 1/2020 | Wan |
| 2020/0072486 | A1 | 3/2020 | Matsubara et al. |
| 2020/0088438 | A1 | 3/2020 | Shiono et al. |
| 2020/0152040 | A1 | 5/2020 | Brown |
| 2020/0224915 | A1 | 7/2020 | Nourbakhsh et al. |
| 2020/0232670 | A1 | 7/2020 | Ritmanich et al. |
| 2020/0333753 | A1 | 10/2020 | Chenier et al. |
| 2020/0381939 | A1 | 12/2020 | Wester et al. |
| 2020/0393152 | A1 | 12/2020 | Ramirez et al. |
| 2020/0408434 | A1 | 12/2020 | Arentsen |
| 2021/0003308 | A1 | 1/2021 | Venne |
| 2021/0041118 | A1 | 2/2021 | Morgan et al. |
| 2021/0071891 | A1 | 3/2021 | Ferrere, Jr. et al. |
| 2021/0088241 | A1 | 3/2021 | Goodman et al. |
| 2021/0088248 | A1 | 3/2021 | Matsugi et al. |
| 2021/0103260 | A1 | 4/2021 | Khurana et al. |
| 2021/0123623 | A1 | 4/2021 | Notaro et al. |
| 2021/0131692 | A1 | 5/2021 | Martin |
| 2021/0156582 | A1 | 5/2021 | Stevenson et al. |
| 2021/0165926 | A1 | 6/2021 | Flaherty et al. |
| 2021/0173366 | A1 | 6/2021 | Turney et al. |
| 2021/0180815 | A1 | 6/2021 | Shamoon et al. |
| 2021/0199329 | A9 | 7/2021 | Mowris et al. |
| 2021/0207826 | A1 | 7/2021 | Sotokawa et al. |
| 2021/0208546 | A1 | 7/2021 | Locke et al. |
| 2021/0231325 | A1 | 7/2021 | Stevenson et al. |
| 2021/0239335 | A1 | 8/2021 | Morgan et al. |

FOREIGN PATENT DOCUMENTS

| | | |
|---|---|---|
| CA | 2745432 | 6/2010 |
| CA | 2863117 | 11/2014 |
| CA | 2933630 A1 | 3/2017 |
| CN | 101208563 A | 6/2008 |
| CN | 101208563 B | 6/2008 |
| CN | 102301187 A | 12/2011 |
| CN | 103557579 A | 2/2014 |
| CN | 203571824 U | 4/2014 |
| CN | 2014240733 A | 12/2014 |
| CN | 103557579 B | 2/2015 |
| CN | 105823172 A | 8/2016 |
| JP | H11287489 A | 10/1999 |
| JP | 2004045016 A | 2/2004 |
| JP | 2014240733 | 12/2014 |
| JP | 2018151114 A | 9/2018 |
| WO | WO2020055872 A1 | 3/2020 |

(56) References Cited

FOREIGN PATENT DOCUMENTS

| WO | WO2020112981 A1 | 6/2020 |
|---|---|---|
| WO | WO2020146315 A1 | 7/2020 |

OTHER PUBLICATIONS

Office Action issued to CN202080008234.4, mailed Jul. 26, 2022 (17 pages).
International Search Report and Written Opinion issued to PCT/US20/12487, mailed Apr. 2, 2020 (14 pages).
English Translation of portions of Office Action for Chinese Patent Application No. 202080008234.4, mailed Jul. 19, 2023 (3 pages).
Office Action for Chinese Patent Application No. 202080008234.4, mailed Jul. 19, 2023 (6 pages).
Search Report and Written Opinion for PCT Application No. PCT/US23/11580, mailed Apr. 14, 2023 (22 pages).
Office Action for Chinese Patent Application No. 202080008234.4, mailed Apr. 1, 2023 (8 pages).
Office Action issued to Chinese App. No. 202080008234.4 dated Jul. 26, 2022 (16 pages).
Canadian Application No. 3,125,578, Office Action mailed Apr. 4, 2024 (5 pages).
U.S. Appl. No. 18/817,338, Office Action mailed Jun. 4, 2025 (50 pages).
Investigation of a Novel Dew Point Indirect Evaporative Air Conditioning System for Buildings, Zhiyin Duan, University of Nottingham (188 pages).
A Critical Review on Air Quality Index, S. Kumari et al., Environmental Pollution: Select Proceedings of ICWEES-2016 (16 pages).

* cited by examiner

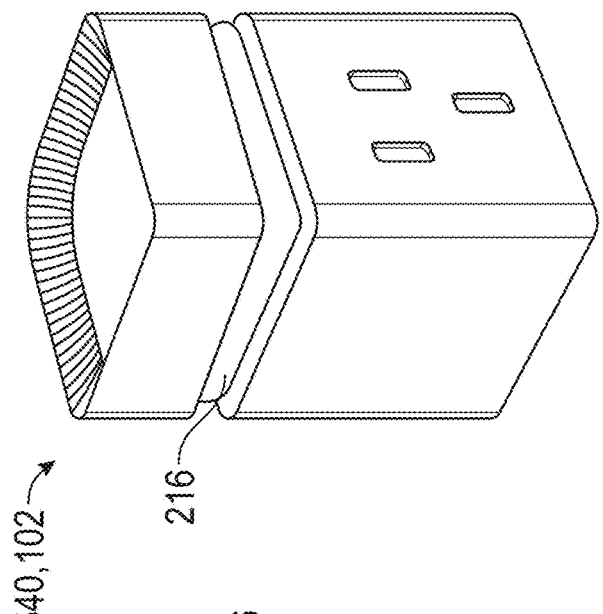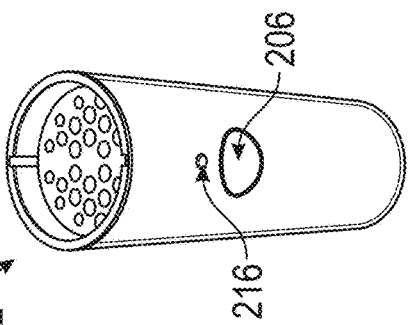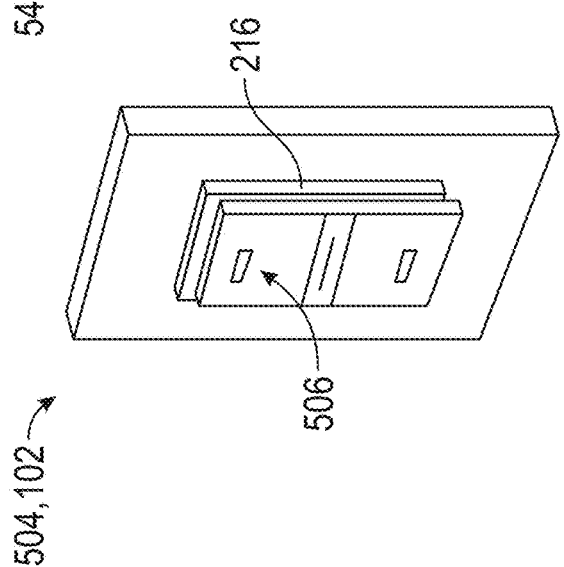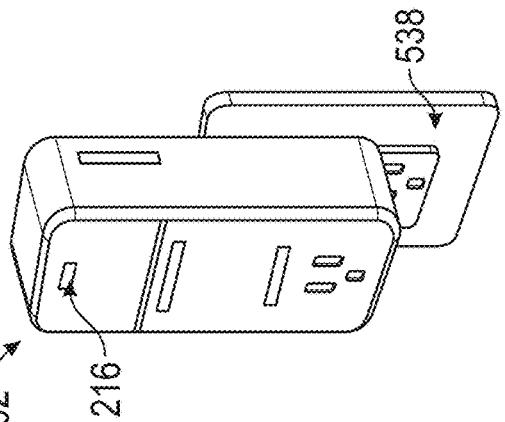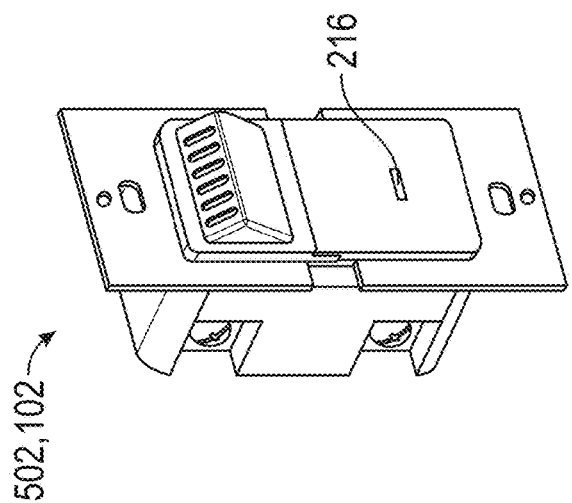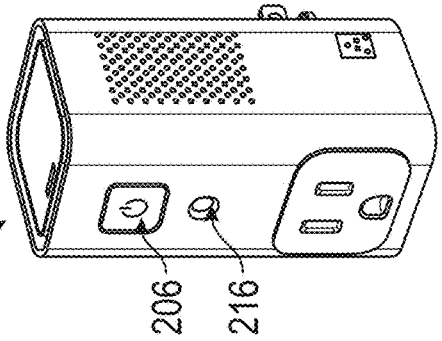

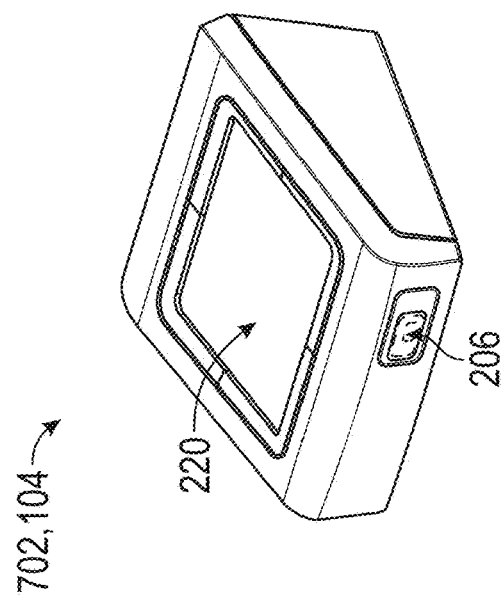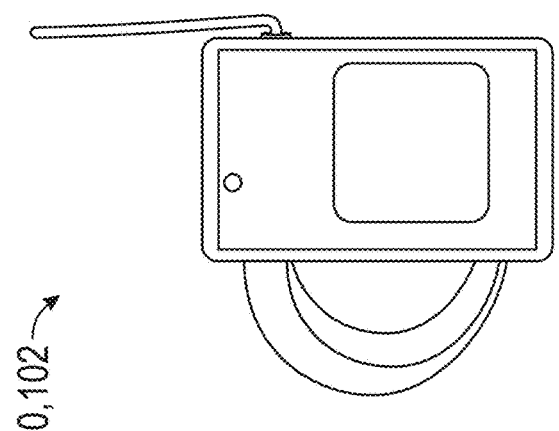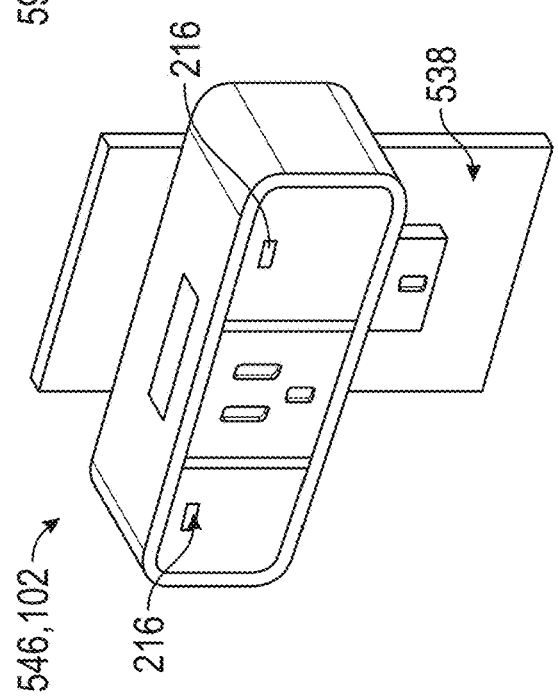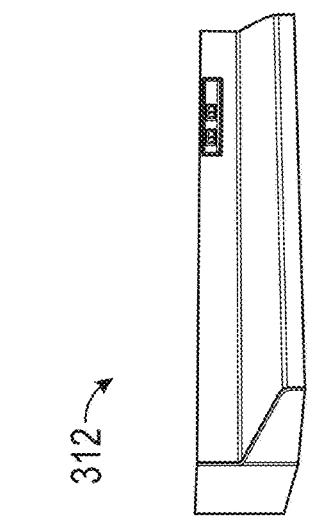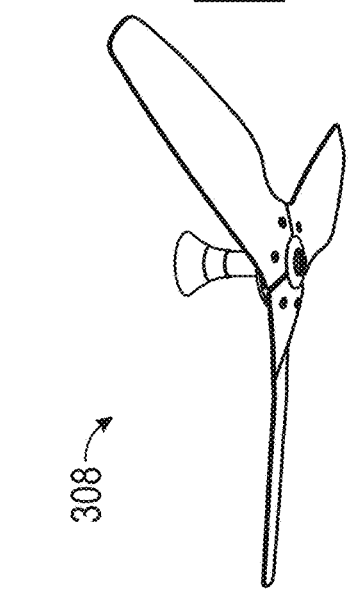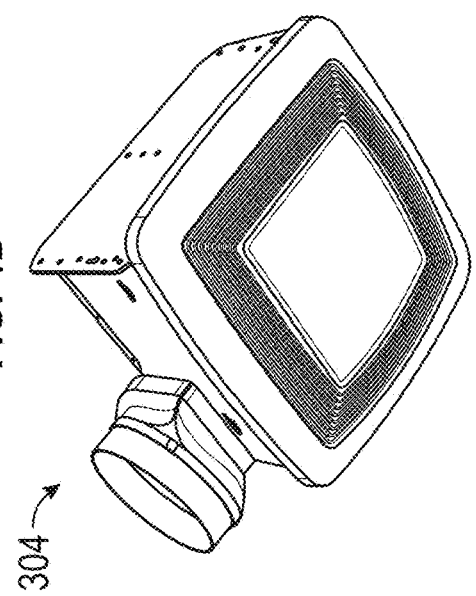

410, 400

450, 458

350, 352
406, 400

450, 454

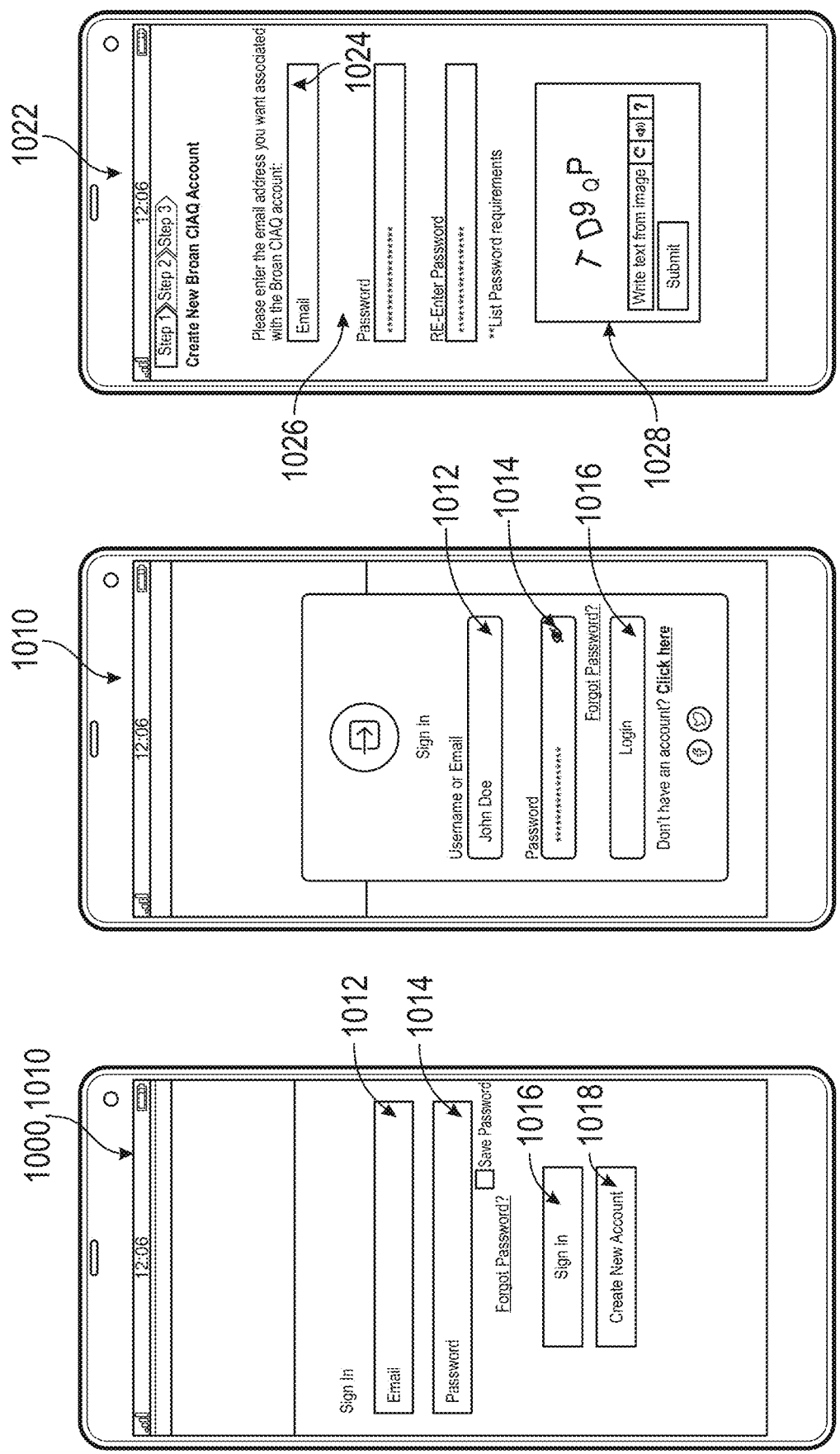

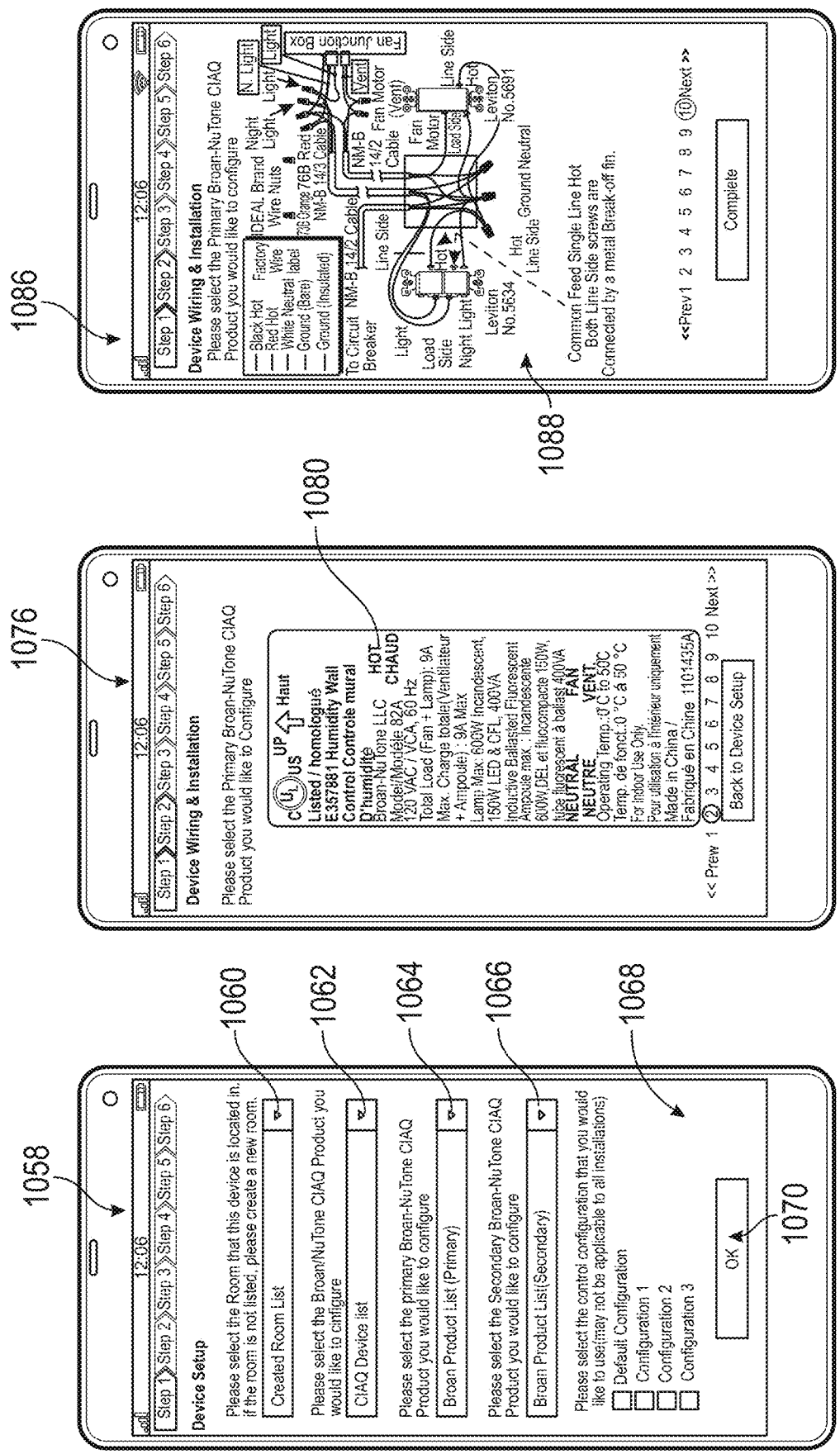

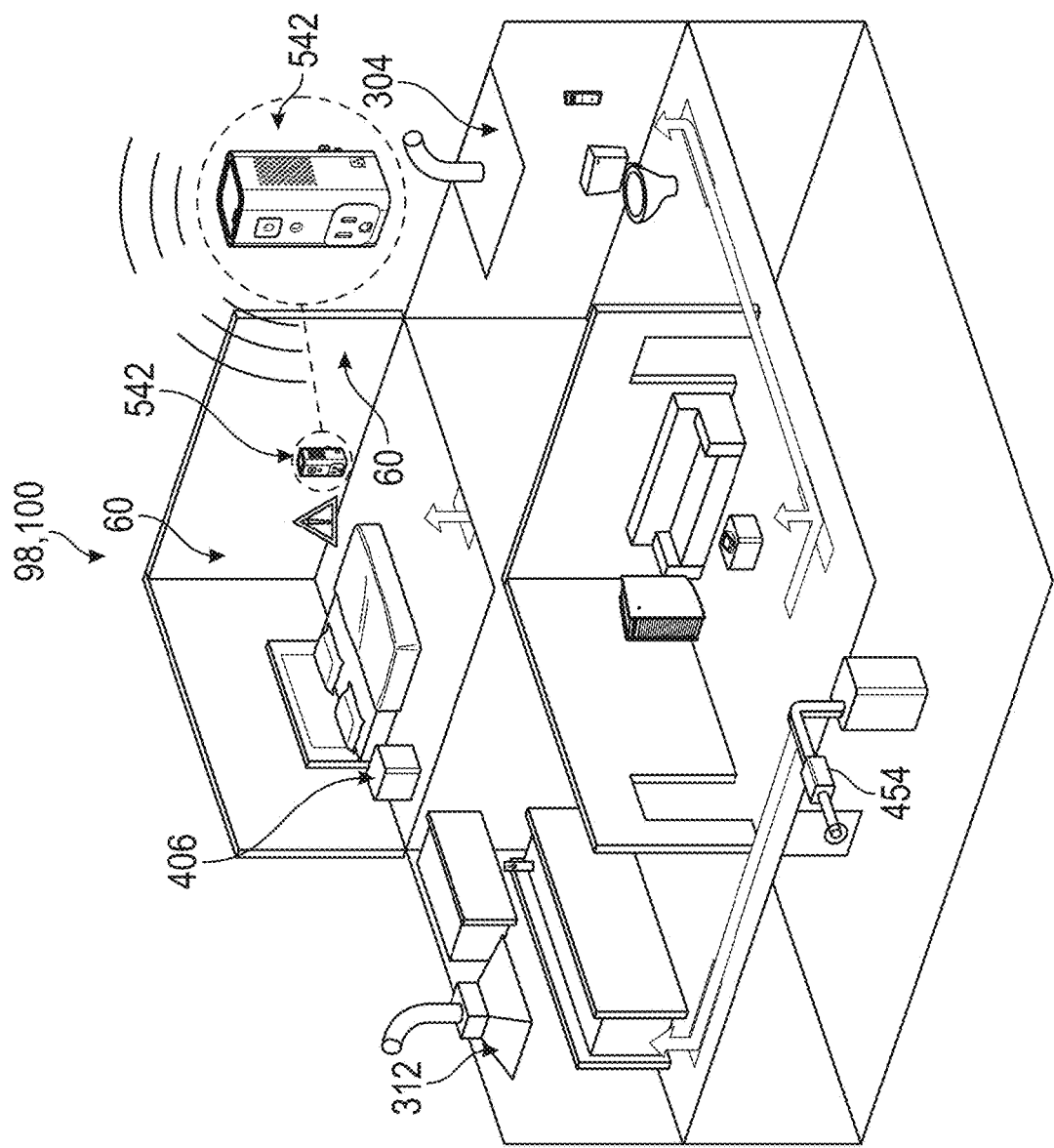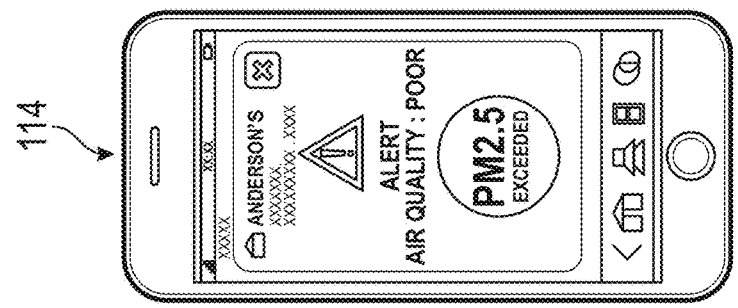
FIG. 37

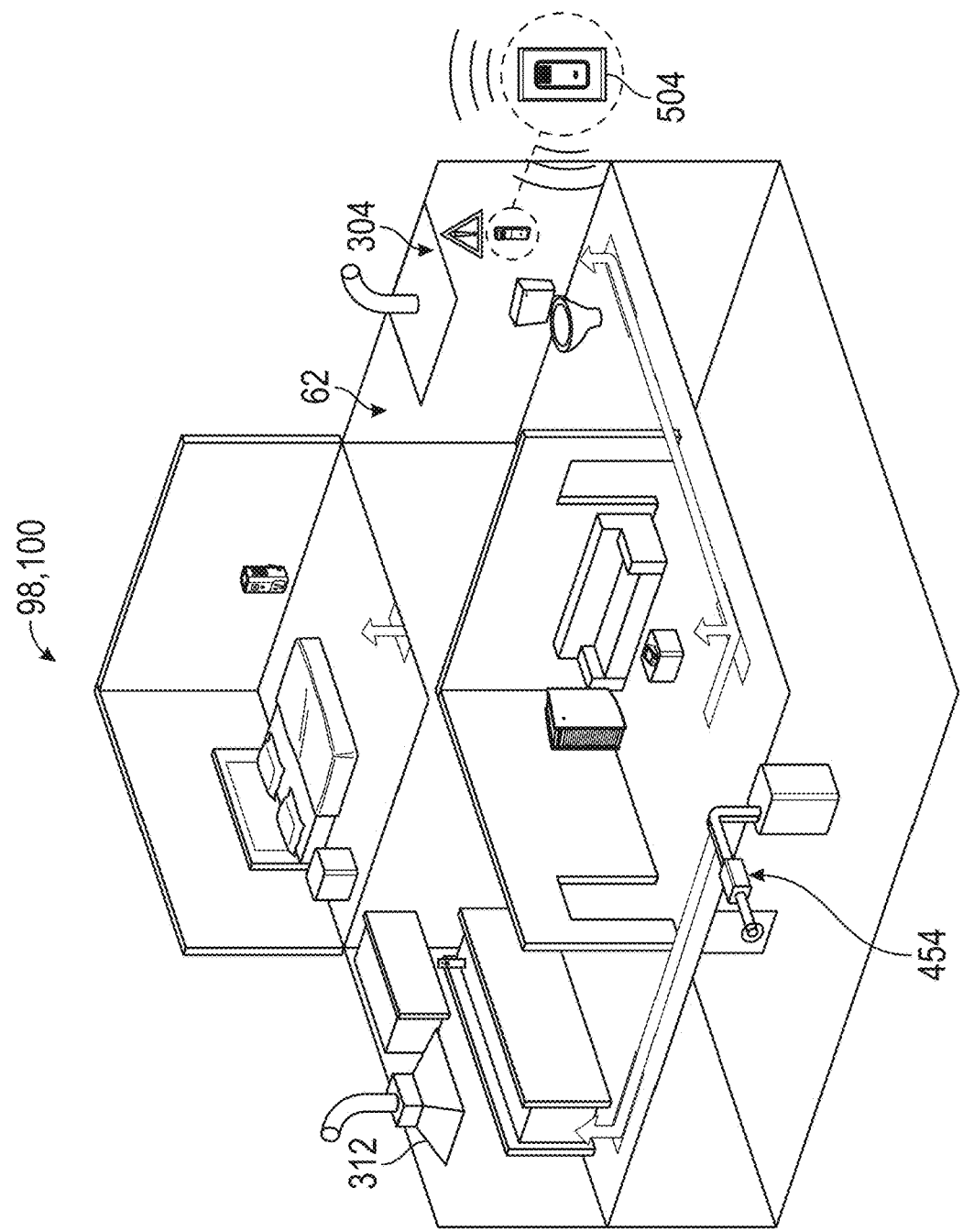
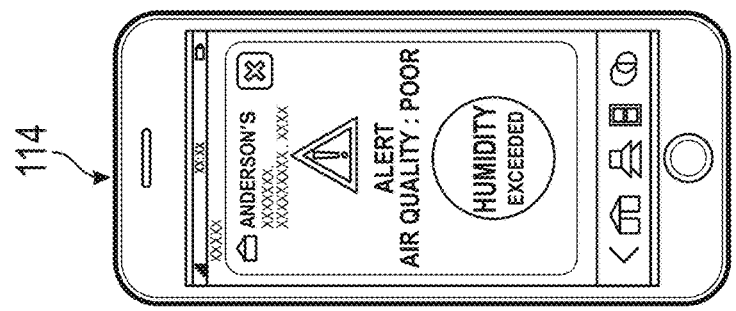
FIG. 42

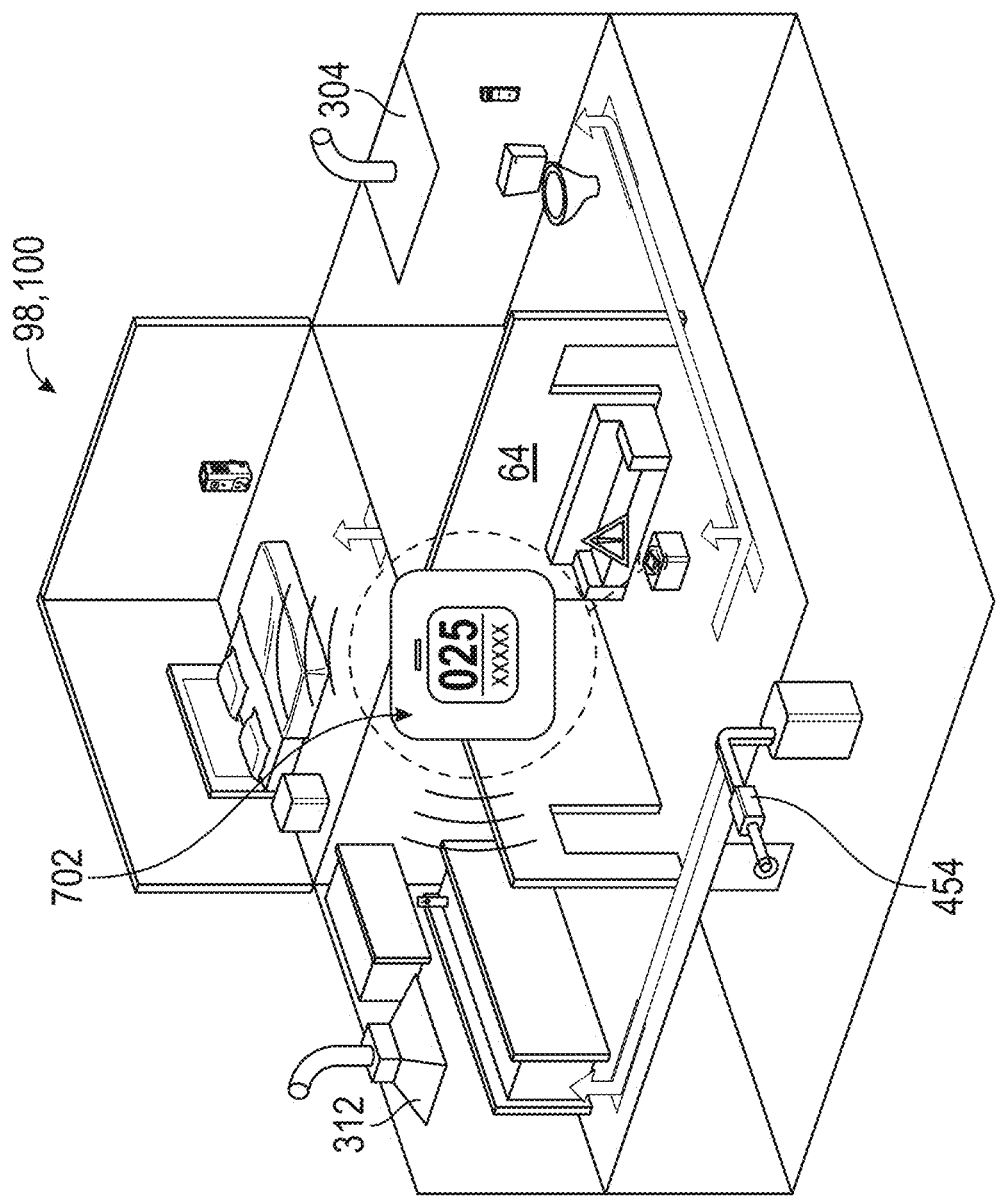
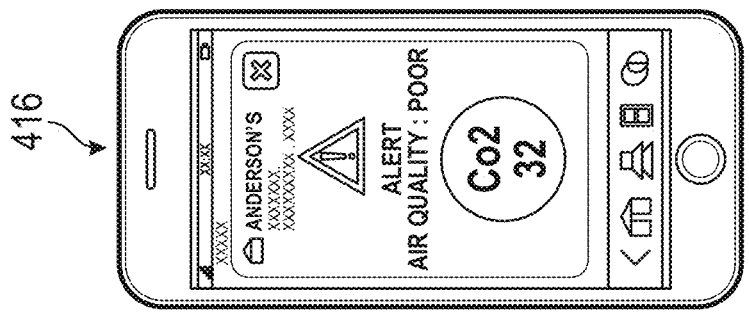
FIG. 47

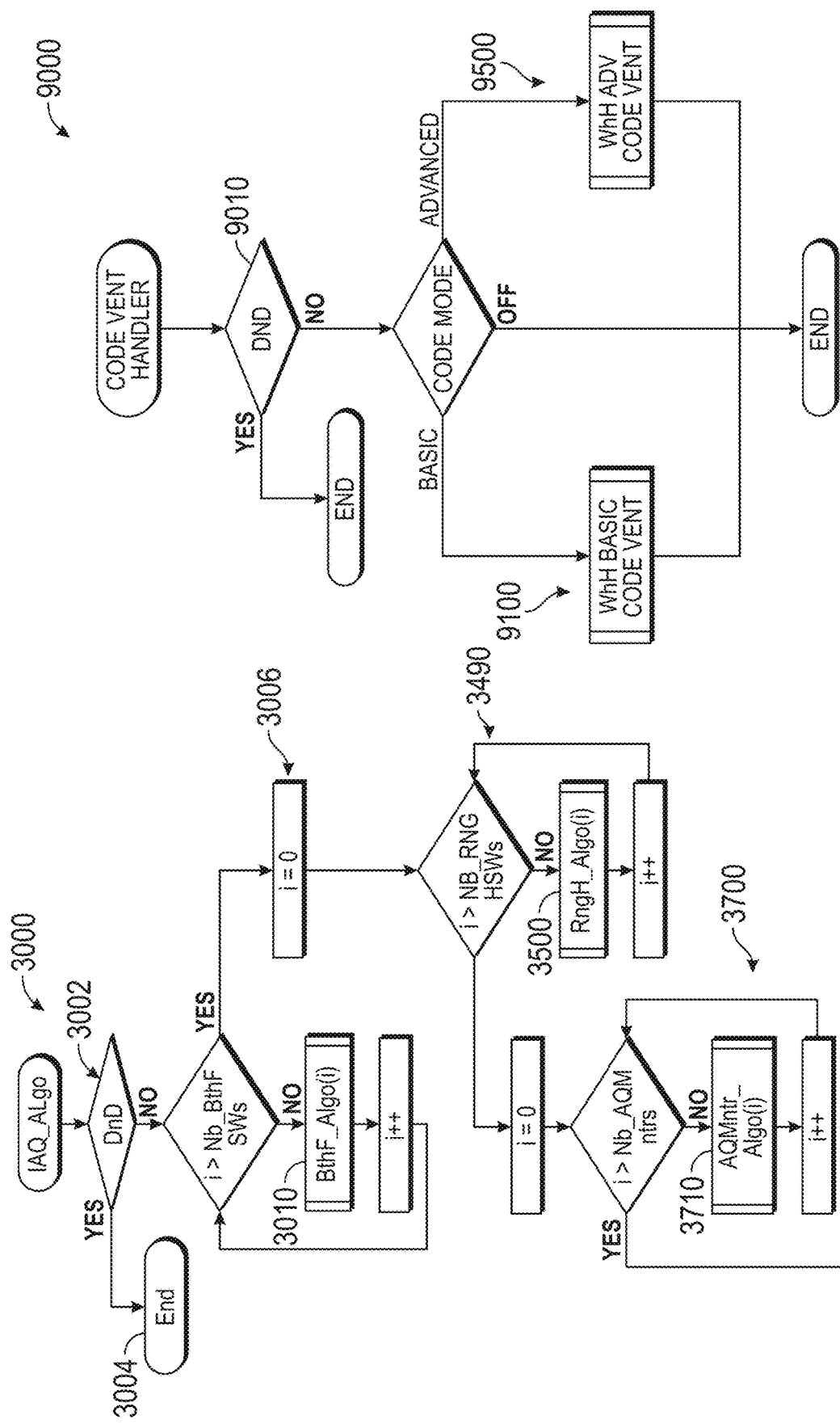

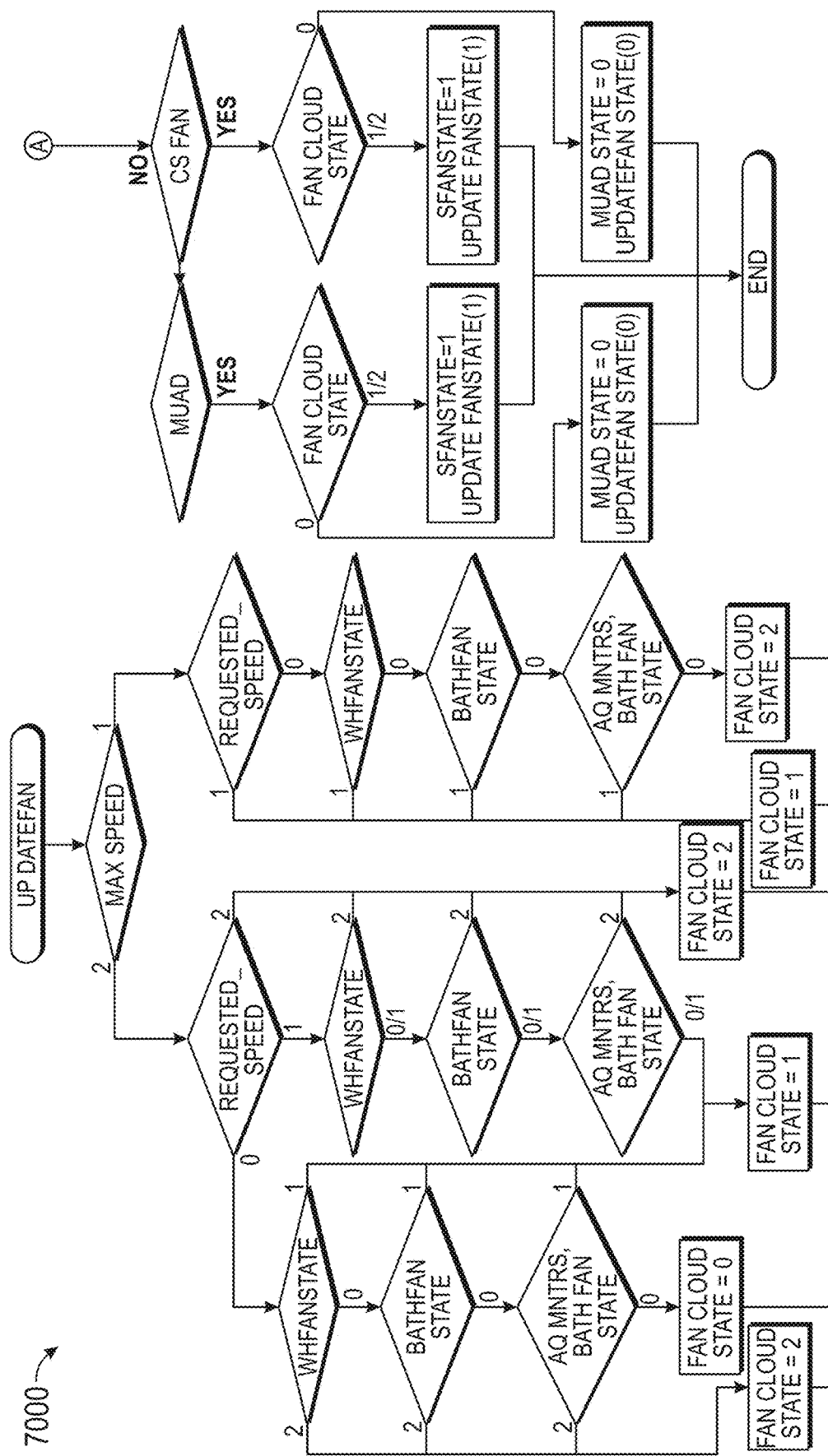

SYSTEM AND METHOD FOR CONTROLLING INDOOR AIR QUALITY

CROSS-REFERENCE TO OTHER APPLICATIONS

PCT Patent Application No. PCT/US20/12487, filed Jan. 7, 2020, U.S. Provisional Patent Application No. 62/789,501, filed on Jan. 7, 2019, PCT Patent Application No. PCT/US19/63581, filed on Nov. 27, 2019, U.S. patent application Ser. No. 16/243,056, filed on Jan. 8, 2019, U.S. patent application Ser. No. 16/242,498, filed on Jan. 8, 2019, U.S. patent application Ser. No. 15/081,488, filed on Mar. 25, 2016, U.S. patent application Ser. No. 14/593,883, filed on Jan. 9, 2015, U.S. Pat. No. 9,297,540, filed on Aug. 5, 2013, U.S. Pat. No. 10,054,127, filed on Sep. 29, 2017, U.S. Pat. No. 9,816,724, filed on Jan. 29, 2015, U.S. Pat. No. 9,816,699, filed on Sep. 2, 2015, U.S. Pat. No. 9,638,432, filed on Aug. 31, 2010, U.S. Pat. No. 8,100,746, filed on Jan. 4, 2006 and WO 2015/168243, filed on Nov. 5, 2015, all of which are incorporated in their entirety herein by reference and made a part hereof.

TECHNICAL FIELD

The present disclosure relates to indoor air quality ("IAQ") system, and particularly to IAQ system for use with an air venting systems. More particularly, the present disclosure relates to an IAQ system that can control various indoor air ventilation devices in order to regulate the air quality within a structure.

BACKGROUND

Recently researchers have turned their attention to studying the negative effects that poor indoor air quality has on an individual's health because people spend close to 90% of their time indoors and about 65% of their time is in their home. Health condition that appear to be negatively affected by poor indoor air quality include: (i) chronic obstructive pulmonary disease (COPD), asthmatics, heart disease, diabetes, obesity, neurodevelopmental disorders, among many others. Accordingly, a system that can not only monitor and raise awareness about the indoor air quality of a person's home, but can also improve indoor air quality is desirable.

Also, with widespread adoption of smartphones and mobile devices for implementation of smart home and internet of things (IoT) functionality, users are provided with more opportunities to lean about and control their environment. Thus, the ability to control the indoor air quality of a user's home from a remote location is also desirable.

The description provided in the background section should not be assumed to be prior art merely because it is mentioned in or associated with the background section. The background section may include information that describes one or more aspects of the subject technology.

SUMMARY

Described herein is an IAQ system that is capable of obtaining environmental data—namely air quality information—from various devices contained within a structure. In particular, these devices contain sensors that can obtain environmental data. This environmental data is then analyzed by the system to determine if any level of a component within the data is outside of a predefined threshold range. If the system determines that the level of the component is outside of the predefined threshold range for that given component, the system will carry out certain steps in order to bring the level within the predetermined threshold range. These steps include selecting the appropriate appliance and the proper operating conditions (e.g., turned ON/OFF and/or operating speed) of the selected appliance to most efficiently bring the level back within the predetermined threshold range. Once the system has determined that the level is back within the predetermined threshold range, the system will instruct the selected appliance to turn OFF.

It is understood that other configurations of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3B are exemplary in-wall monitoring devices that may be positioned within a switching unit that is designed to control lights;

FIGS. 4A-4D are exemplary monitoring devices that are designed to be plugged into an electrical outlet that is positioned within a wall of the operating environment;

FIG. 5 is a portable exemplary monitoring device;

FIG. 6 is an exemplary monitoring device that is designed to control the operation of an appliance;

FIG. 7 is an exemplary monitoring device that also includes a display that can be utilized to show information to the user;

FIGS. 8A-8C are exemplary connected appliances that are designed to be physically connected to an operating environment and are capable of communicating with the IAQ system without requiring additional hardware;

FIGS. 14-15 show a graphical user interface ("GUI") that is displayed on a mobile device, wherein the displayed screens, contained within the GUI, allow a user to log into their previously created account;

FIGS. 16-18 show screens, contained within the GUI, that allow an authorized user to enter information about the operating environment;

FIGS. 19-32 show screens, contained within the GUI, that allow the authorized user to connect an appliance and a monitoring device into the IAQ system;

FIGS. 35-40 show a partial cut-away view of an operating environment, which shows the exemplary IAQ system operating under a first set of conditions;

FIGS. 41-45 show a partial cut-away view of an operating environment, which shows the exemplary IAQ system operating under a second set of conditions;

FIGS. 46-50 show a partial cut-away view of an operating environment, which shows the exemplary IAQ system operating under a third set of conditions;

FIGS. 56-72 contain flow charts describing how the IAQ system functions;

DETAILED DESCRIPTION

Figure 1A:
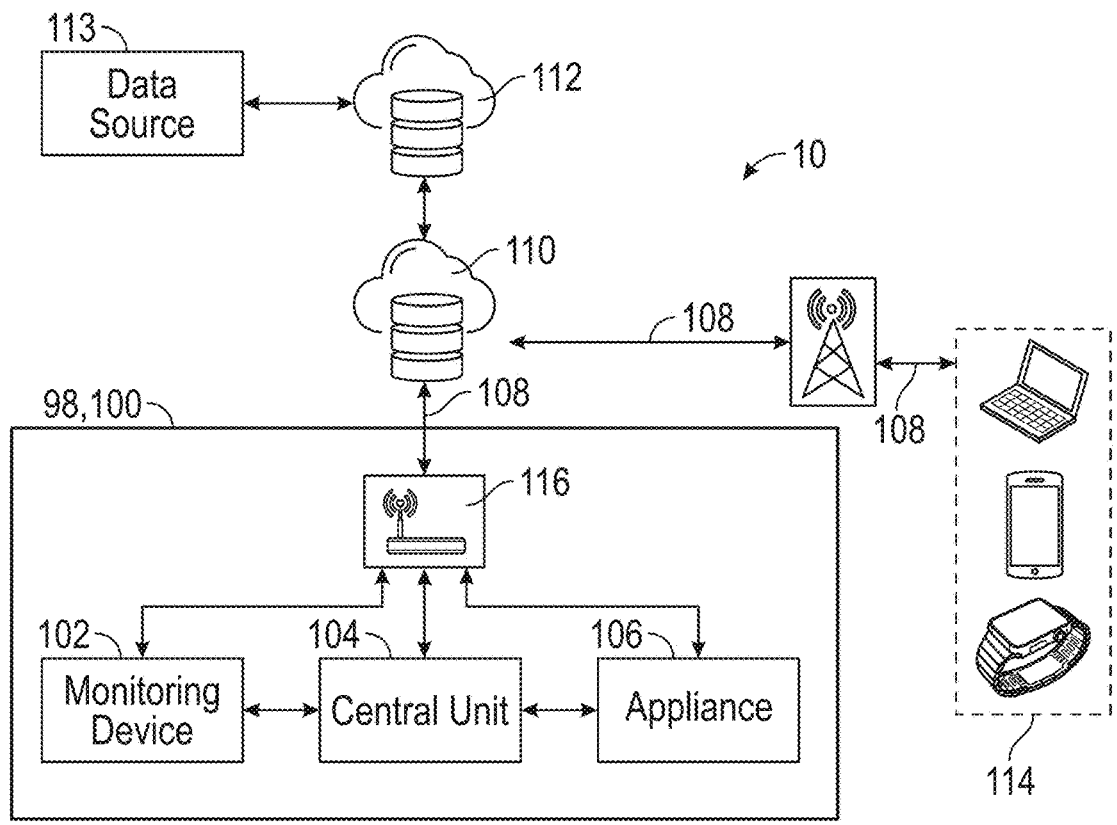
FIG. 1A is a simplified block diagram of a first exemplary embodiment of an IAQ system.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Accordingly, the drawings, flow charts and detailed description are to be regarded as illustrative in nature, not restrictive or limiting.

1) Introduction/Summary

Figure 82:
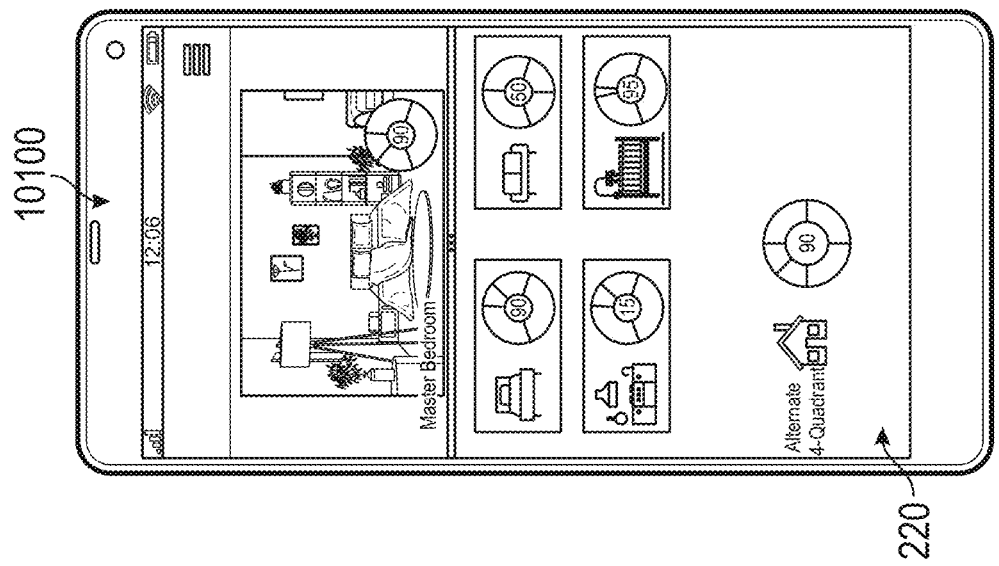
FIG. 82 shows a second alternative embodiment of a screen, contained within the GUI, that displays historical environmental measurements that were recorded by the IAQ system over a predefined amount of time.

FIGS. 1-82 describe an IAQ system 10 that is capable of obtaining environmental data—namely air quality information, such as pollutant levels—from a monitoring device 102, a central unit 104, or a connected appliance 106, which are contained within an operating environment 98—namely a structure 100 (e.g., commercial building, a residential building, a single-family home, an apartment, etc.). These devices 102, 104, and 106 are configured to record environmental data, which includes various components (e.g., temperature, humidity and/or pollutant levels, such as TVOC, $CO_2$, PM2.5), and send the recorded levels of the components of the environmental data to a local server/database 110. This local server/database 110 may: i) analyze the data, ii) determine if all levels contained within environmental data are within predefined threshold ranges, and iii) may recommend that the IAQ system 10 take certain steps (e.g., turn ON/OFF various appliances) to bring certain levels of the components within the predetermined threshold range. The IAQ system 10 can then carry out these steps by controlling the operational mode (e.g., ON/OFF and/or the speed of the fan) of various appliances 106 contained within the operating environment 98. Once the IAQ system 10 has determined that the levels contained within the environmental data are back within the predetermined threshold ranges, the IAQ system 10 will instruct the appliances 106 to turn OFF.

2) System Configuration

FIGS. 1A-1G illustrate simplified block diagrams of various non-limiting embodiments of an exemplary IAQ system 10 that is designed to operate within a structure 100. Specifically, the IAQ system 10 may include: i) a CIAQ device 50, such as a monitoring device 102, ii) a central unit 104, iii) one or more appliances 106 (e.g., connected appliances 300 that contain an CIAQ device, monitoring device 102 that can control non-connected appliances 400, or a controller that can control non-connected appliances 400), iv) a network 108, such as any type of wired or wireless communication technology, iv) local server/database 110, v) national database 112, vi) data source 113 (e.g., distributed external sensors, weather pattern data, historical air quality databases, air quality prediction databases, and other information about the air that is exterior to the structure 100), and vii) alerting device 114 (e.g., computer, smartphone, tablet, smartwatch, or similar types of devices). It should be understood in certain embodiments that some of the devices set forth above may be omitted. For example, the IAQ system 10 shown in FIG. 1G does not contain a central unit 104. Additionally, in other embodiments, the IAQ system 10 may include additional devices and/or components.

a. First Embodiment of the System

FIG. 1A illustrates a first exemplary IAQ system 10 that includes the monitoring device 102, central unit 104, and the appliance 106. The monitoring device 102 and the central unit 104 include at least one sensor, which it uses to collect data about the local environment 98. Some or all of this environment data is then sent to the local server/database 110, which processes and stores this data. If the local server/database 110 determines that all levels contained within the environmental data are within the predetermined threshold ranges, then the local server/database 110 will simply store the environmental data. However, if the local server/database 110 determines that one level contained within the environmental data is out of the predetermined threshold range, then the IAQ system 10 may be configured to perform one of the following steps from one of the below embodiments:

In a first embodiment, the local server/database 110 will send an alert to the alerting unit 114 via the network 108. The alert that is sent to the alerting unit 114 informs the user which level was outside of the predetermined threshold range. Along with sending this alert to the alerting unit 114, the local server/database 110 will send an electronic signal(s) via the router 116 to the appliance(s) 106 (e.g., connected appliances 300 that contain an CIAQ device, monitoring device 102 that can control non-connected appliances 400, or a controller that can control non-connected appliances 400) in order to return the level to a state that is within the predetermined threshold range. In this first embodiment, the IAQ system 10 does not ask the user to confirm any steps that the IAQ system 10 has deemed necessary; instead, the IAQ system 10 automatically performs the determined steps. Once the steps have been performed or if the level has been returned to a state that is within the predetermined threshold range, the IAQ system 10: (i) sends electronic signal(s) via the router 116 to turn OFF the appliance(s) 106 and (ii) sends a signal to the alerting device 114 to inform the authorized user that the alert has been resolved. It should be understood that at any time, including before, during, or after an alert has been received, the user can prevent the system from automatically performing the steps that the IAQ system 10 may or has deemed necessary. It should also be understood that the authorized user may configure the IAQ system 10 such that it automatically performs the steps without sending an alert to the alerting device 114.

In a second embodiment, the local server/database 110 will send an alert to the alerting unit 114 via the network 108. This alert informs the user which component was outside of the predetermined threshold range and the steps the IAQ system 10 has deemed necessary to return the component to a state that is within the predetermined threshold range. The IAQ system 10 will then wait for the user to confirm the steps the IAQ system 10 is proposing. In this embodiment, the IAQ system 10 will not perform any steps prior to receiving confirmation from the authorized user. Once the authorized user has confirmed the steps the IAQ system 10 is proposing to implement or has selected an alternate set of steps, the IAQ system 10 sends electronic signal(s) via the router 116 to the appliance(s) 106 in order perform the steps that were approved by the authorized user. Once the steps have been performed or if the level of the component is returned to a state that is within the predetermined threshold range, the IAQ system 10: (i) sends electronic signal(s) via the router 116 to turn OFF the appliance(s) 106 and (ii) sends a signal to the alerting device 114 to inform the authorized user that the alert has been resolved.

The IAQ system 10 in FIG. 1A includes a national database 112. The national database 112 can collect information from other systems 10, which are deployed in other structures 100. The national database 112 can compare the current environmental data collected from one specific structure against historical environmental data collected from: i) this specific structure, ii) other structures within the same neighborhood, iii) other structures within the same area or zip code, iv) other structures within the same region, v) other structures within the same country, and vi) all the structures around the world. This may allow the user to understand how their current air quality compares to historical air quality. Thus, this data may suggest that the changes the user made to their structure have improved their air quality. In addition, national database 112 can compare the current environmental data collected from one specific structure against current environmental data collected from: i) other structures within the same neighborhood, ii) other structures within the same area or zip code, iii) other structures within the same region, iv) other structures within the same country, and v) all the structures around the world. This may allow the user to understand how their current air quality compares to the current air quality of others. Thus, this data may suggest that the user needs to make additional changes to their structure to bring their air quality in line with their neighbors. One example of how this data could be utilized in a commercial setting is this data could be used in the marketing of a house. For example, a user that is selling their house may show someone that is interested in buying the house that their air quality is better than their neighbors. Or this environmental data could be used by potential home buyers in order to select a home or a location they desire to live.

The IAQ system 10 shown in FIG. 1A also includes a data source 113. This data source 113 may include a prediction table that is based on information derived from current and historical data collected from: i) exterior local/regional/national sensors (e.g. dew point, temperature, air pollutants), ii) sensors installed in other structures, iii) weather information, iv) electricity costs, and v) other similar types of data. This data contained within the data source 113 can be accessed by a combination of the national database 112 and the local server/database 110. This data can be utilized to help make predictions when levels of the components will be deemed to be out of the predetermined threshold range and to take corrective measures prior to the occurrence of these events. For example, the national database 112 and the local server/database 110 may access the data source 113 and determine that the exterior air quality is predicted to be outside of threshold ranges between the hours of 3:00 pm and 9:00 pm. Thus, the system may try and minimize drawing air into the structure 100 during these times and instead will utilize air purifiers within the structure 100 in order to maximize the quality of the air contained within the structure 100. In another example, the national database 112 and the local server/database 110 may access the data source 113 and determine that the cost of electricity during a specific month is lower between the hours of 11:00 am and 3:00 pm. Thus, the IAQ system 10 may try and operate devices that use more electricity during these times in order to remove air pollutants from structure 100. Thus, the national database 112 in conjunction with the data source 113 can be utilized to maximize the quality of the air contained within the structure 100 based on predictions about the exterior environmental conditions.

b. Second-Seventh Embodiments of the System

Figure 1B:
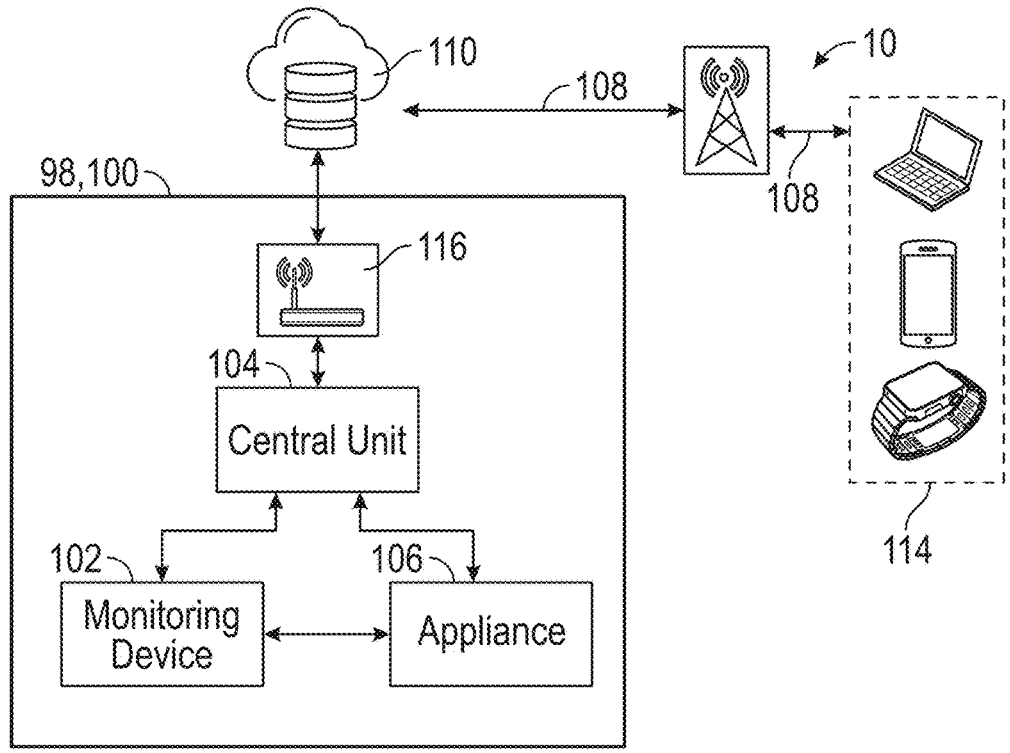
FIG. 1B is a simplified block diagram of a second exemplary embodiment of an IAQ system.

FIG. 1B illustrates another exemplary IAQ system 10, which is similar to FIG. 1A. However, the IAQ system 10 in FIG. 1B does not include a national database 112 or a data source 113. In addition, the monitoring device 103 and the appliance 106 do not report directly to the local server/database 110. Instead, in this configuration, all data that is generated by the monitoring unit 102 and the signals that are sent to the appliance 106 pass through the central unit 104. In comparison to FIG. 1A, this configuration allows the central unit 103 to have more control over the IAQ system 10 and requires that fewer devices connect directly to the local server/database 110.

Figure 1C:
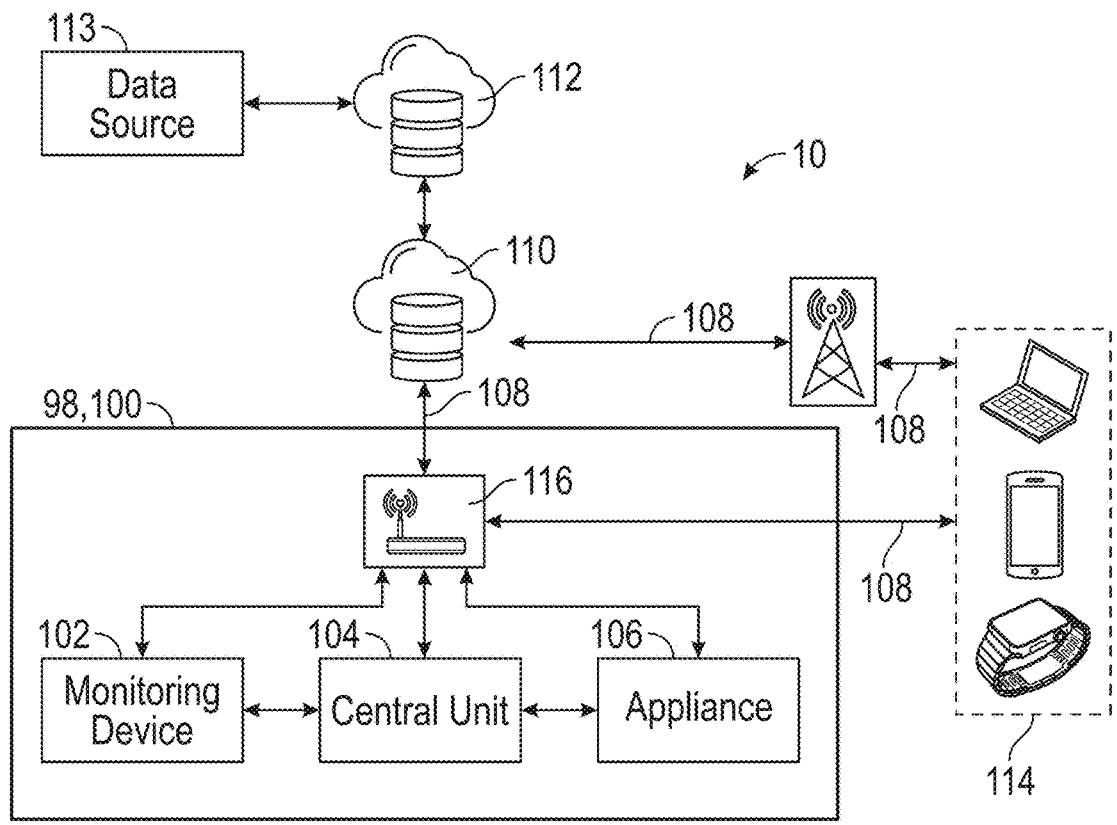
FIG. 1C is a simplified block diagram of a third exemplary embodiment of an IAQ system.
Figure 1D:
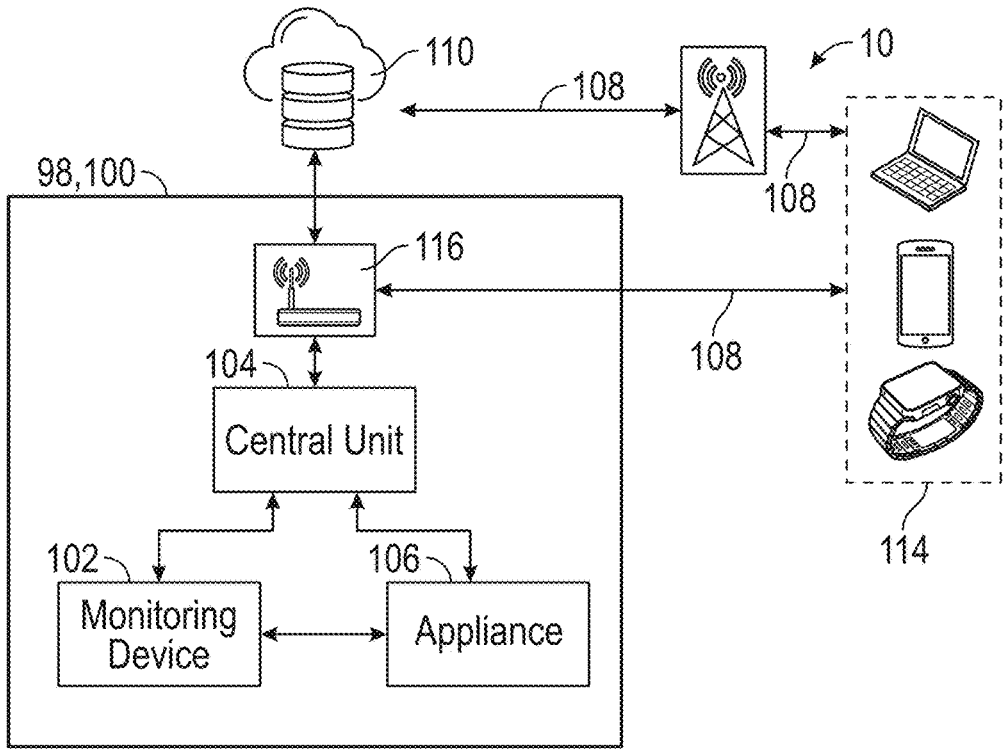
FIG. 1D is a simplified block diagram of a fourth exemplary embodiment of an IAQ system.

FIGS. 1C and 1D illustrate exemplary systems 10, which are similar to FIGS. 1A and 1B. However, the systems 10 in FIGS. 1C and 1D have the ability to send alerts directly from the router 116 to the alerting unit 114. For example, these systems 10 may use a Wi-Fi connection or other low powered local area wireless network protocols to send data from the router 116 to the alerting unit 114. In comparison to FIGS. 1A and 1B, this configuration allows the system to reduce the amount of data that travels over the non-local network, which reduces data costs and improves speed. It should be understood that alerts could still be sent over a non-local network in FIGS. 1C and 1D, if the alerting unit 114 is outside of the range of the network provided by the router 116.

Figure 1E:
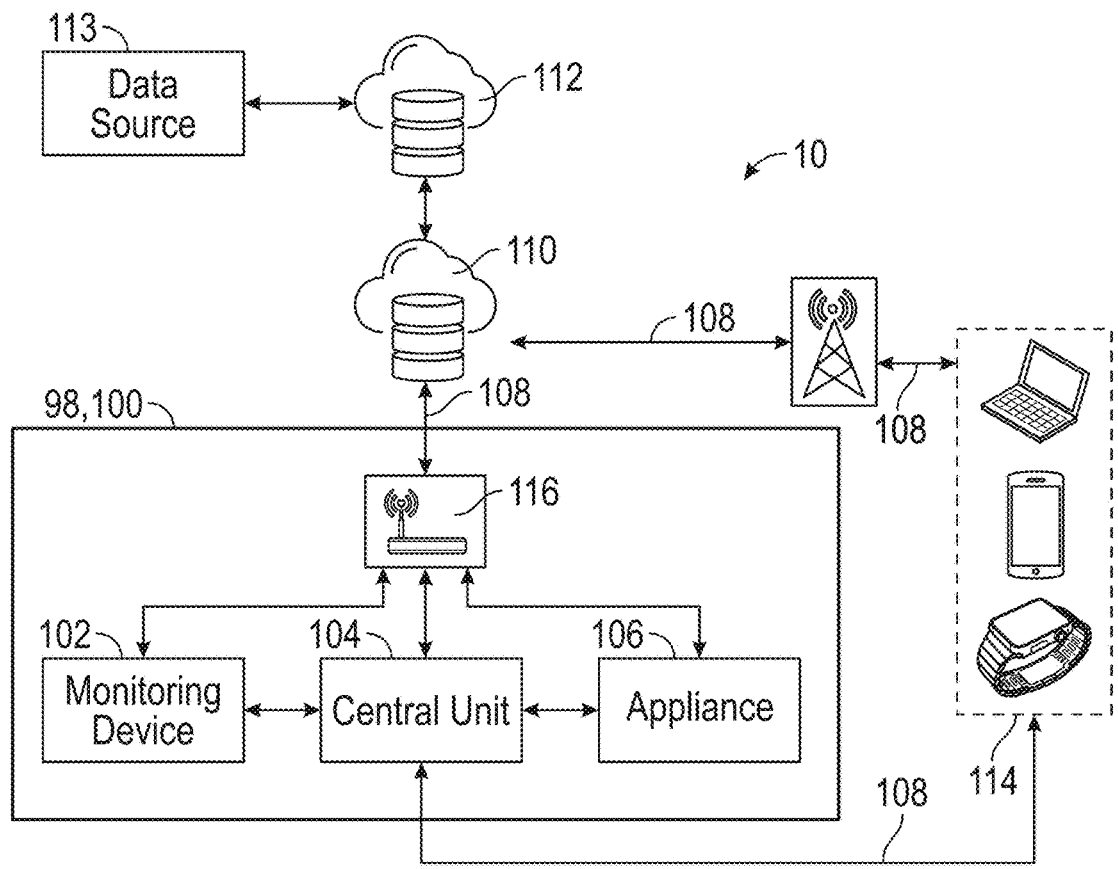
FIG. 1E is a simplified block diagram of a fifth exemplary embodiment of an IAQ system.
Figure 1F:
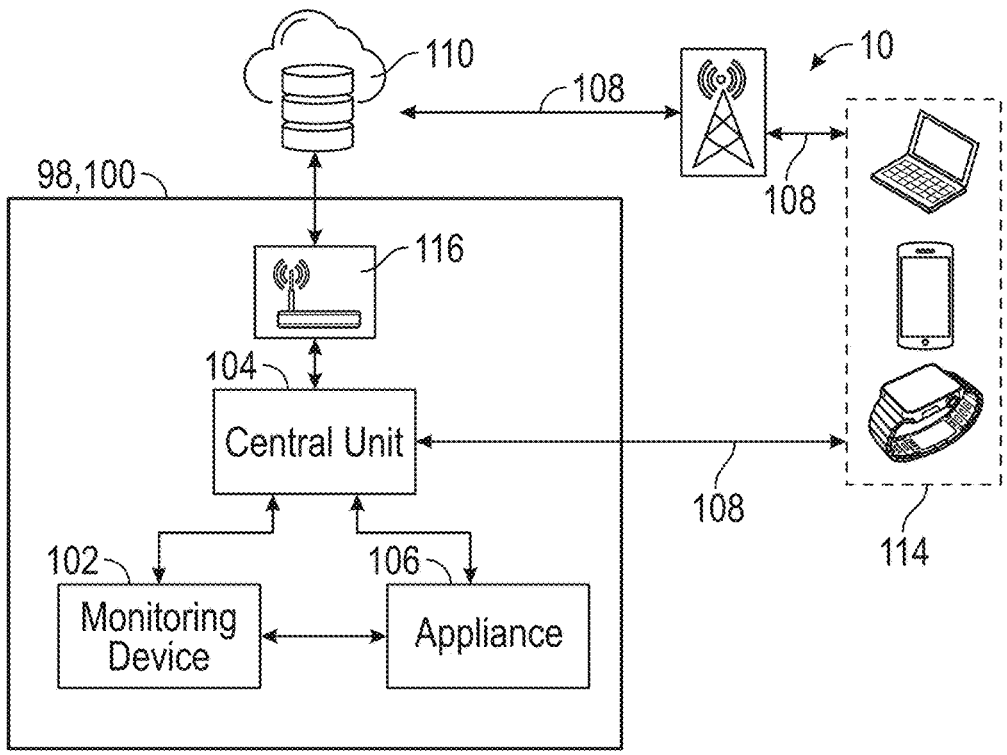
FIG. 1F is a simplified block diagram of a sixth exemplary embodiment of an IAQ system.

FIGS. 1E and 1F illustrate exemplary systems 10, which are similar to FIGS. 1A and 1B. However, the systems 10 in FIGS. 1E and 1F have the ability to send alerts directly from the central unit 104 to the alerting unit 114. For example, these systems 10 may use a Bluetooth protocol or other low powered local area wireless network protocols to send data from the central unit 104 to the alerting unit 114. In comparison to FIGS. 1A and 1B, this configuration allows the system to reduce the amount of data that travels over the non-local network and the local network, which reduces data costs and improves speed. It should be understood that alerts can still be sent over a non-local network in FIGS. 1E and 1F, if the alerting unit 114 is outside of the range of the network provided by the central unit 104.

Figure 1G:
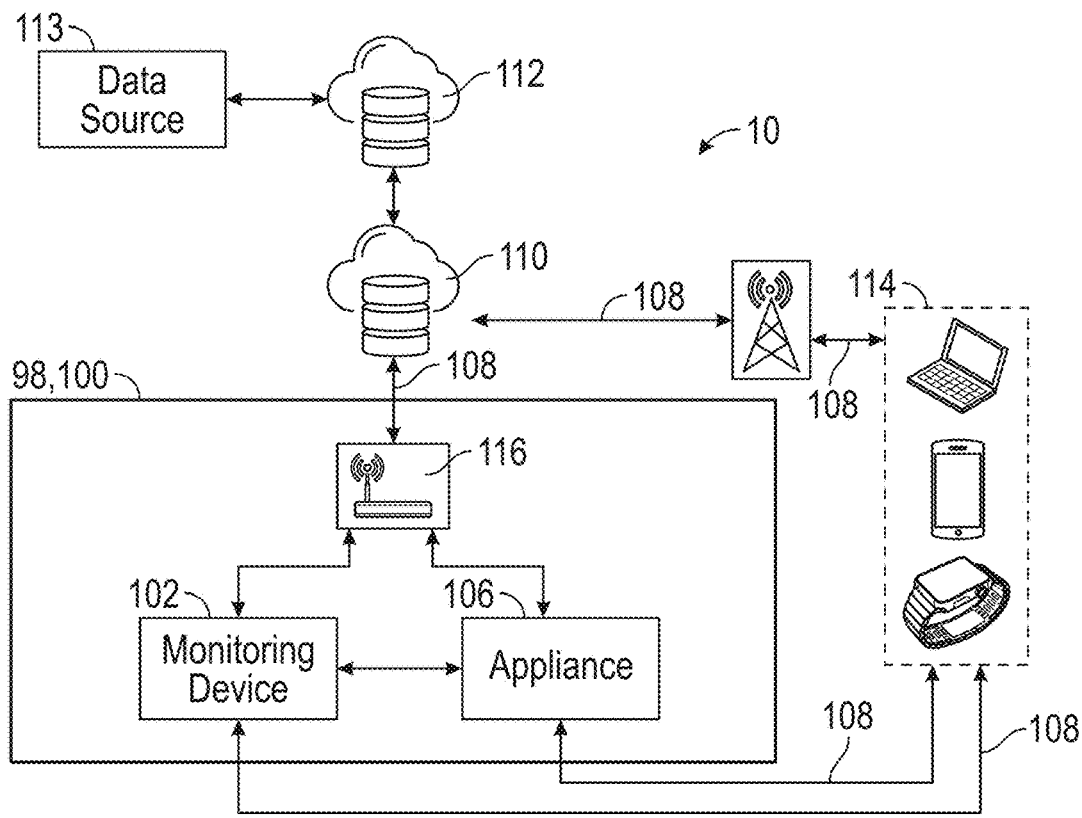
FIG. 1G is a simplified block diagram of a seventh exemplary embodiment of an IAQ system.
Figure 2:
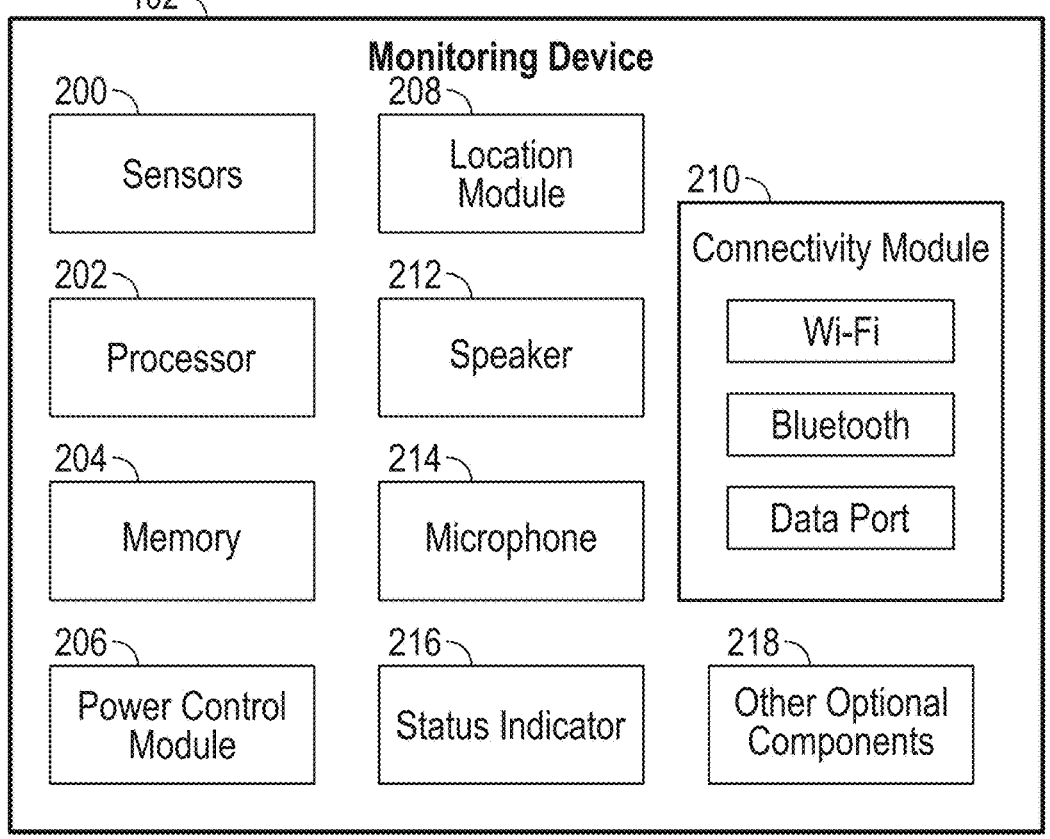
FIG. 2 is a simplified block diagram of a monitoring device that includes sensors, such as environmental sensors.

FIG. 1G illustrates an exemplary IAQ system 10, which is very similar to FIG. 1A. However, the IAQ system 10 in FIG. 1G does not have a central unit 104. Instead, the monitoring device 102 sends signals either to the alerting unit 114 or to the local server/database 110 via the router 116. For example, these systems 10 may use a Bluetooth, NFC or other low powered local area wireless network protocols to send data from the monitoring device 102 to the alerting unit 114. In comparison to FIG. 1A, this configuration allows the system to reduce the amount of data that travels over the non-local network and the local network, which reduces data costs and improves speed. Also, this IAQ system 10 may be more suitable for smaller installations due to the fact that it does not require a central unit 104. It should be understood that alerts could still be sent over a non-local network in FIG. 1G, if the alerting unit 114 is outside of the range of the network provided by the monitoring device 102 or the router 116.

3) Block Diagram of the Monitoring Device

FIG. 3A illustrates a block diagram of exemplary monitoring device 102 of the IAQ system 10. Specifically, the monitoring devices 102 may include the following elements: i) sensors 200, ii) processor 202, iii) memory 204, iv) power control module 206, v) location module 208, and vi) connectivity module 210. In some embodiments, the monitoring devices 102 may include other optional components, which include: i) speaker 212, ii) microphone 214, iii) status indicator 216, or iv) other optional components (e.g., components that can control the operational setting of the device, data inputs, or lights) 218. Meanwhile, the central unit 104 may be any internet enabled device (e.g., computer, laptop, mobile device, cellular phone, etc.) that includes displaying the current and/or historical data collected by the IAQ system 10. In alternative embodiments, the central unit 104 may contain all of the same components and features of the monitoring devices 102 along with a display 220 for displaying the current and/or historical data collected by the IAQ system 10.

a) Sensor(s)

The sensor(s) 200 that are contained within the monitoring device 102 are configured to collect data about the local environment 98. The sensor(s) 200 may include any one of, or any combination of, the following: (i) air pollutant sensor, (ii) humidity/temperature sensor, (iii) motion sensor, (iv) light/color sensor, (v) camera, (vi) passive infrared (PIR) sensors or (vii) other sensors (e.g., infrared, ultrasonic, microwave, magnetic field sensors). It should be understood that the term environmental data is comprised of measurements taken from these sensors and these measurements are referred to herein as levels of components. In particular, the air pollutant sensor is configured to detect a concentration of one or more air pollutants in the environment within the structure 100, including: CO, $CO_2$, NO, NO2, NOX, PM2.5, ultrafine particles, smoke (PM2.5 and PM10), radon, molds and allergens (PM10), volatile organic compounds (VOCs), ozone, dust particulates, lead particles, acrolein, biological pollutants (e.g., bacteria, viruses, animal dander and cat saliva, mites, cockroaches, pollen and etc.), pesticides, and formaldehyde. The humidity/temperature sensor measures the temperature and/or humidity in the environment within the structure 100 to establish an ambient baseline and to detect changes in the conditions of the environment within the structure 100. The motion sensor, light/color sensors, camera, and other sensors may be used to monitor habits of humans or animals near the monitoring device 102 to establish a baseline trend and to detect changes in the baseline. Changes in this baseline trend may be helpful in determining why changes occurred within the recorded environment data. Alternatively, this baseline may be used by the IAQ system 10 to suggest different or alternative steps to maximize the air quality within the structure 100.

b) Memory

The memory 204 may be utilized to temporally store the environmental data before this data is sent to the local server/database 110. Typically, the predetermined threshold range(s) or value(s) may be programmed within the memory contained in the local server/database 110 or the central unit 104. However, in some embodiments, some or all of the predetermined threshold range(s) or value(s) may be programmed within the memory 204 of the monitoring devices 102. Regardless of where these predetermined threshold range(s) are stored, the range(s) or value(s) may be preprogramed into the IAQ system 10. Specifically, there preprogramed range(s) or value(s) may be determined by the system designer based on one or more of the following: regulatory bodies, government agencies, private groups or standard setting bodies, such as the ASHRAE Standard Committee (e.g., ANSI/ASHRAE 62.2-2016, ISSN 1041-2336, which is fully incorporated herein by reference). An example of the range(s) that may be preprogram into the system 10 are shown in the below table, where the system 10 will send the alert or take start to take corrective action when the air quality reaches the "Fair" reference level. It should be understood that the if the air quality reaches the "Poor" reference level or the "Bad" reference level, the system 10 may take additional actions or more aggressive action in order to try and return the air quality within the structure 100 to at least a "Good" reference level within a reasonable amount of time. It should further be understood that these range(s) are only exemplary and should not be construed as limiting.

| Reference Level | IAQ Rating | $CO_2$ (ppm)* | TVOC ($\mu g/m^3$)* | PM2.5 ($\mu g/m_3$)* | RH %* |
|---|---|---|---|---|---|
| Excellent | 0-20 | <600 | <300 | <25 | 40-60 |
| Good | 21-40 | 601-1000 | 301-1000 | 25-40 | <40/>60 |
| Fair | 41-60 | 1001-1500 | 1001-3000 | 40-150 | <30/>70 |
| Poor | 61-80 | 1501-2000 | 3001-10000 | 150-250 | <20/>80 |
| Bad | 81-100 | >2000 | >10000 | >250 | <10/>90 |

It should be understood that predetermined threshold range (s) or value(s) may be updated by replacing the levels within the local server/database 110 or by using over the air updates in order to update levels that are stored in memory 204 of the monitoring devices 102.

Instead of preprogramming the predetermined threshold range(s) or value(s) into the IAQ system 10, the range(s) or value(s) may be determined/modified by calibrating the IAQ system 10 to the structure 100. In order to provide these range(s) or value(s), the following steps may be undertaken. First, the monitoring unit 102 collects data from the sensors 200 over a predefined time period (e.g., 1 day, 3 days, or 7 days). This environmental data is then compared against recommended levels that are set forth by various regulatory bodies, government agencies, private groups, or standard setting bodies. Based on this comparison, the IAQ system 10 determines the threshold range(s) or value(s). For example, if the measured level of the components are more than one standard deviation below or above the recommended levels, then the system 10 may adjust recommend levels down or up that standard deviation. Performing these steps helps ensure that the IAQ system 10 is calibrated to the specific structure 100, while being within recommended levels that are provided by the groups. This reduces false alarms and too many alarms, which allows the system 10 to run more efficiently. For example, if the environmental data from the structure 100 suggests that all levels of the components are well within the recommended levels, then set the thresholds at the recommended levels would not provide any useful information and the IAQ system 10 would rarely turn ON, if at all. On the other hand, if the environmental data from the structure 100 suggests that all levels of the components are not within the recommended levels, then set the thresholds based only on the data from the structure 100 would not be very helpful to aid the user in correcting their air quality. Thus, the IAQ system 10 utilizes both the environmental data collected from the structure along with the recommended levels data to provide the most accurate threshold ranges.

In a further alternative, the predetermined threshold range(s) or value(s) may be based on data collected over a predefined amount of time by systems 10 that have been deployed across the country. The collected data can then be analyzed in connection with the recommended levels, which are set forth by various regulatory bodies, government agencies, private groups, or standard setting bodies. Based on this comparison, the system 10 may adjust the predetermined threshold range(s) or value(s). It should be understood that the predetermined threshold range(s) or value(s) may differ on a region, state, city, or neighborhood basis. For example, the analysis of the collected data and the threshold range(s) may suggest that a IAQ system 10 that is located within Downtown, Los Angeles should have different range(s) then system 10 that are installed in: (i) Malibu, California, (ii) Tahoe, California, Oregon, or (iv) within the northwester part of the U.S. Based on this analysis, the system 10 can adjust the range(s) or value(s) to account for these differences. In other words, the system 10 may have one set of range(s) or value(s) for a system 10 located within Downtown, Los Angeles and another set of range(s) or value(s) for a system 10 located within Portland, Oregon. In an even further alternative, the predetermined threshold range(s) or value(s) may be set or modified by the user.

c) Power Control Module

Figure 10B:
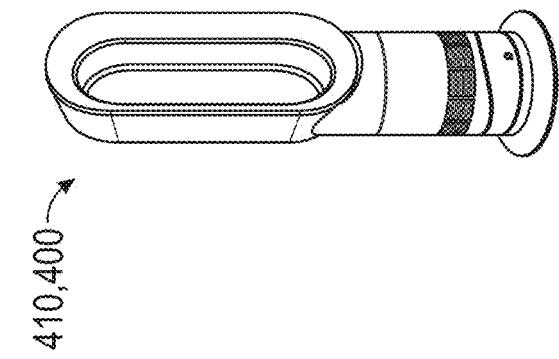
FIGS. 10A-10B are exemplary non-connected appliances that require additional hardware to communicate with the IAQ system, such additional hardware includes the monitoring device shown in FIGS. 4A-4D.
Figure 10A:
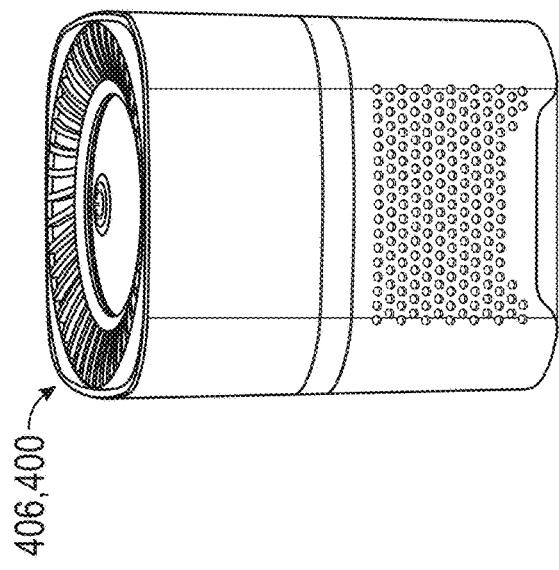
Figure 9:
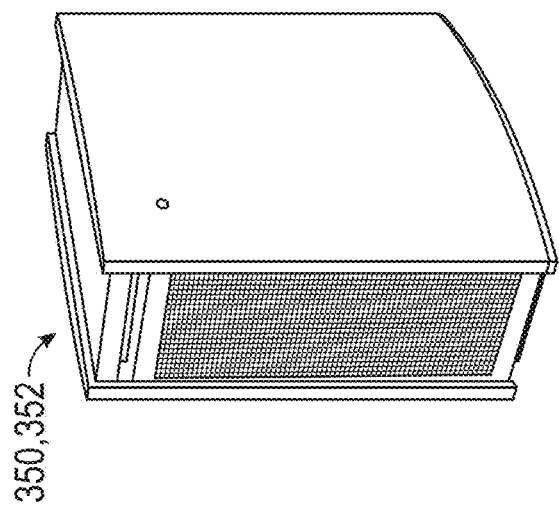
FIG. 9 is an exemplary non-connected appliance that requires additional hardware to communicate with the IAQ system, such additional hardware includes the monitoring device shown in FIG. 7.

The monitoring devices 102 include a power control module 206, which controls the power of the monitoring devices 102 and any non-connected appliance 400 that is connected to the monitoring devices 102. This module 206 allows the user and/or IAQ system 10 to turn ON/OFF the power supplied to an appliance 106, which is connected to the monitoring devices 102. In other words, this module 206 allows the IAQ system 10 to control non-connected appliances 400 using the monitoring devices 102. Examples of non-connected appliances are shown in FIGS. 9, 10A and 10B.

d) Location Module

The monitoring device 102 includes a location module 208 that aids the IAQ system 10 in determining the location of the monitoring device 102 within the structure 100 and what appliances 106 are positioned near or adjacent to the monitoring device 102. This locational information aids the IAQ system 10 in determining the steps necessary to return a level contained within the environmental data back to the predetermined threshold range. The location module 208 is configured to determine the location of the monitoring devices 102: (i) based on the information entered by the authorized user, (ii) using an indoor positioning system, (iii) using an absolute locating system, or (iv) a hybrid system. In a first embodiment, the location module 208 may determine the location of the monitoring device 102 and the appliances 106 are positioned nearby based on inputs from the user. Specifically, the IAQ system 10 may utilize an application that is installed on an Internet enabled device to provide the user with a number of questions about the structure 100. For example, the application may ask generic questions about the structure 100, which may include: i) number of bedrooms/bathrooms, ii) square footage of the structure, iii) which bathrooms are connected to bedrooms, iv) closest bathroom to the kitchen, v) how many levels does the structure have, vi) rough room dimensions, vii) other questions geared to determining the rough layout of the structure 100, and viii) other similar questions. Next, the application may ask the user about the location of the devices within the structure 100. For example, the application may ask generic questions about the location of the monitoring devices 102 and appliances 106, which may include: i) is the monitoring device 102 located within the master bedroom or kitchen. Next, the application may ask the user for information about the appliances 106. For example, the application may ask the user the CFM rating of the bathroom fan or the range hood. Once all of this information is inputted into the application by the user, the IAQ system 10 may ask the user which appliance 106 should be turned on when a specific monitoring device 106 measures a level that is outside of a predetermined threshold range.

In an alternative embodiment, the locating module 208 may utilized indoor positioning sensors that are built into each appliance 106 or maybe temporally attached to appliances 106. For example, upon purchasing the IAQ system 10, the user may be provided with a number of indoor positioning sensors that can be temporally attached to non-connected appliances 400. Specifically, indoor positioning sensors may utilize one or a combination of the following technologies: i) magnetic positioning, ii) GPS along with dead reckoning, iii) positioning using visual markers (e.g., use of the camera that is built into the monitoring unit 102), iv) visible light communication devices, v) infrared systems, vi) wireless technologies (e.g., Wi-Fi positioning system, Bluetooth Low Energy ("BLE"), iBeacon, other beacon technology, received signal strength, ultra wide-band technologies, RFID), or vii) other methods discussed in the papers that were attached to U.S. Provisional Application No. 62/789,501. The user then may be instructed to attach these sensors to these non-connected appliances 400. Once these sensors are in place and the connected devices and monitoring devices 104 are turned on, the IAQ system 10 can determine which devices are closest to each monitoring device 102 along with the relative positioning of the monitoring devices 104 to one another. Based on this relative location, the IAQ system 10 can then ask the user for additional information about the functionality of each device and additional information about the room layouts. Once this information is entered into the IAQ system 10, the IAQ system 10 will be able to determine the steps necessary to return a level contained within the environmental data back to the predetermined threshold range.

In a further alternative embodiment, the locating module 208 may utilize sensors that can provide the absolute location of each monitoring unit 102 and appliance 106 within the structure 100. The absolute location system may require a user to upload a map of the structure 100 to the local server/database 110. This map of the structure 100 may be generated based on: i) blueprints of the structure 100 or ii) determined by a device that is capable of mapping the structure 100 after the structure 100 was built. Such devices include software programs that can be loaded on a cellular phone or a robotic vacuum. In a particular example, the user may utilize a robotic vacuum to map the structure 100. Once the structure 100 is mapped, the robotic vacuum can upload the map to the local server/database 110. The IAQ system 10 can then place the monitoring devices 102 and the appliances 106 within the structure 100 based on the readings from indoor positioning systems. Once the IAQ system 10 has placed the monitoring devices 102 and the appliances 106 within the structure 100, the user can then login to the local server/database 110 using an internet enabled device and can confirm their position. In an even further embodiment, the locating module 208 may use any combination of the methods described above. For example, the IAQ system 10 may ask the user a number of questions and then use the indoor positioning system in the above described embodiments.

e) Connectivity Module

The connectivity module 210 is a module that enables the monitoring unit 102 to send data to another device, such as the local server/database 110 or the central unit 104. The connectivity module 210 may use any one, or combination, of the following wireless or wired technologies/communication protocols: Bluetooth (e.g., Bluetooth version 5), ZigBee, Wi-Fi (e.g., 802.11a, b, g, n), Wi-Fi Max (e.g., 802.16e), Digital Enhanced Cordless Telecommunications (DECT), cellular communication technologies (e.g., CDMA-1X, UMTS/HSDPA, GSM/GPRS, TDMA/EDGE, EV/DO, or LTE), near field communication (NFC), Ethernet (e.g., 802.3) FireWire, BLE, ZigBee, Z-Wave, 6LoWPAN, Thread, WIFI-ah, RFID, SigFox, LoRaWAN, Ingenu, Weightless, ANT, DigiMesh, MiWi, Dash7, WirelessHART, advanced message queuing, data distribution service, message queue telemetry transport, IFTTT, inter-integrated circuit, serial peripheral interface bus, RS-232, RS485, universal asynchronous receiver transmitter, USB, powerline network protocols, a custom designed wired or wireless communication technology, or any type of technologies/communication protocol listed within the papers that were attached to U.S. Provisional Application No. 62/789,501.

Using any one of the above technologies/communication protocols, the environment data that is collected by the monitoring unit 102 may be sent to a device outside of the monitoring unit 102 in at least three different ways. The first way is where the monitoring device 102 will only send the environment data at a predefined time interval. This predefined time interval (e.g., 30 seconds, 1 minute, 3 minutes, 5 minutes, 10 minutes, 30 minutes, every hour, every 24 hours, or anytime therebetween) may be preprogrammed into the IAQ system 10 or may be set by the user. It should be understood that in this method, the monitoring device 102 does not perform any calculations and instead raw sensor data is simply sent from the monitoring device 102 to the central unit 104 or the local server/database 110 for processing. This method is beneficial because it does not require that the monitoring device 102 perform calculations to determine if a level within the environmental data that is outside of the predefined threshold ranges. However, more data may be transmitted outside of the monitoring device 102 and there may be a lag between when an alert event occurs and when the IAQ system 10 detects the alert event.

A second way of sending environment data to a device that is outside of the monitoring device 102 is where the monitoring device 102 sends data only when an alert event occurs. In this method, the monitoring device 102 must have capabilities sufficient to process the raw data collected by the sensor 200 in order to determine if a level that is within the environmental data is outside of the predefined threshold range(s) or value(s). Upon making a determination that a level within the environmental data that is outside of the predefined threshold ranges, the monitoring device 102 sends this alert data to the central unit 104 or the local server/database 110 for the IAQ system 10 to perform the next steps. This method is beneficial because it requires the least amount of data to be sent from the monitoring device 102 to another device.

The third way of sending environment data to a device that is outside of the monitoring device 102 is a hybrid of the first and second methods. Specifically, the monitoring device 102: i) sends the environment data at predefined intervals (e.g., 5 minutes, 10 minutes, 30 minutes, every hour, every 24 hours, or anytime therebetween) and ii) sends the environment data when a sensor alert occurs. The hybrid approach requires that the monitoring device 102 send the extra data that is required by the first way and have the additional processing power that is required by the second way. Nevertheless, this hybrid approach avoids the lag time that is described in a first way and allows the user to view historical environmental data that is below the alert level.

f) Other Module(s)

The monitoring devices 102 may include a microphone 214 and other electronic components 218 necessary to allow for voice control of the monitoring devices 102. In addition, the microphone 214 and other electronic components 218 can be used to allow the monitoring device 102 to be controlled or operate with any virtual assistant (e.g., Amazon Alexa, Microsoft Cortana, Google Assistant, Samsung Bixby, Apple Siri, or any other similar virtual assistant). The monitoring devices 102 may also include a status indicator 216, which provides a general indication of the indoor air quality at or near the monitoring devices 102. For example, the monitoring devices 102 may show a red light if the air quality is bad, a green light if the air quality if good, and a yellow light if the air quality is between bad and good.

4) Exemplary Monitoring Devices

FIGS. 3A-5 illustrate exemplary monitoring devices 102 of the IAQ system 10. Specifically, FIGS. 3A-3B show two different embodiments of in-wall monitoring devices 502, 504. These in-wall monitoring devices 502, 504 can be installed in the place of a switch or a power outlet. A limited version of this first embodiment of the in-wall monitoring device 502 is described within U.S. patent application Ser. No. 14/593,883, filed on Jan. 9, 2015, which is herein incorporated by reference. This first embodiment may have limited uses because it takes the place of a light switch; thus, the user loses the ability to control a lighting fixture or fan when using this monitoring device 502. To overcome the limitations associated with the first embodiment 502, the second embodiment 504 can be utilized without losing the ability to control a lighting fixture or fan. One example of where this second embodiment of the in-wall monitoring device 504 may be utilized is in connection with a non-connected appliance 400 (e.g., range hood/exhaust hood, bathroom fan, supply fan, evaporative cooler, air conditioner, HVAC, HRV, ERV, air cycler, air exchanger, CFIS, garage fan, space heaters, dehumidifiers, humidifiers, space heaters, air ionizers, or air purifiers) that are affixed to the structure 100. Specifically, the second embodiment 504 is configured to be wired between an electrical supply for the fan and the fan. This allows the power control module 206 contained within the monitoring device 590 to control whether power is supplied to the fan; thus, controlling when and how long the fan is ON/OFF. Overall, this configuration is desirable because: (i) it allows the IAQ system 10 to control the non-connected appliance 400 (i.e., fan) that are affixed to the structure 100 and (ii) it still allows the user to manually control the fan using the buttons 506. It should be understood that other configurations of these in-wall monitoring devices 502, 504 may be utilized. For example, the in-wall monitoring device may span/include multiple light switches and/or plugs.

FIGS. 4A-4D show four different embodiments of plug-in monitoring devices 540, 542, 544, 546 that are designed to be plugged into an electrical wall outlet 538. In comparison to the in-wall monitoring devices 502, 504, the plug-in monitoring devices 540, 542, 544, 546 are easier to install because they only require a user to plug them into the electrical wall outlet 538 and do not require a user to wire them into an in-wall switching device. Also, in contrast to controlling non-connected appliance 450 (i.e., fan) that are affixed to the structure 100, these plug-in monitoring devices 540, 542, 544, 546 can control non-connected appliances 400 (i.e., dehumidifier, humidifier, space heater, air ionizer, air purifier, portable fan, and other similar devices that circulate/modify the air) that are not affixed to the structure 100.

FIG. 5 shows a battery-powered monitoring device 580. This configuration allows the user to place the monitoring device in the location that they desire without trying to find a plug or light switch. FIG. 6 is an in-line monitoring unit 590. This in-line monitoring unit 590 is configured to be wired between the non-connected appliance 450 (e.g., range hood/exhaust hood, bathroom fan, supply fan, evaporative cooler, air conditioner, HVAC, HRV, ERV, air cycler, air exchanger, CFIS, garage fan, space heater, ceiling fan, dehumidifier, humidifier, space heater, air ionizer, or air purifier) that is affixed to the structure 100. This allows the power control module 206 contained within the monitoring device 590 to control whether power is supplied to the non-connected appliance 450. In some embodiments, the monitoring device 590 includes control wires that tap into the appliances 106 operational centers to enable the monitoring device 590 to control the functionality (e.g., fan speed) of the appliance 106. It should be understood that these are just a few examples of monitoring devices 102, where additional monitoring devices 102 may have different shapes, additional functionality, additional features, and etc.

5) Exemplary Central Unit

FIG. 7 shows a table-based central unit 702. As described above, the central unit 702 contains a display 220, which can be used by the authorized user to review historical or current environmental data, which is/has been collected by the monitoring units 102. In some embodiments, the central unit 702 is battery powered and/or can have all the functionality of a monitoring device 102.

6) Exemplary Connected Appliances

FIGS. 8A-8C show exemplary connected appliances 300 (e.g., range hood/exhaust hood, bathroom fan, supply fan, evaporative cooler, air conditioner, HVAC, HRV, ERV, air cycler, air exchanger, CFIS, garage fan, space heater, ceiling fan, dehumidifier, humidifier, space heater, air ionizer, or air purifier) that contain a CIAQ 50 device and are typically built into the structure. These connected appliances 300 contain circuits that enable the IAQ system 10 to control the operation of these connected appliances 300 without requiring additional devices. Thus, these connected appliances 300 at least contain a connectivity module 210 and a power control module 206. In some embodiments, these connected appliances 300 include all of the modules contained within a monitoring device 102. The inclusion of these additional modules may be beneficial because it provides the local server/database 110 with additional environmental data from other locations within the structure 100. Specifically, FIG. 8A shows a connected bathroom fan 304, while FIG. 8B shows a ceiling fan 308. Additionally, FIG. 8C shows a connected range hood 312, one example of such is partly discussed in U.S. Provisional Application No. 62/772,724, filed on Nov. 29, 2018, which is hereby incorporated by reference.

FIG. 9 shows exemplary connected appliances 350 that include a CIAQ 50 device and are typically not built into the structure. Like the above described built-in connected appliances 300, these non-built-in connected appliances 300 contain circuits that enable the IAQ system 10 to control the operation of these connected appliances. Specifically, FIG. 9 shows a connected air ionizer 352.

7) Non-Exemplary Connected Appliances

FIGS. 10A-10B show exemplary non-connected appliances 400 that are typically not built-in the structure or are portable. These non-connected appliances 400, such as a portable humidifier 406 and a fan 410, cannot communicate with the system 10 and therefore need a device that allows the system 10 to control these non-connected appliances 400. Examples of CIAQ devices 50 that are designed to control these non-connected appliances 400 have been discussed above in connection with the monitoring devices 102. Specifically, the in-wall monitoring device 504, the plug-in monitoring device 540, 542, 544, 546, and the in-line device 590 can be used to control non-connected appliances 400. Here, because both of these exemplary non-connected appliances 400 are portable and can be plugged into an electrical outlet, the user would likely utilize one of the plug-in monitoring device 540, 542, 544, 546 to control these devices 406, 410.

Figure 12:
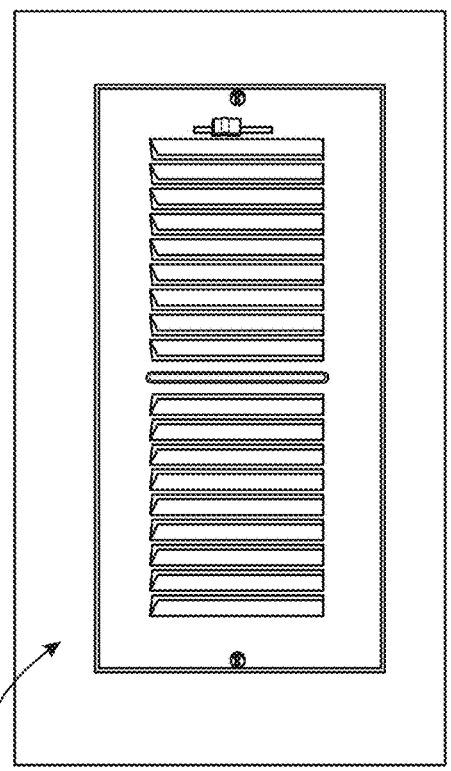
FIG. 12 is an exemplary ventilation grill that can be retrofitted to enable the IAQ system to control air output through the grill.
Figure 11:
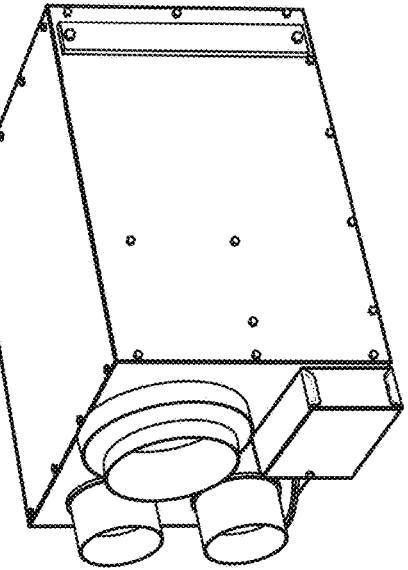
FIG. 11 is an exemplary non-connected appliance that requires additional hardware to communicate with the IAQ system, such additional hardware includes the monitoring device shown in FIG. 7.

FIGS. 11-12 show exemplary non-connected appliances 450 that are built into the structure 100, such as a supply fan 454 and an air vent 458. Due to the configuration of built-in non-connected appliances 450, a CIAQ device 50 that is simply a controller may be utilized to connect these devices to the system 10. The controller is similar to the monitoring device 102 because it can communicate with the IAQ system 10 and be used to control a non-connected appliance 400. However, unlike the monitoring device 102, the controller does not contain sensors or most of the modules contained within the monitoring devices 102. Instead, the controller merely includes a connectivity module 210 and a power control module 206. By only containing these two modules, the controller can be smaller, may be designed to be retro-fitted into existing non-connected devices 450, and can be utilized in locations where sensor data is not desired.

8) Local Server/Database

Typically, all environmental data that is generated by the IAQ system 10 passes through a wired and/or wireless network to the local server/database 110 that is accessible using an internet enabled device. The local server/database 110 may store the following information: i) maps of the structure 100, ii) location of the monitoring units 102, central units 104, appliances 106 within the structure and their capabilities (e.g., a fan that can move 300 CFM), iii) physical information about each part (e.g., room) of the structure 100, such as air volume, types of items contained with the part of the structure, ducting and etc., iv) occupant usage information about each part of the structure 100, such as when that part is most used, by how many people or pets, v) baseline environmental data for each part of the structure 100, vi) historical environmental data. The information listed above can be obtained by the local server/database 110 through various means. For example, the local server/database 110 may obtain a map of the structure 100 by pulling this information from a robot vacuum, while the occupant usage information may be obtained from the sensors that are housed within the monitoring devices 102 and/or the central unit 104. It should be understood that the term local server/database refers to a server/database that is local in the terms of its association to the structure 100 and is not local in terms of physical location. In other words, the local server/database 110 is not physically located with the structure 100 and can be physically located anywhere in the world that is accessible via the internet.

Some or all of the above information will be used by the local server/database 110 as inputs to either a basic algorithm or a learning algorithm in order to determine: i) which appliance 106 to turn ON, ii) when to turn the appliance 106 on, and iii) how long to keep the appliance 106 ON. The basic algorithm may utilize a preset table that is contained within the local server/database 110 to make its determinations. For example, if a $CO_2$ alert is detected, the preset table will instruct the local server/database 110 to avoid circulating air from the basement into the rest of the structure 100. Instead, the preset table will instruct the IAQ system 10 to turn ON the ventilation devices (e.g., bathroom fan) that are contained within the basement in order to vent the $CO_2$ outside of the structure 100. Another example is if the IAQ system 10 determines a localized humidity alert in the bathroom, the preset table will instruct the IAQ system 10 to only turn ON the local bathroom fan and will not turn ON the HVAC system. However, if the humidity alert is not localized to the bathroom, then the preset table will instruct the IAQ system 10 to turn ON a large dehumidifier or run the HVAC system.

Alternatively, the IAQ system 10 may utilize a learning algorithm to make its determinations. Specifically, this learning algorithm will be trained using mock structure 100 setups. This training may be done from the factory or maybe done after the user buys and installs the system within the structure 100. Training at the factory may be easier to accomplish because a trained algorithm can simply be installed on the IAQ system 10 prior to shipment. However, training at the factory may be less accurate in comparison to training the system after its bought and installed within the structure 100 because training within the structure 100 will be tailored to that structure 100. Training within the structure 100 may first require that the user set up the system and provide all information about the monitoring devices 102, central units 104 and the appliances 106. Once this information is entered into the IAQ system 10, the local server/database 110 can be trained using a preset algorithm to start from and continue training itself using various mocked up conditions for the specific structure 100. A person from the factory can oversee the training of the algorithm to ensure that the system 10 is making the proper selections and/or to correct the system's 10 selections.

In other embodiments, the IAQ system 10 may be able to determine that sufficient environmental data is not being collected from certain regions of the structure 100. In response to this determination, the IAQ system 10 will suggest that the user add more monitoring devices 102 within those locations. In addition, the IAQ system 10 may also suggest relocating various appliances 106 into other locations or adding more appliances 106 within the structure 100 to maximize the air quality. In other embodiments, the IAQ system 10 may be able to determine where the structure 100 lacks proper airflow. The IAQ system 10 then may propose solutions to correct for this lack of proper airflow.

9) Alerting Device

The alerting device 114 is an electronic device that can receive messages from the IAQ system 10 and more particularly the devices shown in FIGS. 1A-1G. Examples of alerting devices 114 include, but are not limited to: i) cellular phones, ii) computers (e.g., laptops or desktops), iii) tablets, iv) smartwatches, or v) devices that are designed to be alerting devices 114. The alerting device 114 includes a software application that is installed thereon, which allows the alerting device 114 to display any information that is generated by the other components of the IAQ system 10 or any information that may be of use to the user. Such information may include, but is not limited to: i) displaying location, time, duration, and type of alert, ii) current levels of the environmental data and their associated ranges, iii) historical levels of the environmental data and their associated ranges, iv) comparisons of one structures current environmental data against historical environmental data collected from: a) this specific structure, b) other structures within the same neighborhood, c) other structures within the same area or zip code, d) other structures within the same region, e) other structures within the same country, and f) all the structures around the world, v) comparisons of one structures 101 current environmental data against current environmental data collected from: a) other structures within the same neighborhood, b) other structures within the same area or zip code, c) other structures within the same region, d) other structures within the same country, and e) all the structures around the world. The alerting device 114 may also display recommend appliances 106 to buy or how to reconfigure a user's current appliances 106 in order to maximize the air quality within the structure 100. In addition, the alerting device may also display information about environmental conditions outside of the structure 100.

10) Exemplary System within a Structure

Figure 13:
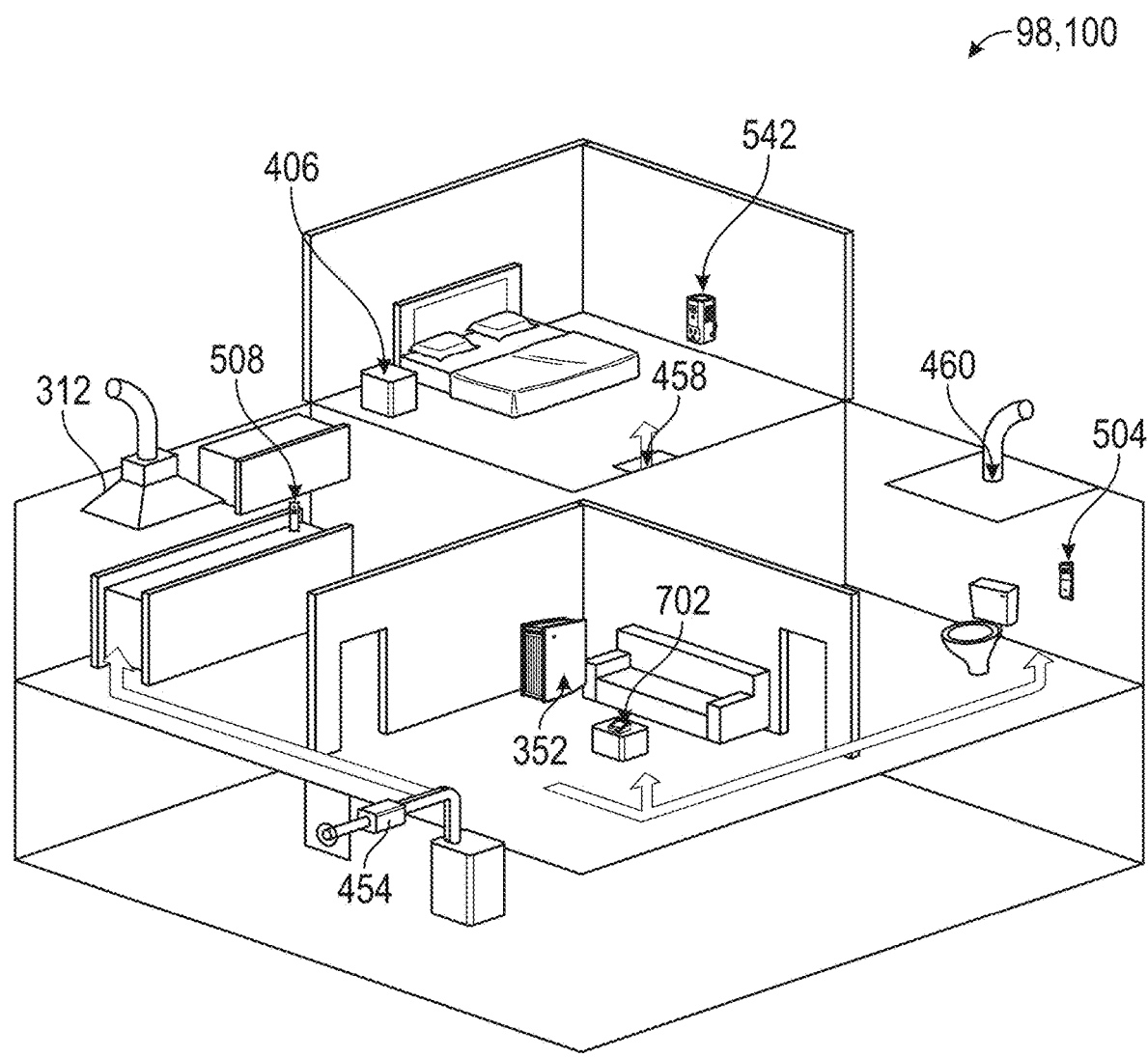
FIG. 13 is a partial cut-away view of an operating environment, which contains one of the exemplary IAQ systems shown in FIGS. 1A-1G.

FIG. 13 is a partial cut-away view of an operating environment 98, which contains one of the exemplary systems 10 shown in FIGS. 1A-1G. Specifically, this exemplary IAQ system 10 includes: (i) in-wall monitoring device 504, (ii) plug-in monitoring device 542, (iii) potable monitoring device 580, (iv) central unit 702, (v) connected range hood 312, (vi) connected air ionizer 352, (vii) non-connected humidifier 406, (viii) non-connected supply fan 454, and (ix) non-connected bathroom fan 460. It should be understood that this is only exemplary and other configurations of the operating environments 98 are contemplated by this disclosure. FIGS. 14-34 describe logging in/setting up an account for this exemplary structure 100 that is shown in FIG. 13 and connecting an appliance 106 to the system 10. Once the step up is finished, FIGS. 35-55 shows how this exemplary system 10 reacts to various sets of conditions.

11) Configuration of the System within a Structure

Figure 19:
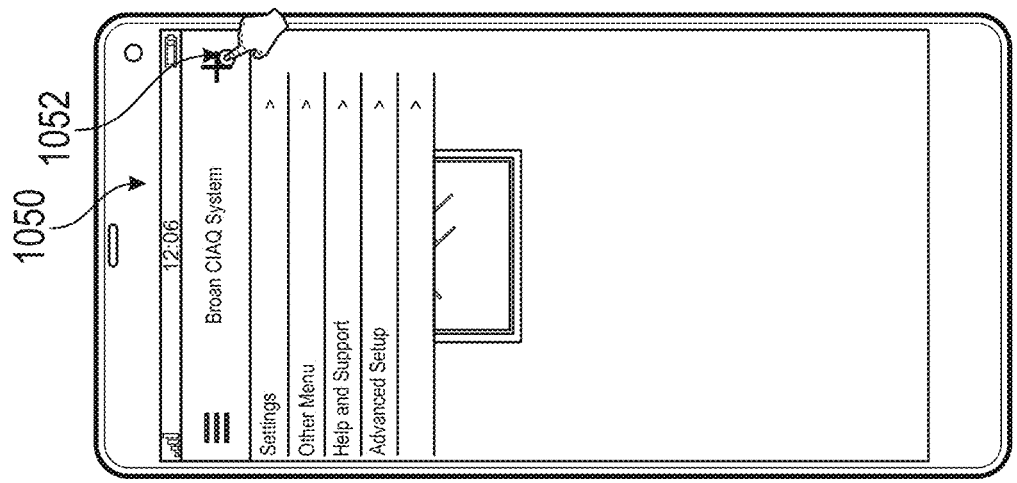
Figure 18:
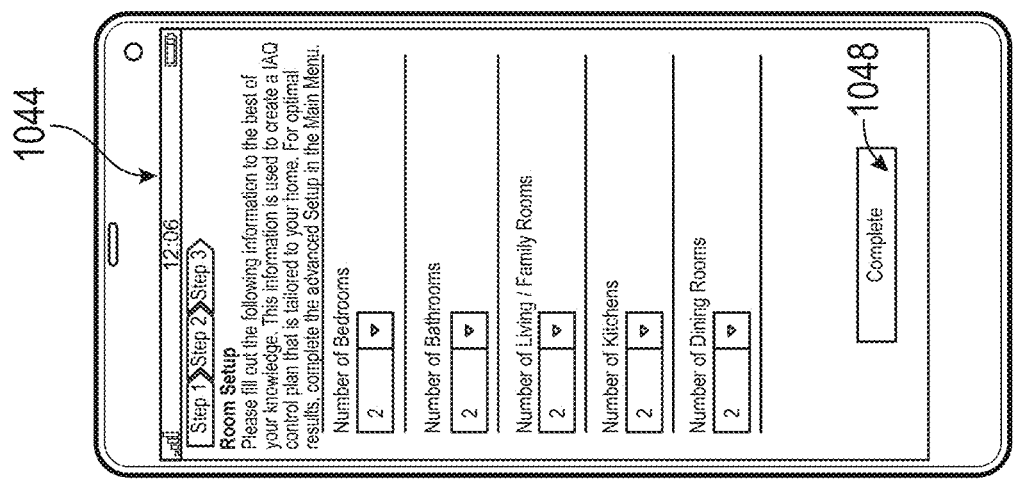
Figure 17:
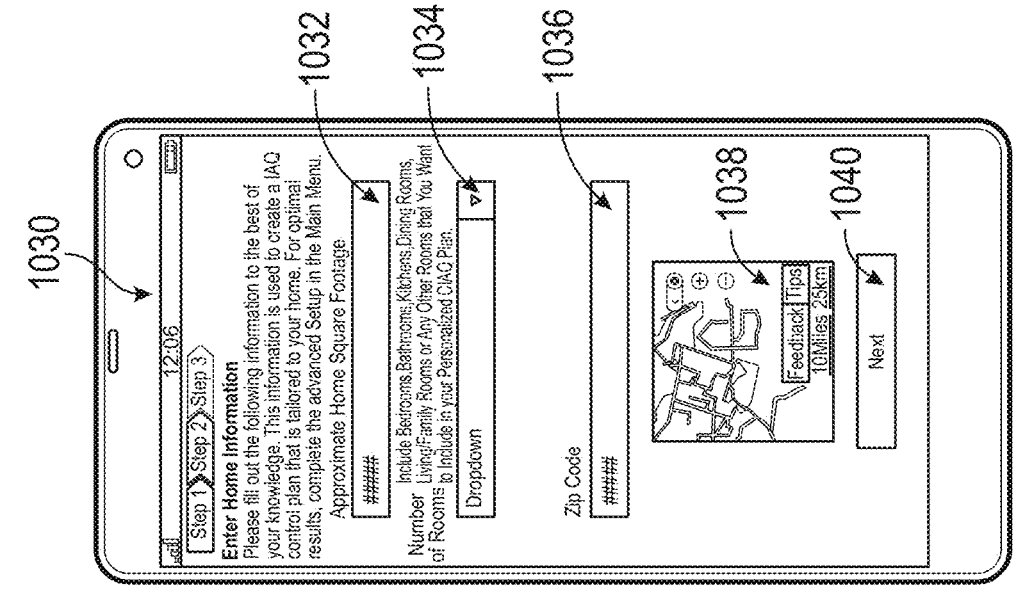

FIG. 14 shows a landing screen 1010 contained within a GUI 1000. The landing screen 1010 allows a user to: (i) sign into their account by entering their email 1012 an password 1014 and pressing the sign-in button 1016 (shown in FIG. 15) or (ii) create a new account by pressing the new account button 1018. If the user signs into their account then screen 1022, 1030, 1044 shown in FIGS. 16-18 are skipped and the screen that is shown in FIG. 19 is displayed. Alternatively, if the user presses the new account button 1018, then the screen 1022, shown in FIG. 16, is displayed within the GUI 1000. Specifically, screen 1022 allows the user to enter their email 1024, the password 1026 and a confirmation code 1028. Once this information is entered into the system 10, the system 10 creates an account for the user. Next, system 10 displays screen 1030, which includes questions about the structure 100. Such prompts may include: (i) approximate home square footage 1032, (ii) number of rooms 1034, and (iii) zip code 1036. In response to this information, the GUI 1000 may display a map 1038 of the neighborhood that surrounds the user's structure 100. After this information is entered into the system 10, the user presses the next button 1040.

The system 10 then takes the number of rooms entered by the user on screen 1030 and attempts to estimate the breakdown of the rooms in connection with screen 1044, which is shown in FIG. 18. Once the systems 10 estimates is shown in connection with screen 1044, the user can alter the breakdown of the rooms. For example, the user can inform the system 10 that the structure only has 1 kitchen and not 2 kitchens. Once the user is finished confirming the room breakdown, the user can select the complete button 1048. The selection of the complete button 1048 finishes the first part of setting up the system 10. The next part of setting up the system 10 is shown in connection with FIGS. 19-32, which will be discussed in greater detail below.

FIG. 19 shows the splash screen 1050 that is displayed within the GUI 1000 after: (i) signing into the system 10 and (ii) a structure 1000 has been set up (e.g., screens 1022, 1030, and 1044 have been completed). To set up a room within the structure 100, the user can press the "+" sign 1052 on screen 1050. Pressing button 1052, displays screen 1058 that is shown in FIG. 20. Specifically, screen 1058 is the first device/room setup screen. Here, screen 1058 allows the user to select one of the rooms (e.g., kitchen, living room, bedroom, bathroom) of the structure 100 using the dropdown 1060, select a device CIAQ device 50 (e.g., in-wall monitoring device 504, plug-in monitoring device 540, in-line monitoring device 590, etc.) using dropdown 1062, a primary appliance 106 (e.g., non-connected bathroom fan 460) using dropdown 1064, a secondary appliance 106 (e.g., supply fan 454) using dropdown 1066, and a configuration type using the checkboxes 1068. Once these selections have been made by the user, then the user can select the "OK" button 1070 to move to the next screen 1076.

Figure 23:
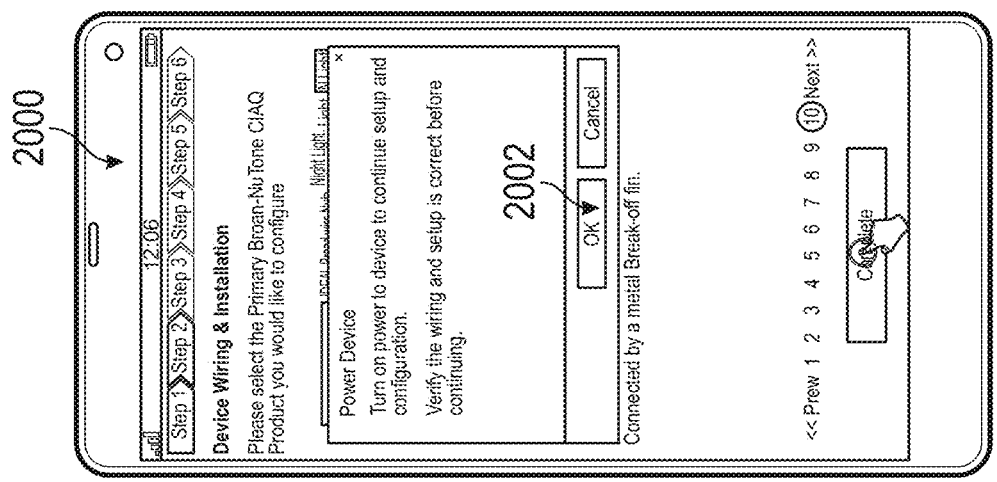
Figure 22B:
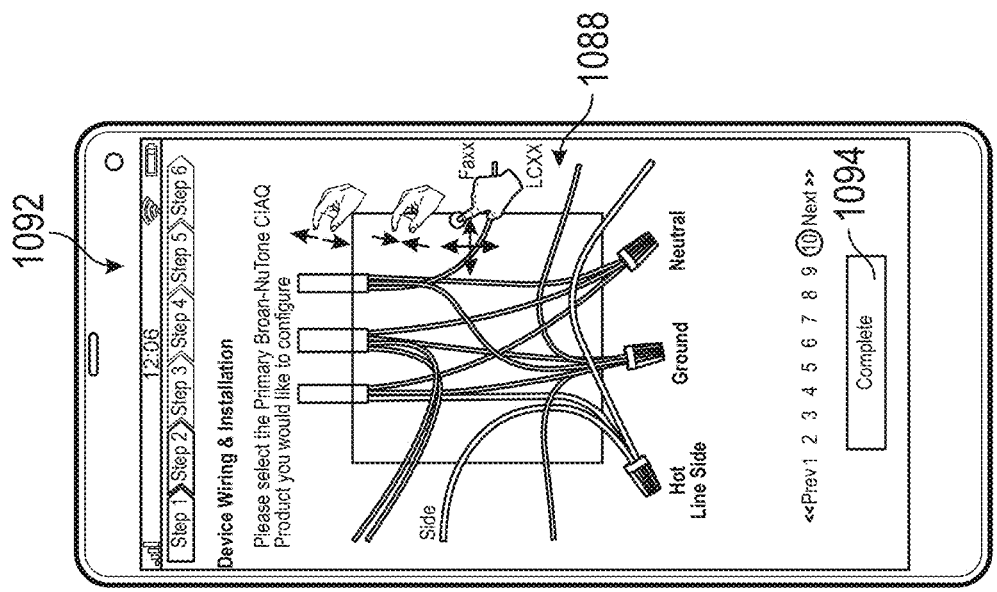
Figure 27:
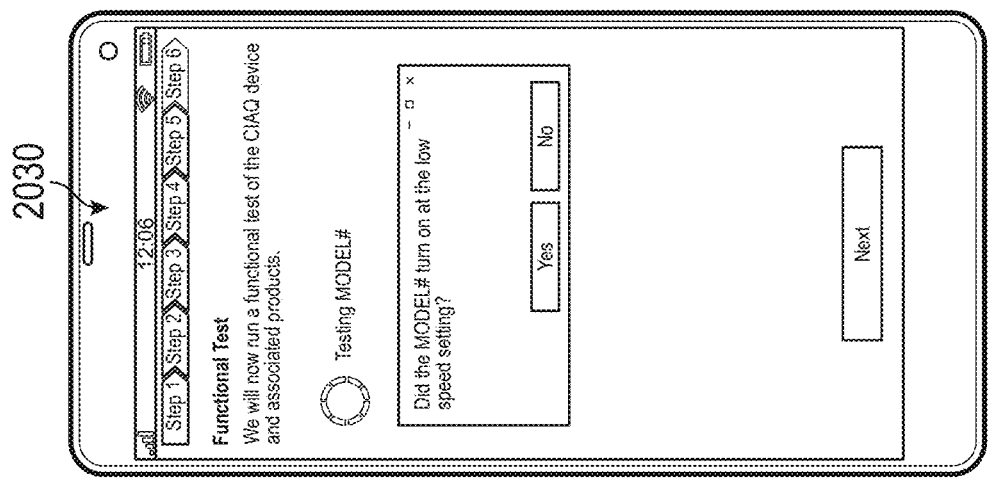
Figure 26:
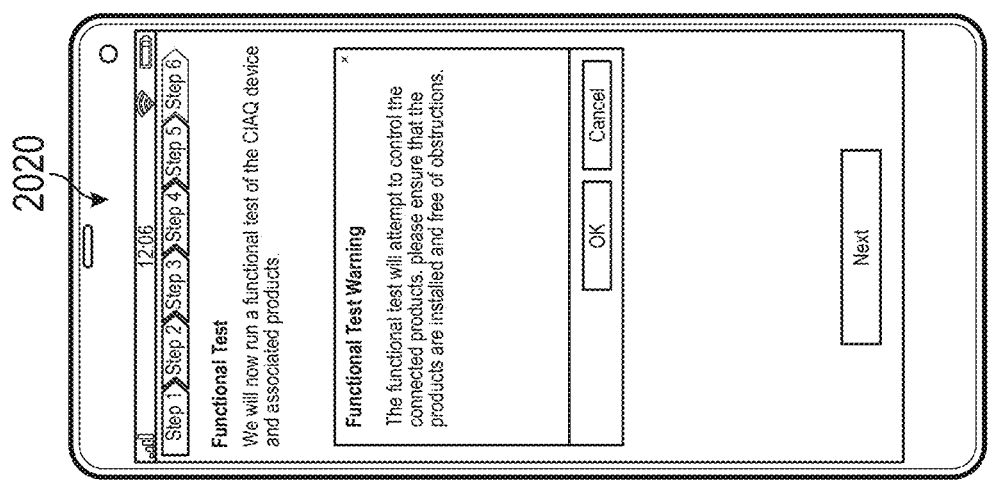
Figure 25:
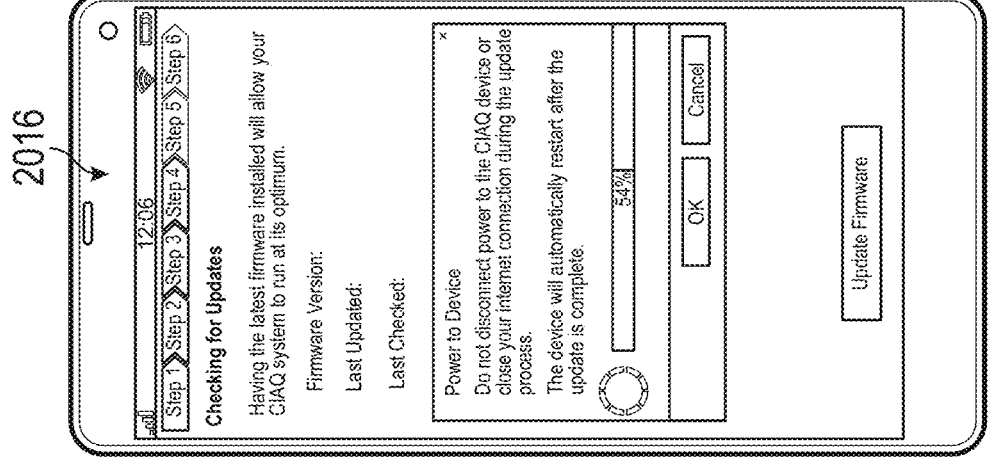
Figure 30:
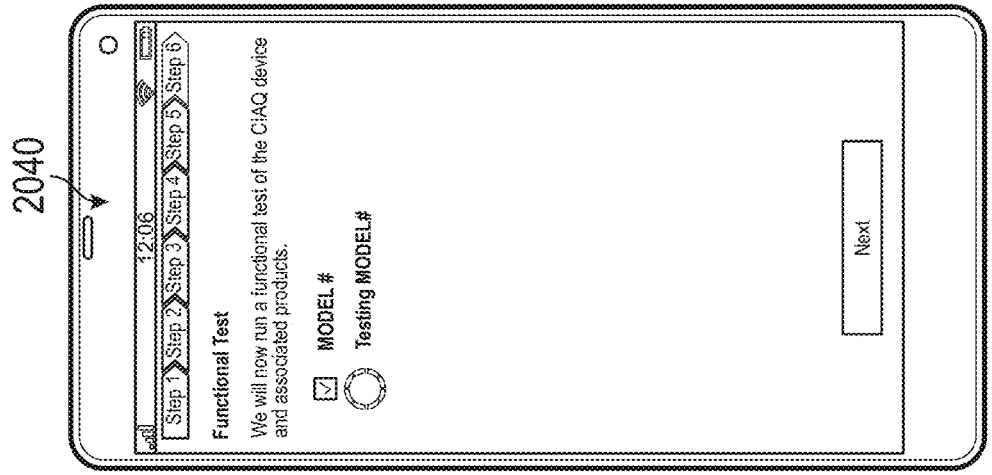
Figure 29:
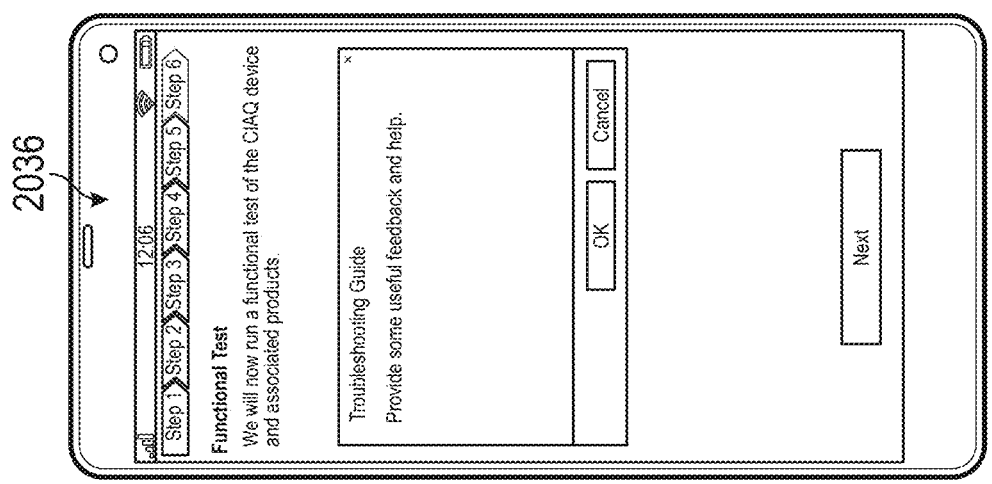

FIG. 21 shows screen 1076, which displays the second step in configuring the device/room. In particular, this screen 1076 shows multiple steps in the installation of the primary appliance 106 (e.g., non-connected bathroom fan 460) that was selected in connection with screen 1058. Here, a few exemplary screens from these steps are shown in FIGS. 21-22B. Specifically, FIG. 21 shows screen 1076 that includes a warning label 1082, while FIG. 22A-22B shows screens 1086, 1088 that include wiring diagrams 1088. Once the user has finished wiring the primary appliance 106 into the structure 100, the user may press the complete button 1094 to bring the user to screen 2000 that is shown in FIG. 23. Next, the GUI 1000 instructs the user to power on the primary appliance 106 to ensure that it is working. The use can confirm that the primary appliance 106 is working by pressing the "OK" button in 2002 in connection with screen 2000.

Figure 24:
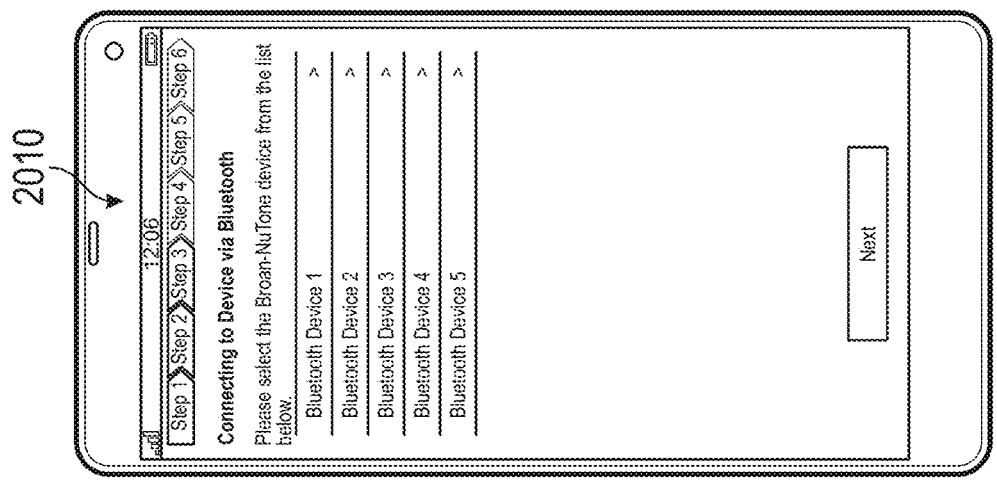
Figure 28:
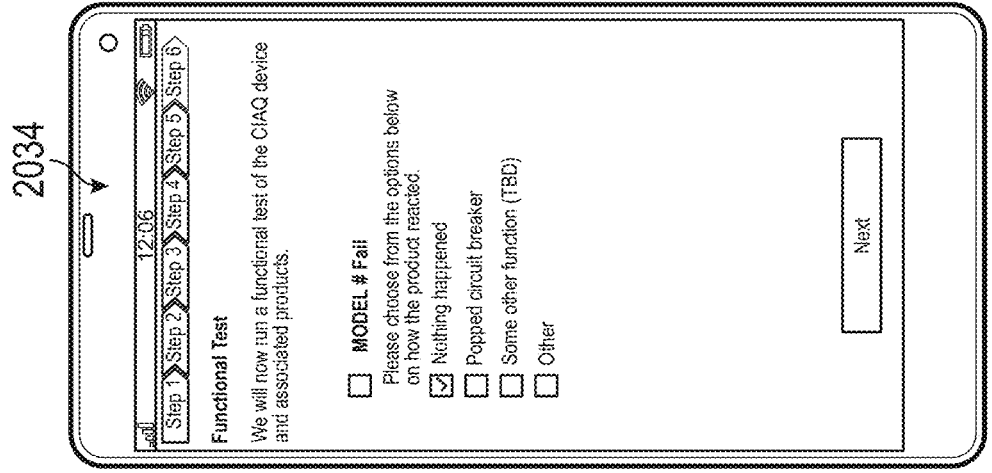
Figure 33:
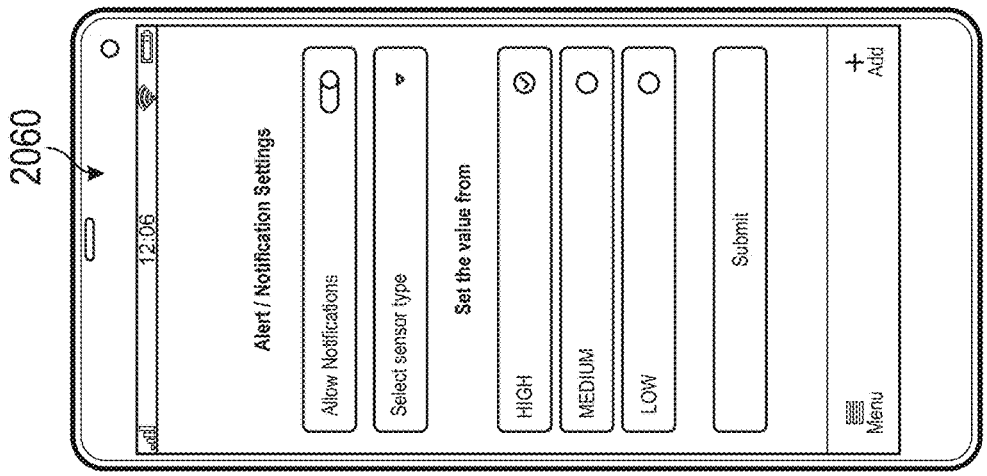
FIG. 33 shows a screen, contained within the GUI, that allows the authorized user to set up alert notifications.
Figure 32:
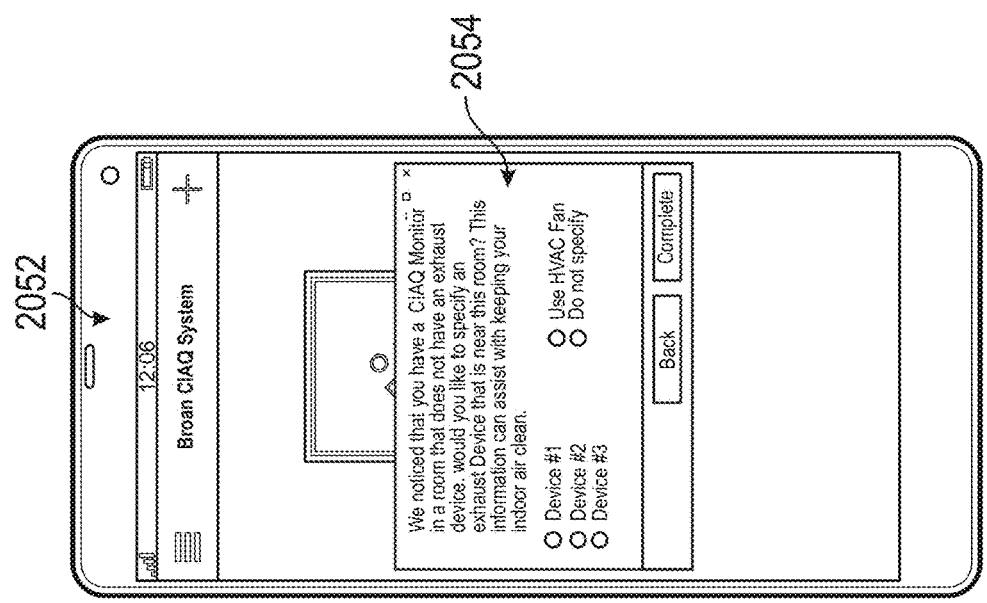
Figure 31:
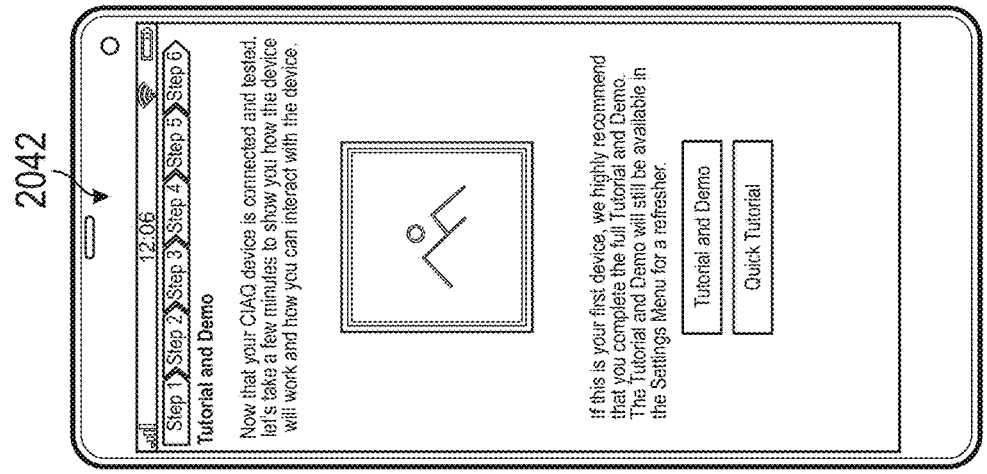
Figure 35:
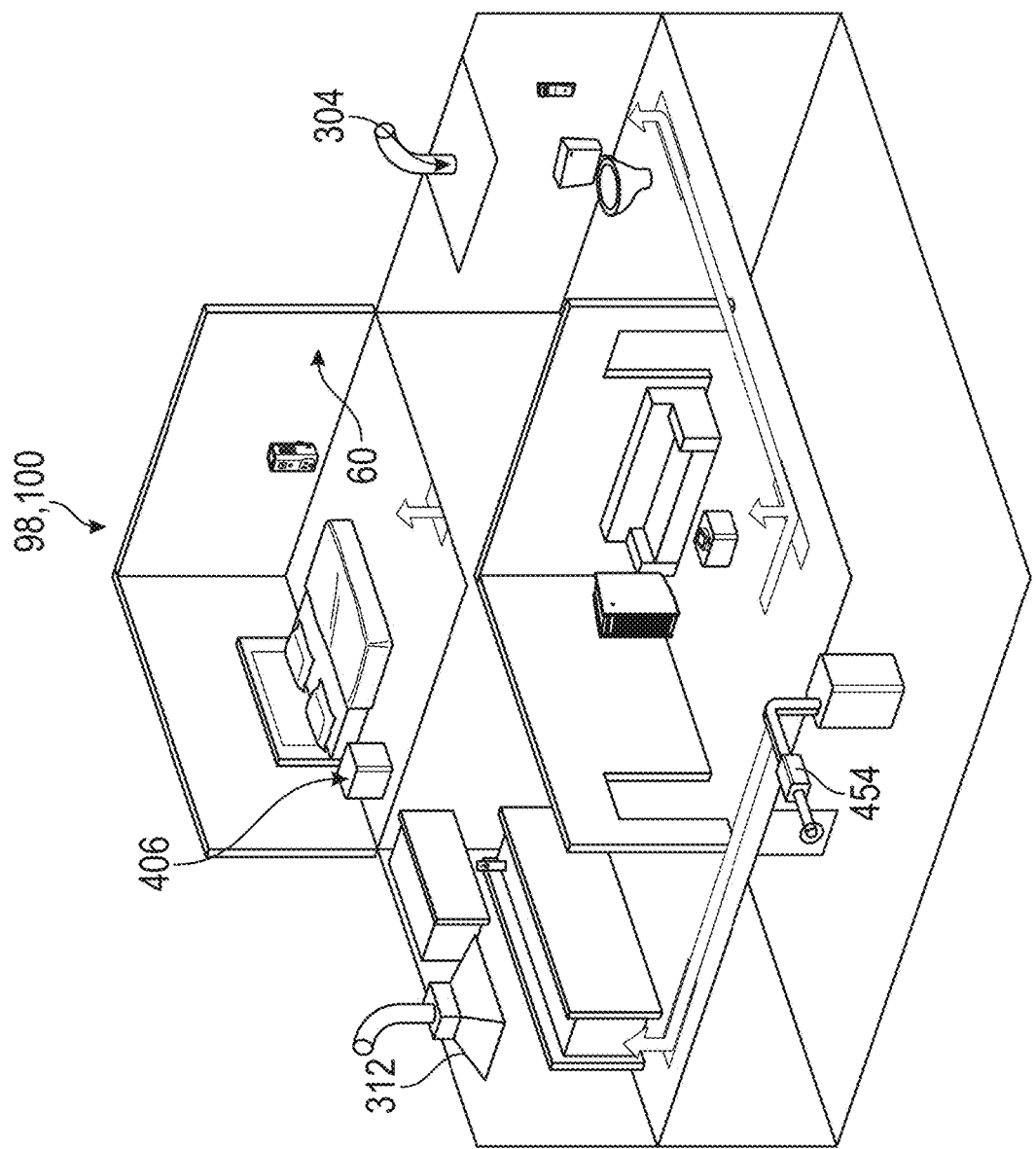
Figure 34:
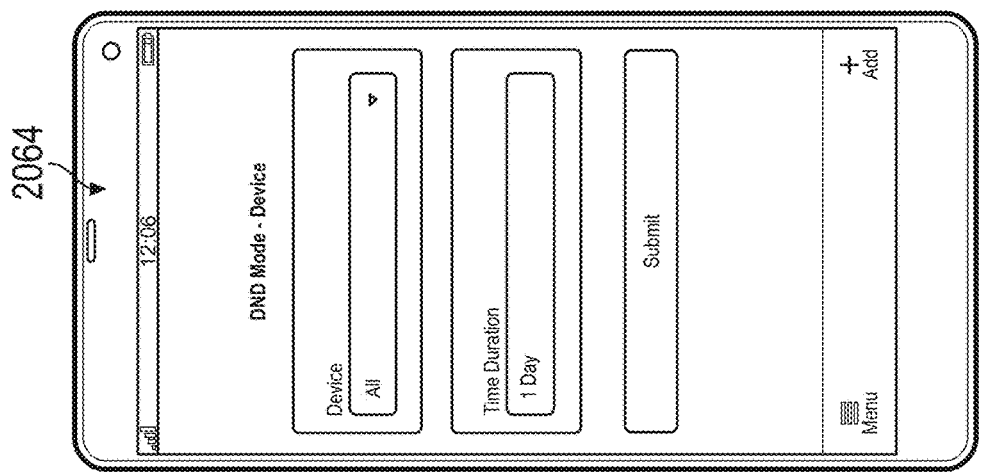
FIG. 34 shows a screen, contained within the GUI, that allows the authorized user to set the IAQ system in a do not disturb mode.

Pressing the "OK" button 2002 brings the user to the third step in configuring the device/room, which is shown in connection with FIG. 24. Specifically, FIG. 24 shows screen 2010, which requests that the user select the CIAQ device 50 that is connected to the primary appliance 106 by selecting one of the CIAQ devices 50 from a plurality of CIAQ devices 50. Once the internet enabled device that is running the GUI 1000 is connected to the CIAQ device 50, the system 10 checks to see if the CIAQ device 50 is updated in connection with screen 2016 shown in FIG. 25. Once the CIAQ 50 device is updated, the system 10, will attempt to control the primary appliance 106 in connection with the screen 2020 shown in FIG. 26. The system 10 then requests that the user confirm the operation of the primary appliance 106 in connection with the screen 2030 shown in FIG. 27. If the test fails, then screen 2034 shown in FIG. 28 is displayed along with a trouble shooting screen 2038 shown in FIG. 29. Alternatively, if the system 10 passes the test, screen 2040 is displayed in connection with FIG. 30. The GUI 1000 finally display the screen 2042 that allows the user to display a tutorial/demo or take a quick tutorial.

Alternatively, if the user sets up a CIAQ device 50 that is located within a room that does not have an appliance 106, the system 10 will ask the user to select an appliance 106 that should be utilized when an alert event occurs in connection with screen 2050. The user selects this appliance 106 by selecting one of the radial buttons 2054 that are positioned adjacent to the names of the appliances 106. It should be understood that alternative methods of determining which appliance 106 should be triggered are discussed in greater detail in other parts of this application. Other screens 2060 and 2064 that show other functionalities that are associated with the GUI are displayed in connection with FIGS. 33-34. For example, screen 2060 shows that the user can set the frequency and threshold level required for an alert to be sent to the user's alerting device 114. Additionally, screen 2064 shows how a user can place the system 10 in a do not disturb mode, which instructs the system 10 not to perform any tasks. It should be understood that only exemplary screens contained within the steps of configuring the device/room were displayed in connection with FIGS. 14-34 and as such additional screens are utilized to set up this system 10.

12) Operation of the System Under Different Sets of Conditions

FIGS. 35-55 illustrate partial cut-away views of operating environments 98, which contain the exemplary IAQ system 10 and are operating under various sets of conditions. Specifically, these scenarios show how the IAQ system 10 works when the IAQ system 10 is exposed to various conditions. At a high level, these scenarios display that the IAQ system 10 understands the configuration of the structure 100, the location of the devices 102, 104, and 106 within the structure 100, and that the IAQ system 10 can determine which appliance 106 should be utilized to bring the levels contained within the environmental data back within the predetermined threshold range.

Figure 36:
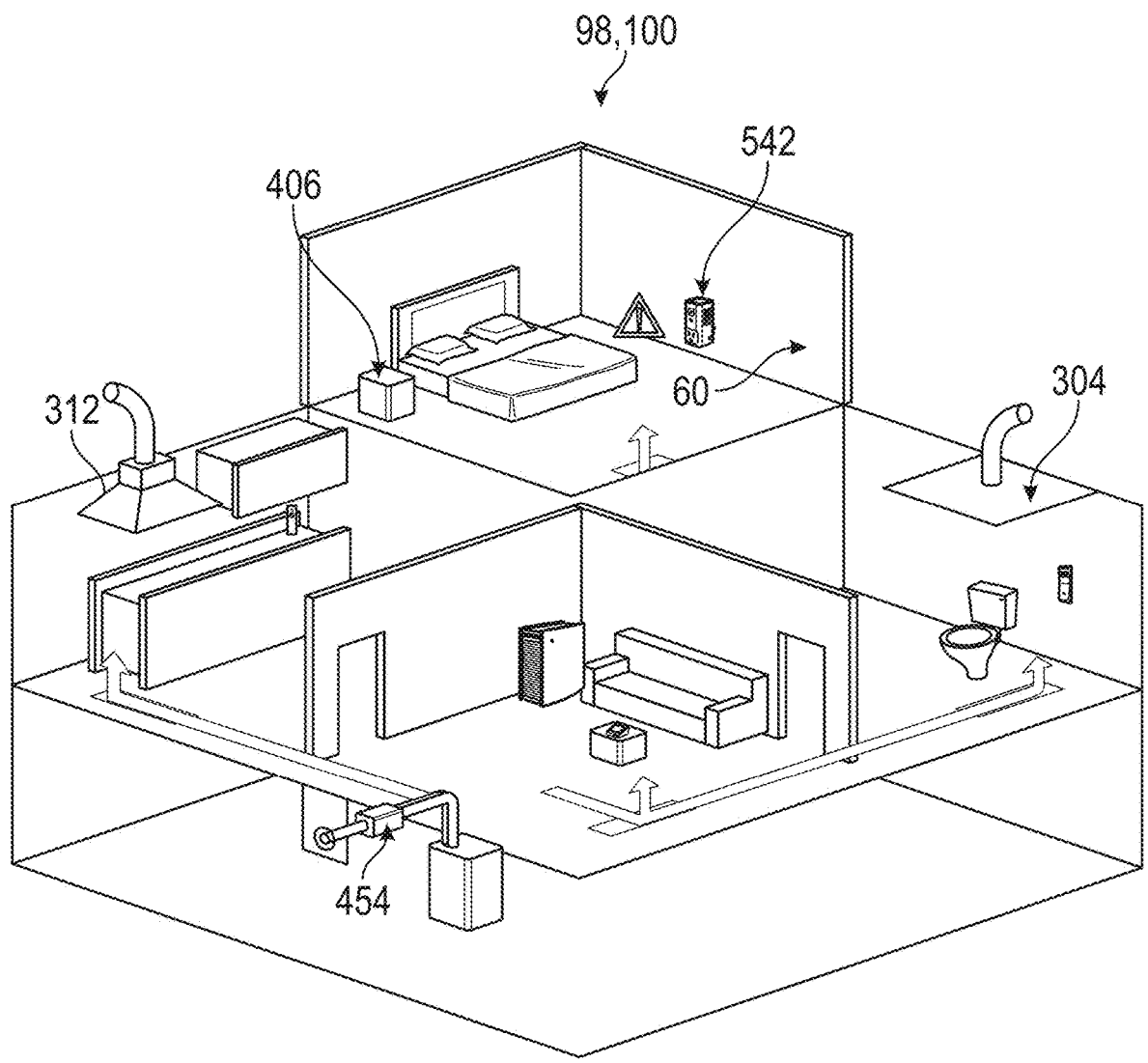
Figure 38:
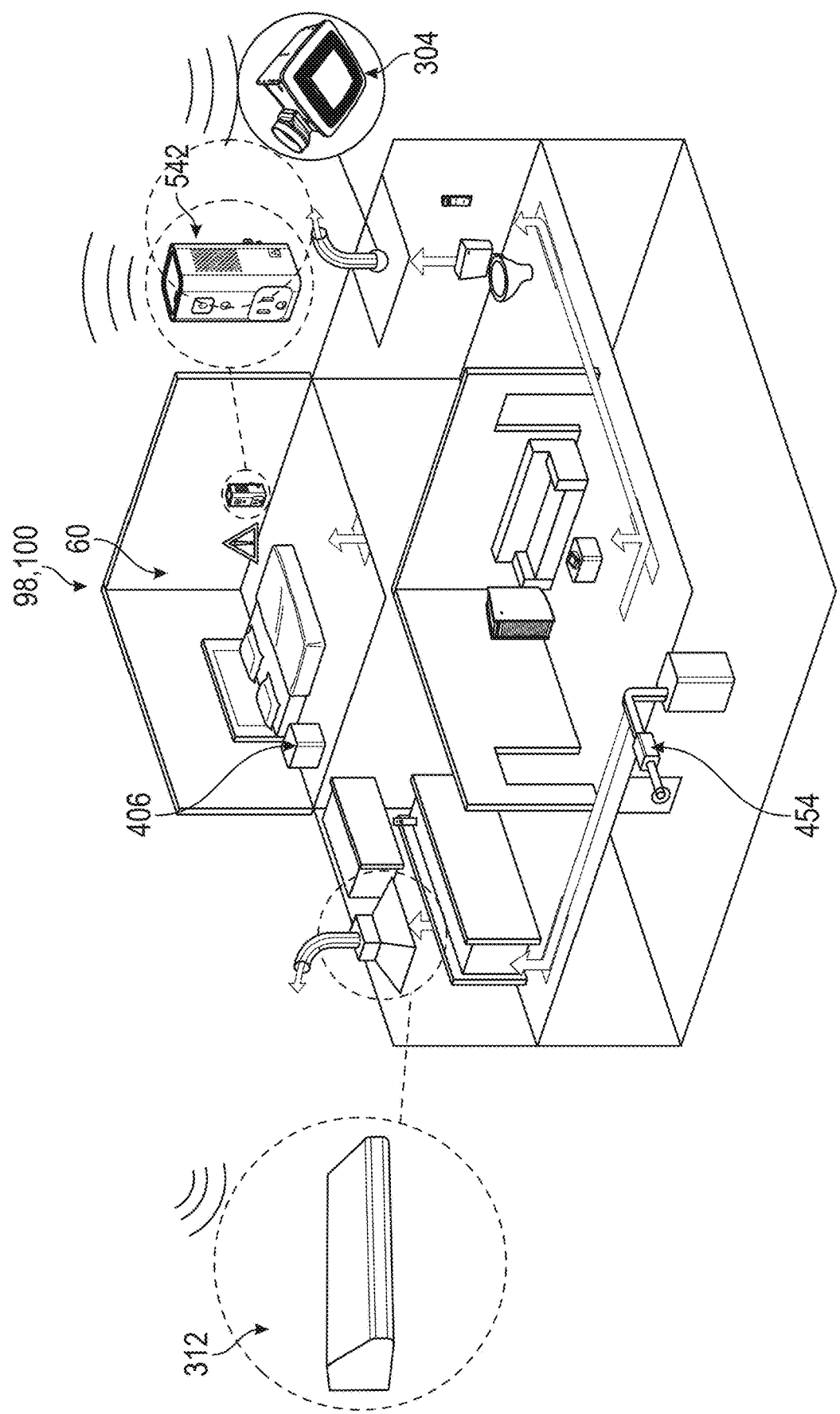
Figure 39:
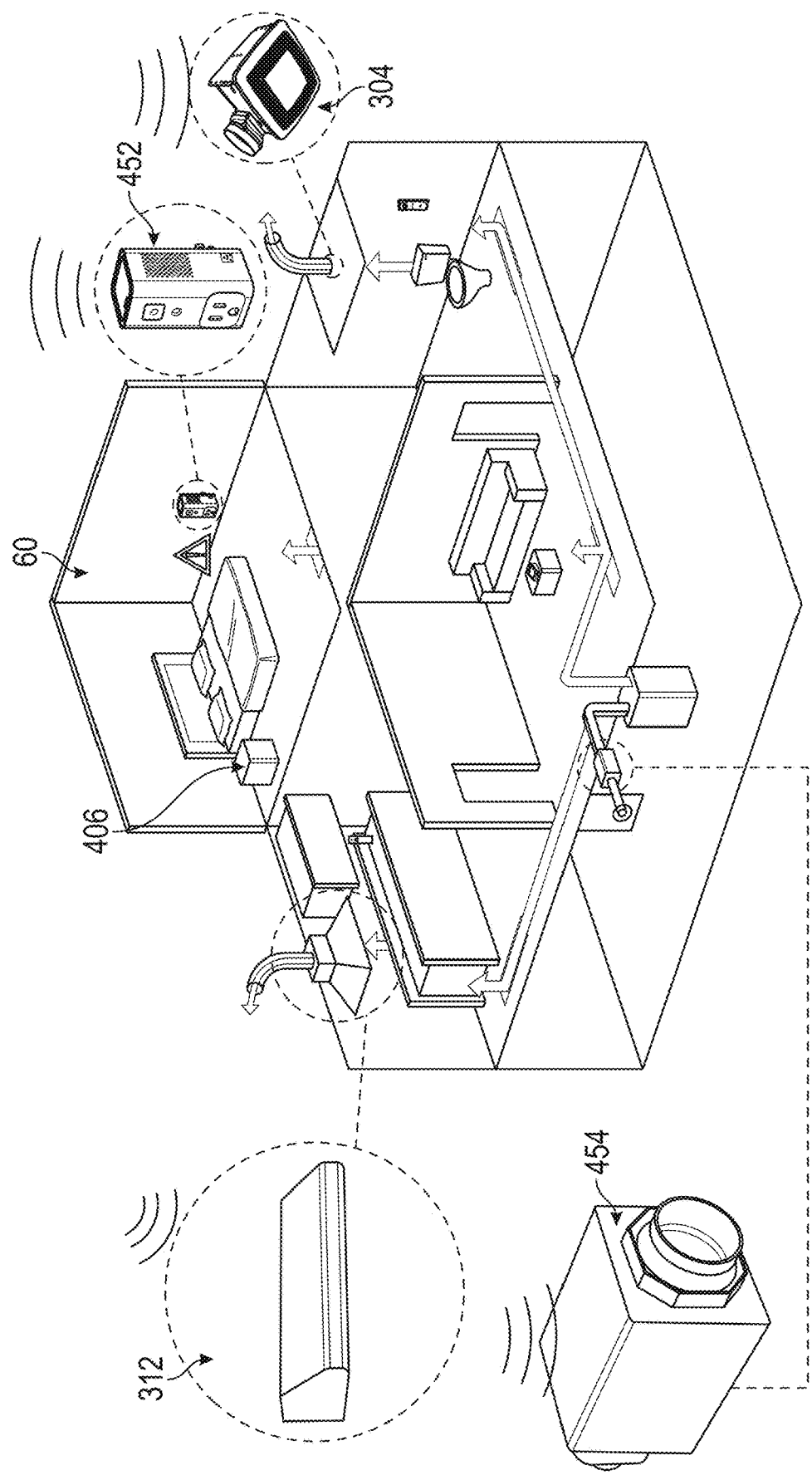
Figure 40:
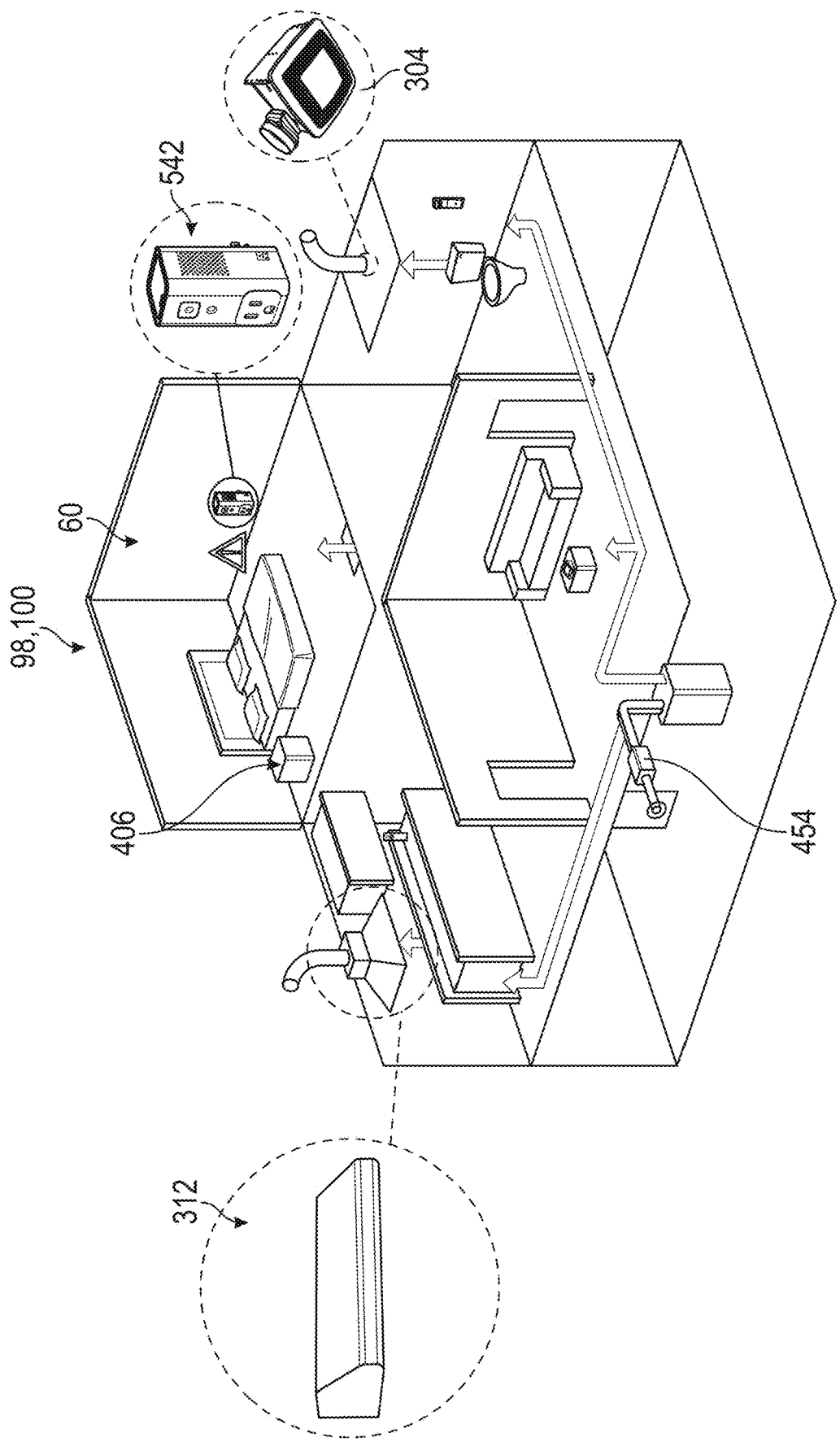
Figure 41:
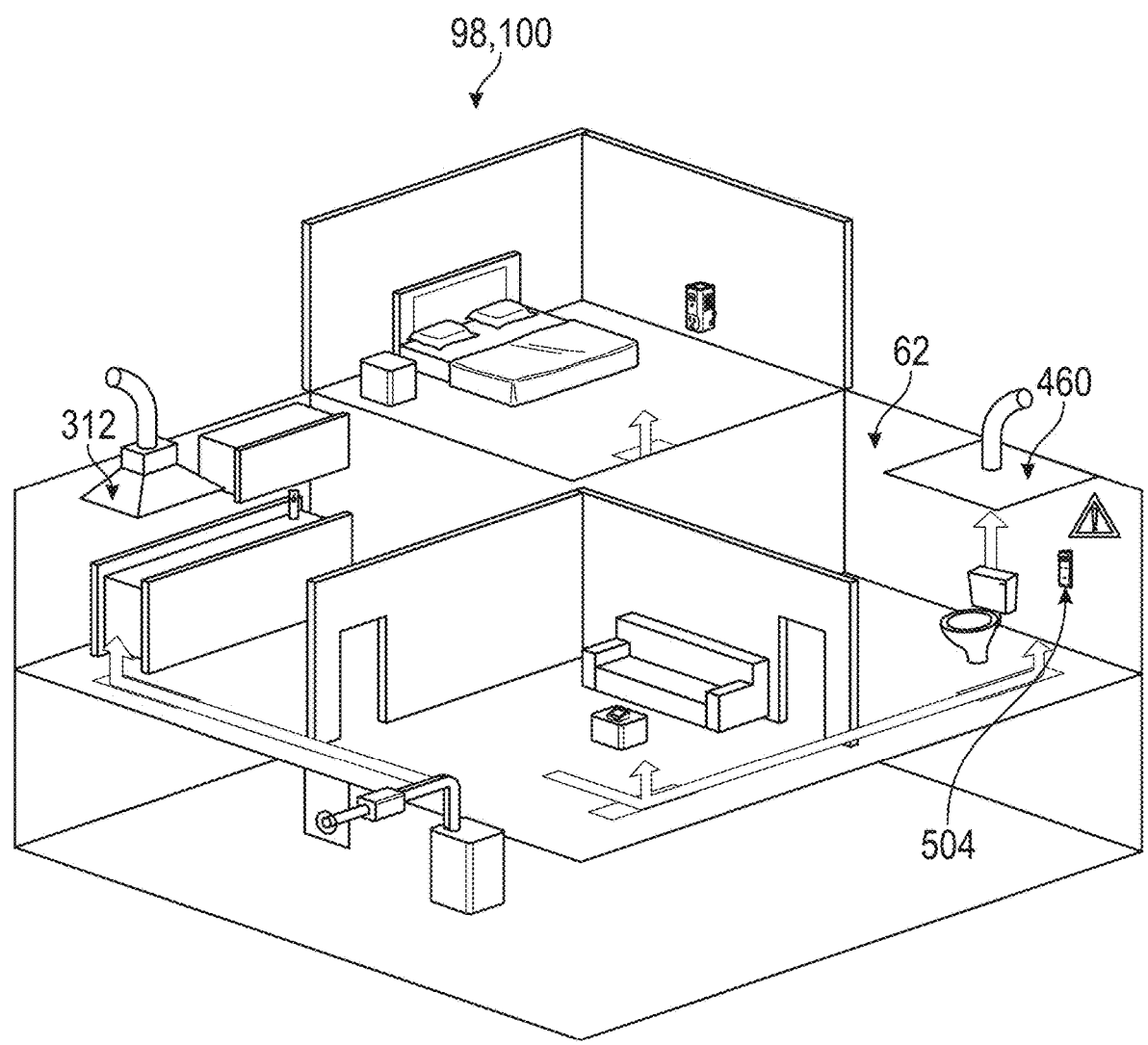

FIGS. 35-40 illustrate the operation of an exemplary IAQ system 10 operating under a first set of conditions. Here, in FIG. 35, the air that contains a certain level of pollutant is traveling throughout the ventilation system. After a predetermined amount of time, the concentration of the air pollutant exceeds the predetermined threshold value within the bedroom 60. As shown in FIG. 36, this environmental data is sent to the local server/database 110 from the monitoring device 102, 542 contained within the bedroom 60. After analysis of this data and data from other sensors, the local server/database 110 determines that the air pollutant is above a predetermined threshold value. The local server/database 110 then sends an alert to the alerting unit 114. Upon further analysis of the collected environmental data, the local server/database 110, determines that a local air purifier that is contained within the bedroom will not reduce the air pollutant below a predetermined threshold value because certain levels of the air pollutant can be traced throughout the house. Here, the IAQ system 10 determines that all appliances 106 that vent air outside of the house should be turned on. Accordingly, as shown in FIG. 38, the local server/database 110 sends signals to the connected bathroom fan 304 and the connected range hood 312 to turn ON these devices. After the connected bathroom fan 304 and the connected range hood 312 have been running for a predefined amount of time, the IAQ system 10 determines that air needs to be brought into the house to ensure that the structure 100 is balanced. Thus, as shown in FIG. 39, the local server/database 110 sends a signal to the CIAQ device 50 that is coupled to the supply fan 454 to turn ON this device. The IAQ system 10 will continue to monitor the levels of the air pollutant and once these levels are brought within their predetermined system thresholds, the system will turn OFF all of the devices 304, 312, and 454, which is shown in FIG. 40. It should be understood that one device 304 may stay on long then another device 312 within the structure 100 due to the layout of the structure 100. Specifically, the bathroom fan 304 may be closer and may have a direct access to the bedroom 60 where the alert occurred and as such the bathroom fan 304 may run for a longer amount of time then the range hood 312.

An alternative description of the scenario shown in FIGS. 35-40 may include the fact that the local server/database 110 may determine that it is best to turn ON all appliances 106 that vent air outside of the house in light of the level of the air pollutant and the fact that the alert occurred within the bedroom, where there is no direct ventilation appliance. In this description, the local server/database 110 only utilized data from the one monitoring device 102 contained within the bedroom and did not consider data from other monitoring devices 102 contained within the structure 100. Another alternative description of the scenario shown in FIGS. 35-40 may include the fact that the IAQ system 10 may not send the environmental data to the local server/database 110 and instead the monitoring device 102 simply determines that the level of the air pollutant is too high to warrant additional analysis from the local server/database 110. In this alternative description, the monitoring unit 102 sends an alert to the alerting unit 114 and then sends signals to turn ON the appliances 106.

Figure 43:
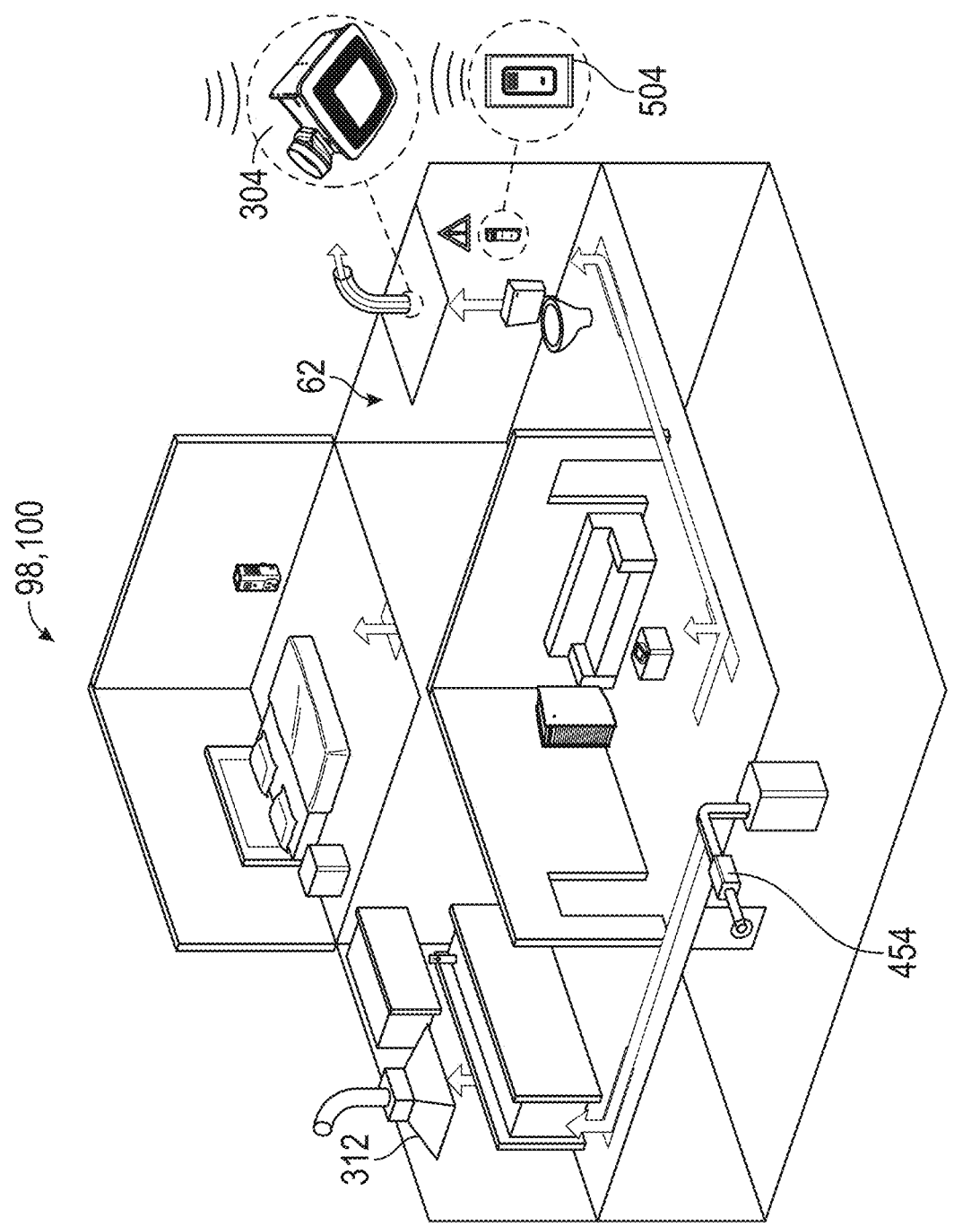
Figure 44:
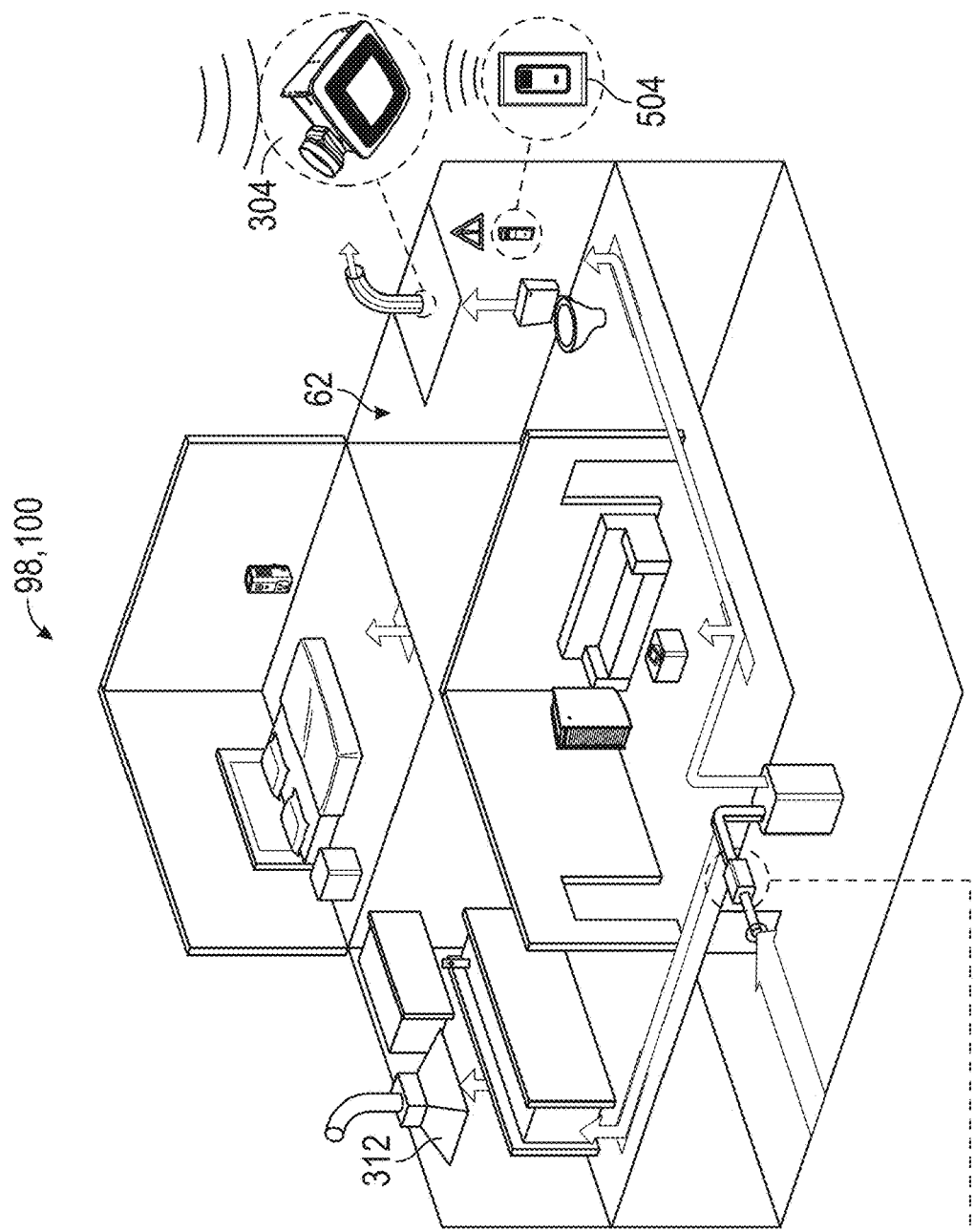
Figure 45:
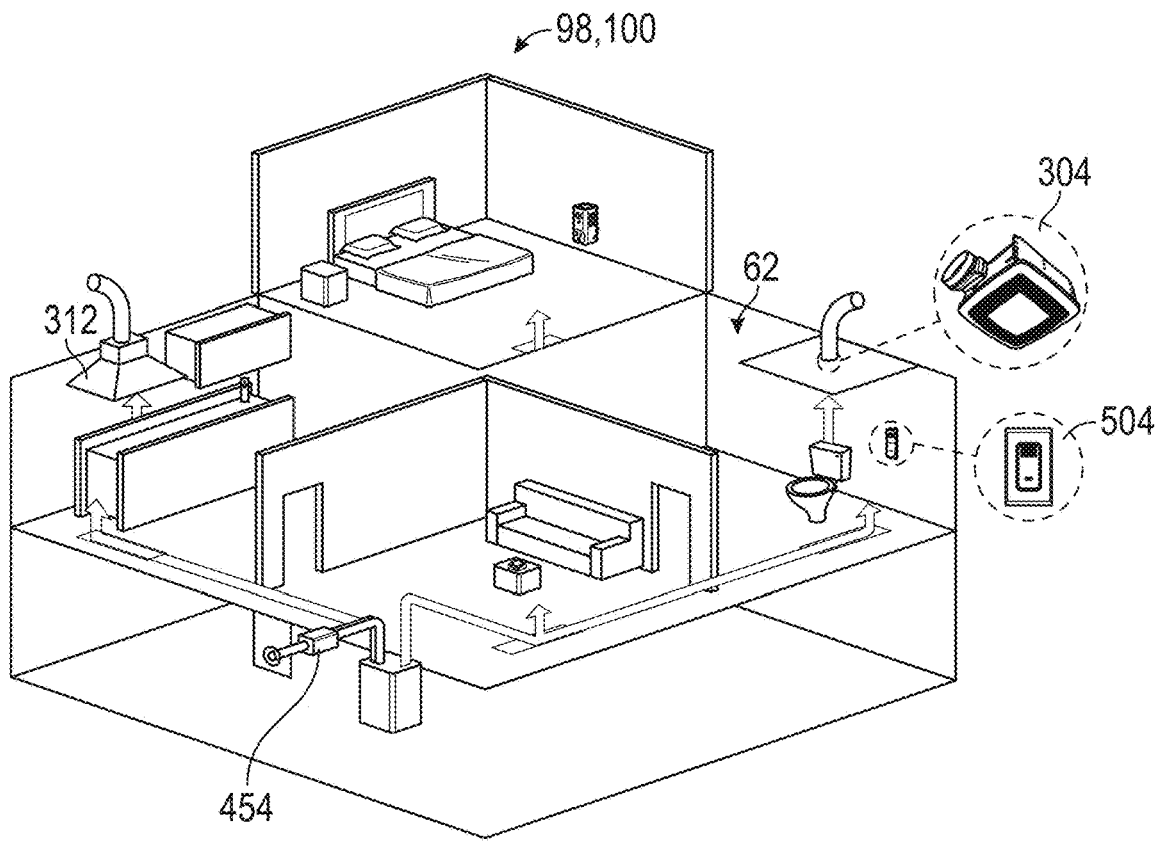
Figure 46:
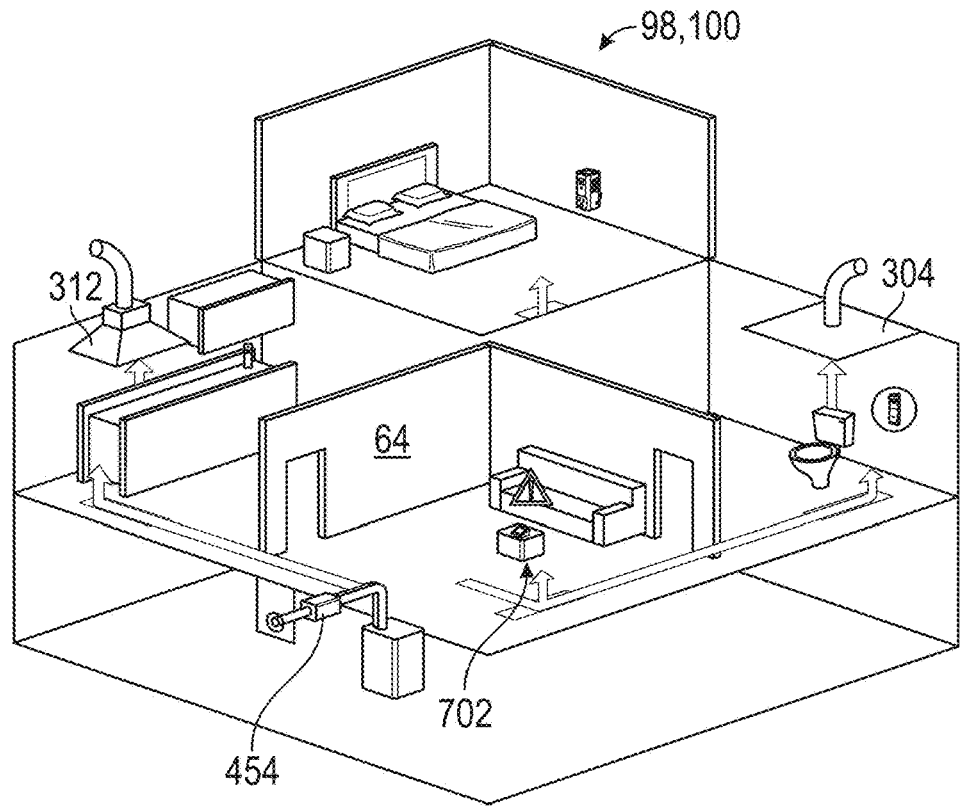

FIGS. 41-45 illustrate the operation of an exemplary IAQ system 10 operating under a second set of conditions. Here, in 41, the air that contains a certain level of pollutant is traveling throughout the ventilation system. After a predetermined amount of time, the concentration of the air pollutant exceeds the predetermined threshold value within the bathroom 62. As shown in FIG. 42, this environmental data is sent to the local server/database 110 from the monitoring device 102, 504 contained within the bathroom 62. After analysis of this data and data from other sensors, the local server/database 110 determines that the air pollutant is above a predetermined threshold value. The local server/database 110 then sends an alert to the alerting unit 114. Upon further analysis of the collected environmental data, the local server/database 110, determines that a local connected bathroom fan 304 can reduce the air pollutant below a predetermined threshold value. Here, the IAQ system 10 turns on only the local connected bathroom fan 304, as shown in FIG. 43, and does not turn ON the entire HVAC system or any other systems. In other words, system 10 selectively picks the appliance 106 that can best resolve the issue at hand without turning on all appliances 106. After the local connected bathroom fan 304 has been running for a predefined amount of time, the IAQ system 10 determines that air needs to be brought into the house to ensure that the structure 100 is balanced. Thus, as shown in FIG. 44, the local server/database 110 sends a signal to the CIAQ device 50 that is coupled to the non-connected supply fan 454 to turn ON this device. The IAQ system 10 will continue to monitor the levels of the air pollutant and once these levels are brought within their predetermined sensor thresholds, the system will turn OFF the local connected bathroom fan 304, which is shown in FIG. 45.

An alternative description of the scenario shown in FIGS. 41-45 may include the fact that the IAQ system 10 may not send the environmental data to the local server/database 110 and instead the monitoring device 102 simply determines that the level of the air pollutant is too high to warrant additional analysis from the local server/database 110. In this alternative description, the monitoring unit 102 sends an alert to the alerting unit 114 and then sends signals to turn ON the local bathroom fan 304.

Figure 48:
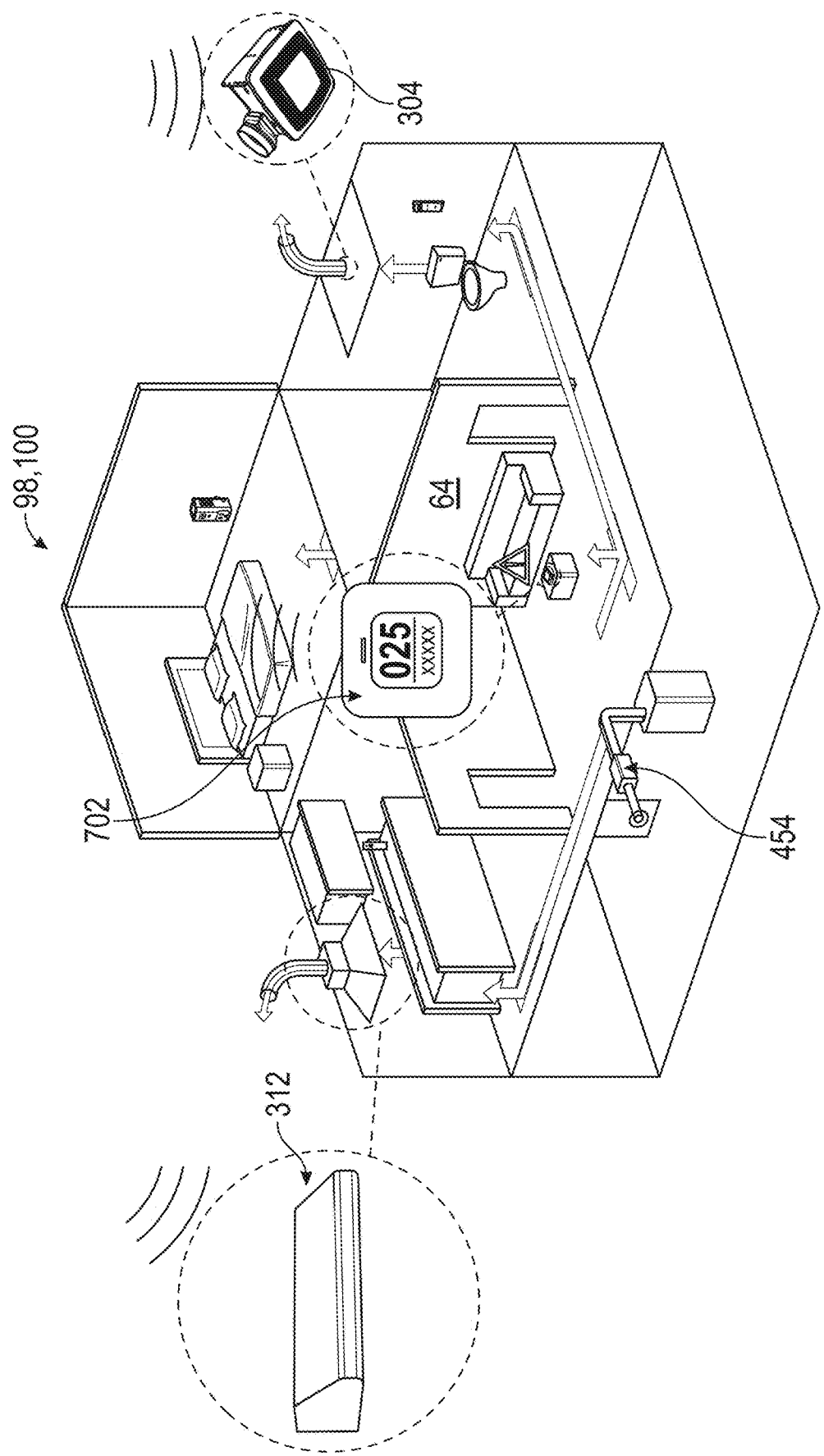
Figure 49:
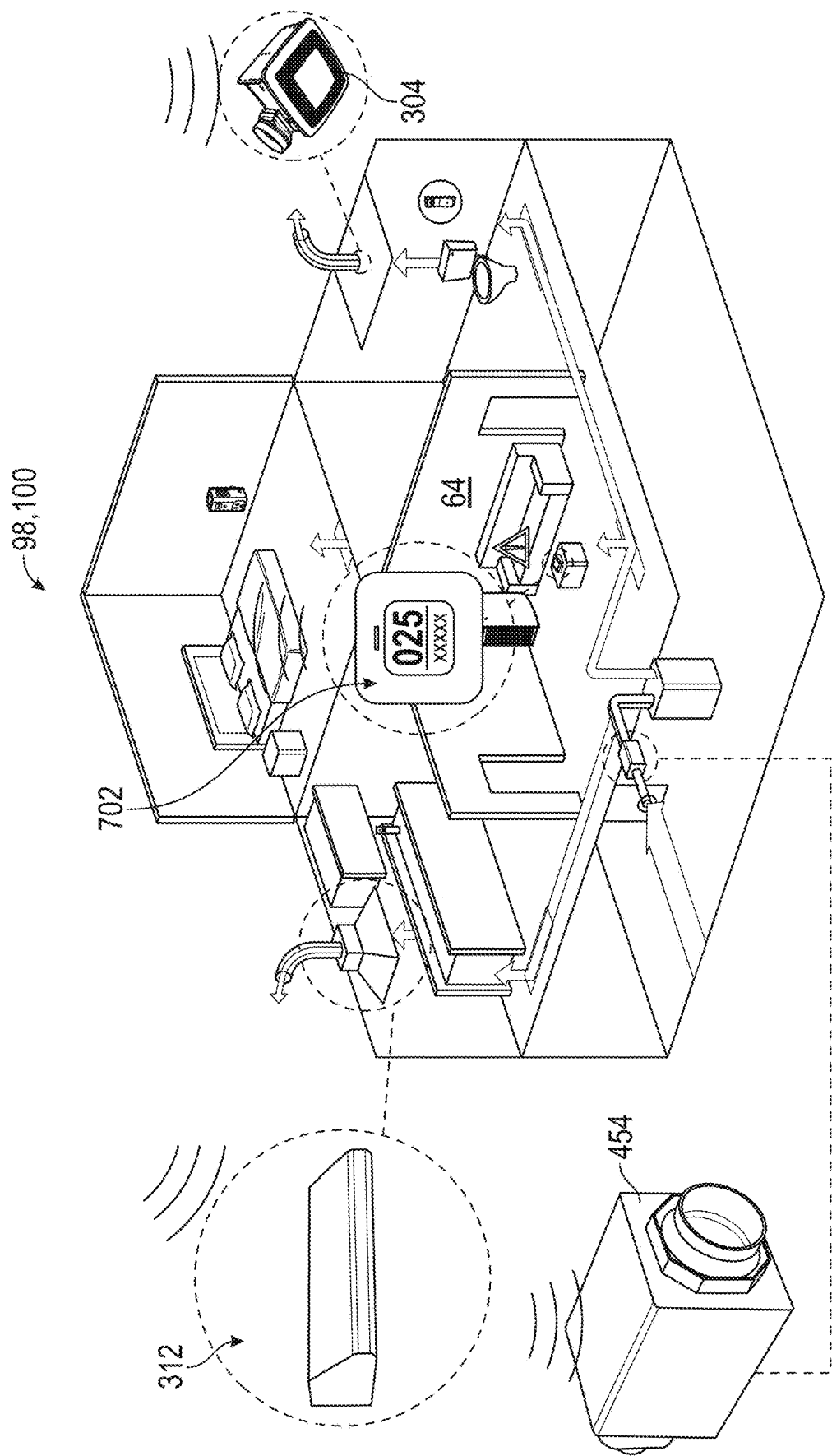
Figure 50:
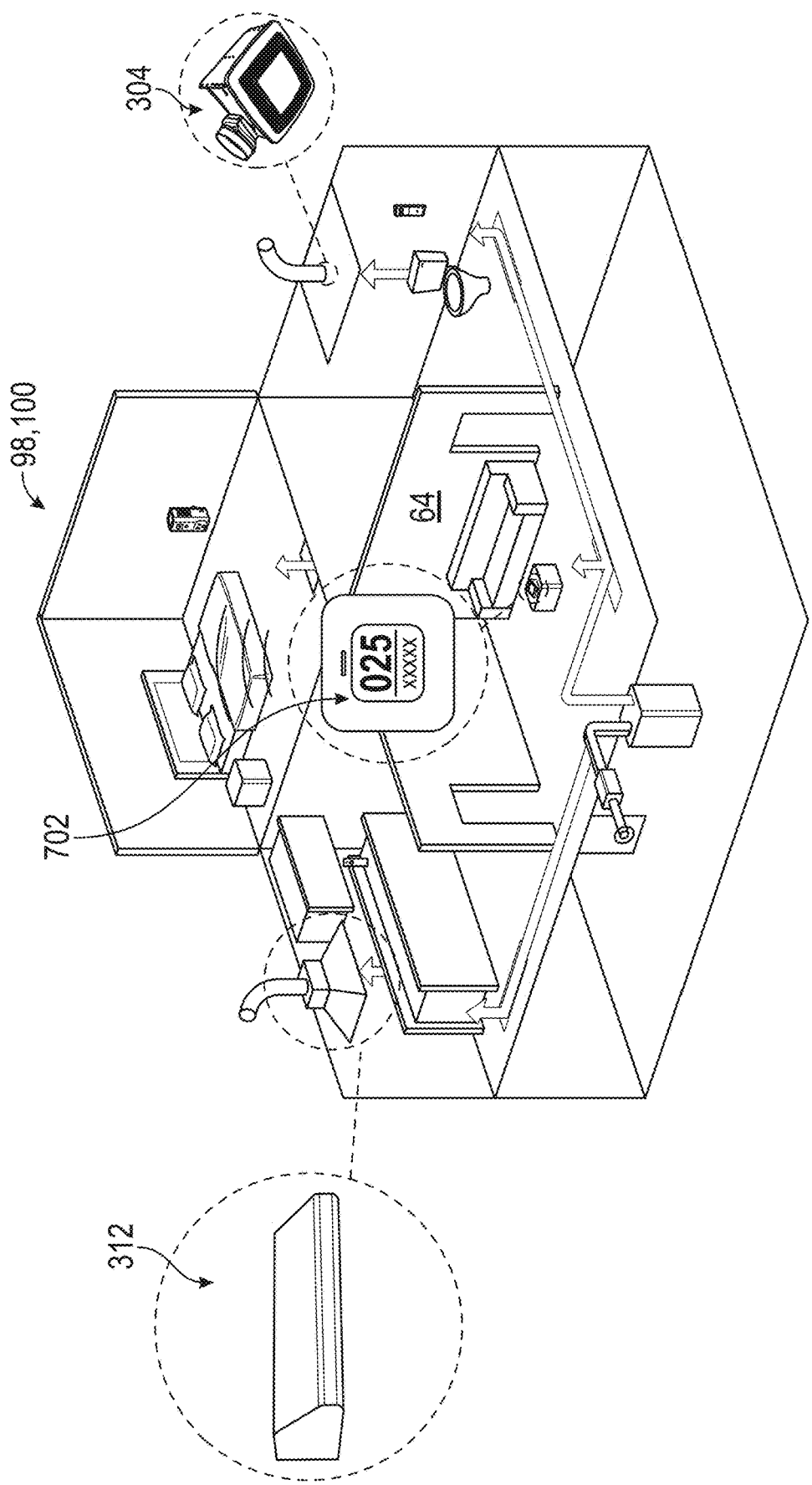
Figure 51:
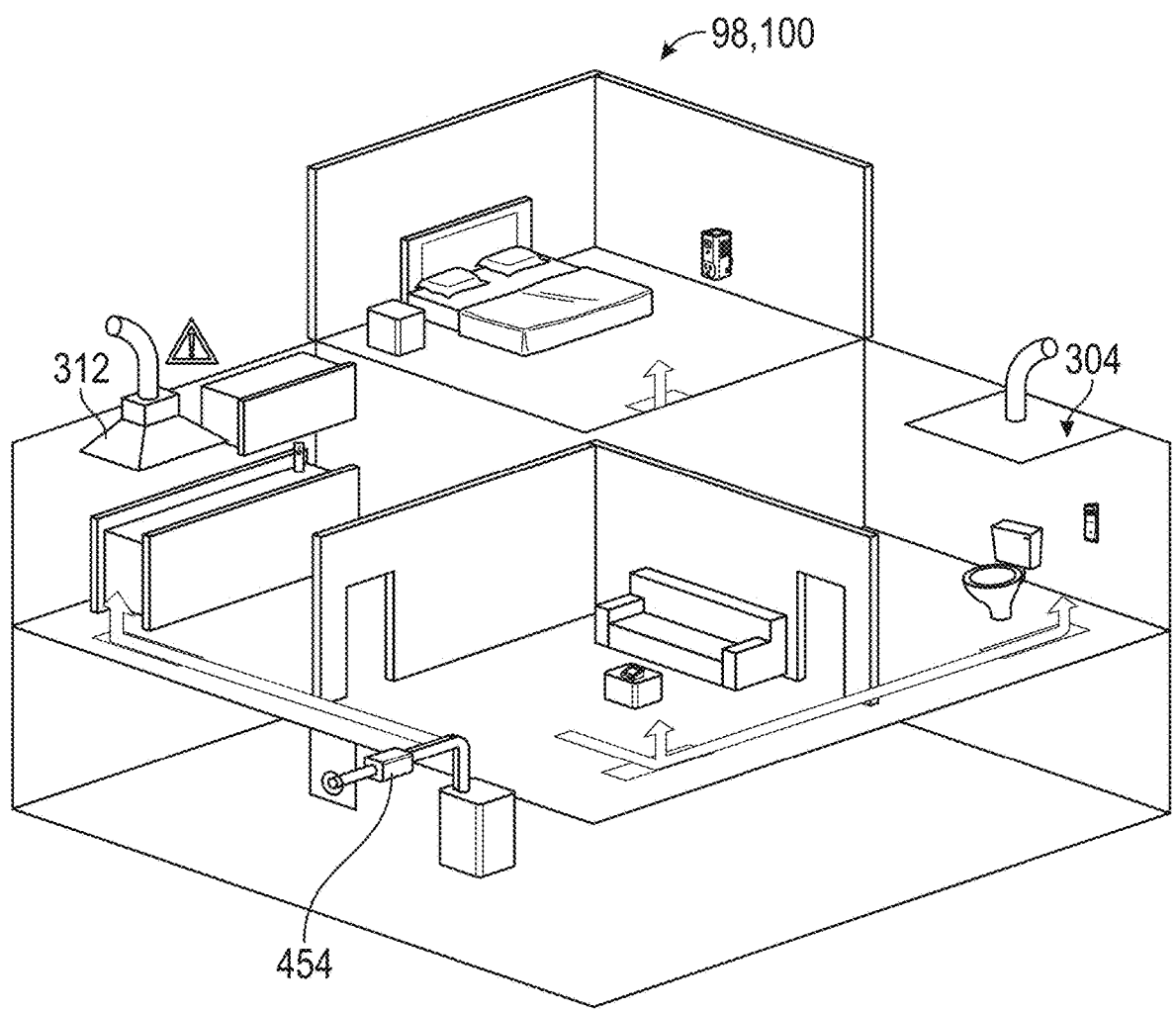
FIGS. 51-55 show a partial cut-away view of an operating environment, which shows the exemplary IAQ system operating under a fourth set of conditions.

FIGS. 46-50 illustrate the operation of an exemplary IAQ system 10 operating under a third set of conditions. Here, in FIG. 46, the air that contains a certain level of pollutants is traveling throughout the ventilation system. After a predetermined amount of time, the concentration of the air pollutant exceeds the predetermined threshold value within the living room 64. As shown in FIG. 47, this environmental data is sent to the local server/database 110 from the central unit 702 contained within the living room 64. After analysis of this data and data from other sensors, the local server/database 110 that is contained within the central unit 702 determines that the air pollutant is above a predetermined threshold value. The local server/database 110 then sends an alert to the alerting unit 114. Upon further analysis of the collected environmental data, the local server/database 110, determines that a local air purifier that is contained within the living room 64 will not reduce the air pollutant below a predetermined threshold value because certain levels of the air pollutant can be traced throughout the house. Here, the IAQ system 10 determines that all appliances 106 that vent air outside of the house should be turned on. Accordingly, as shown in FIG. 48, the local server/database 110 sends signals to the connected bathroom fan 304 and the connected range hood 312 to turn ON these devices. After the connected bathroom fan 304 and the connected range hood 312 have been running for a predefined amount of time, the IAQ system 10 determines that air needs to be brought into the house to ensure that the structure 100 is balanced. Thus, as shown in FIG. 49, the local server/database 110 sends a signal to the CIAQ device 50 that is coupled to the non-connected supply fan 454 to turn ON this device. The IAQ system 10 will continue to monitor the levels of the air pollutant and once these levels are brought within their predetermined sensor thresholds, the system will turn OFF all of the devices, which is shown in FIG. 50.

An alternative description of the scenario shown in FIGS. 46-50 may include the fact that the local server/database 110 may determine that it is best to turn ON all appliances 106 that vent air outside of the house in light of the level of the air pollutant and the fact that the alert occurred within the living room, where there is no direct ventilation appliance. In this description, the local server/database 110 only utilized data from the one central unit 702 contained within the living room and did not consider data from other monitoring devices contained within the structure 100.

Figure 52:
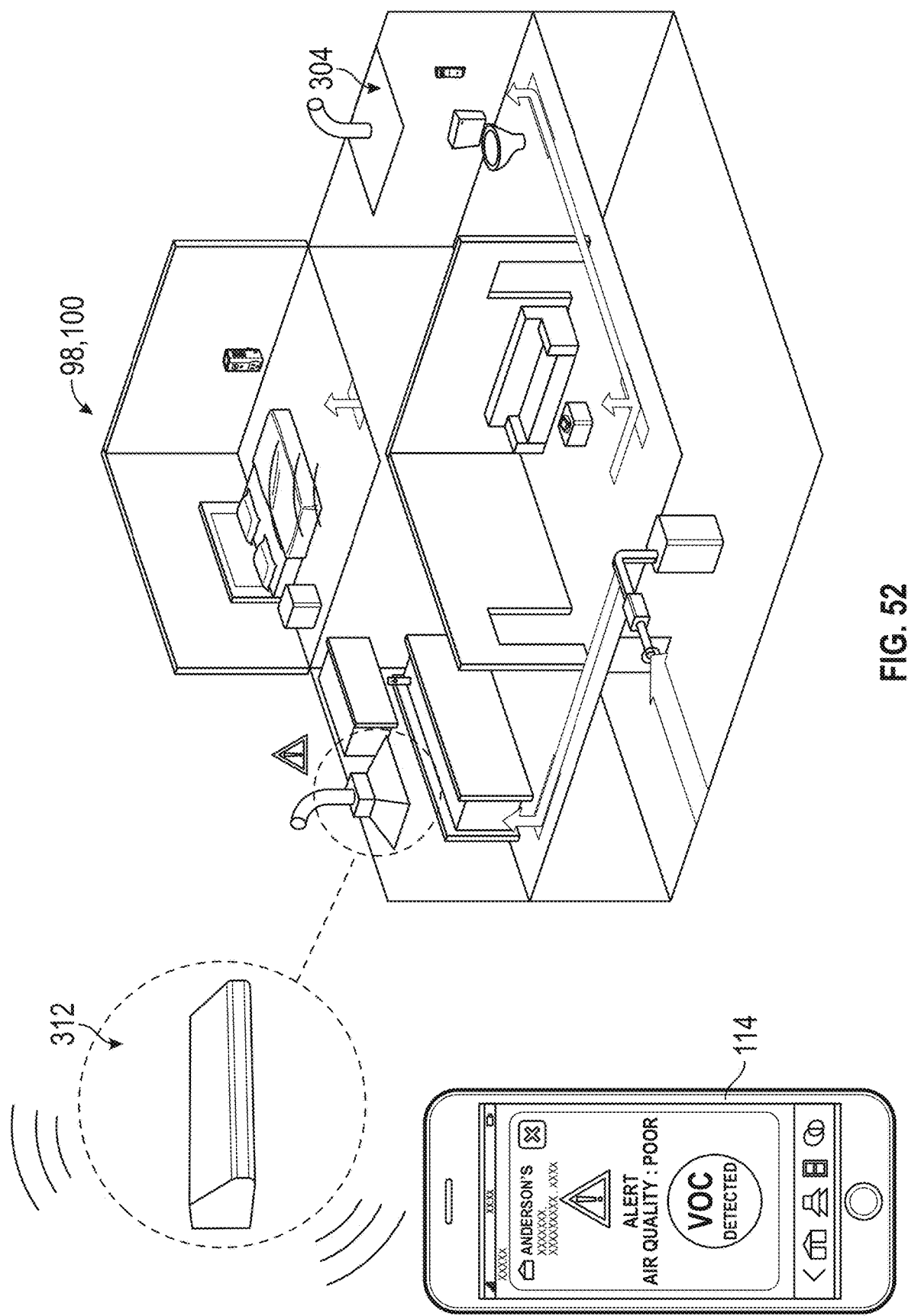
Figure 53:
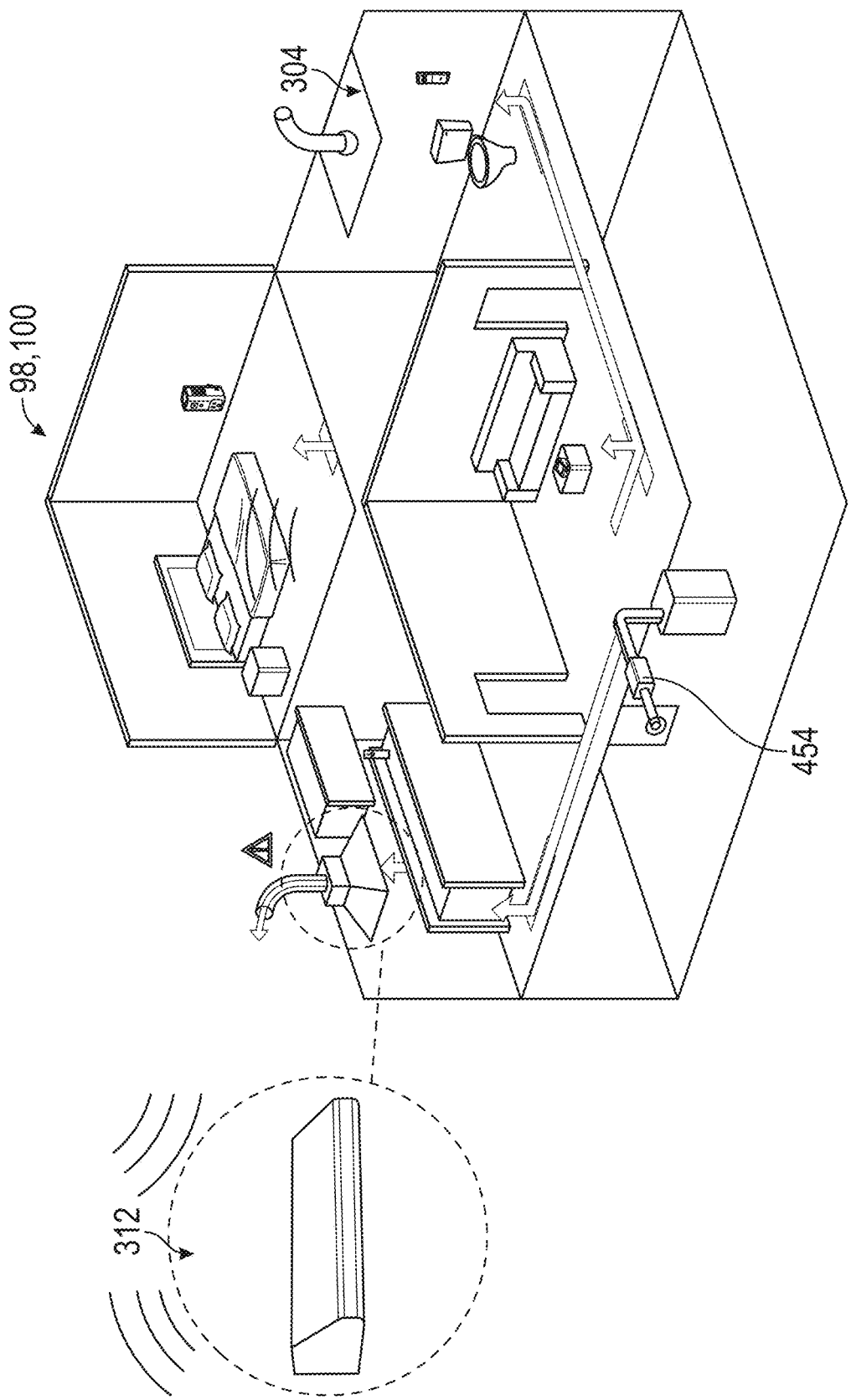
Figure 54:
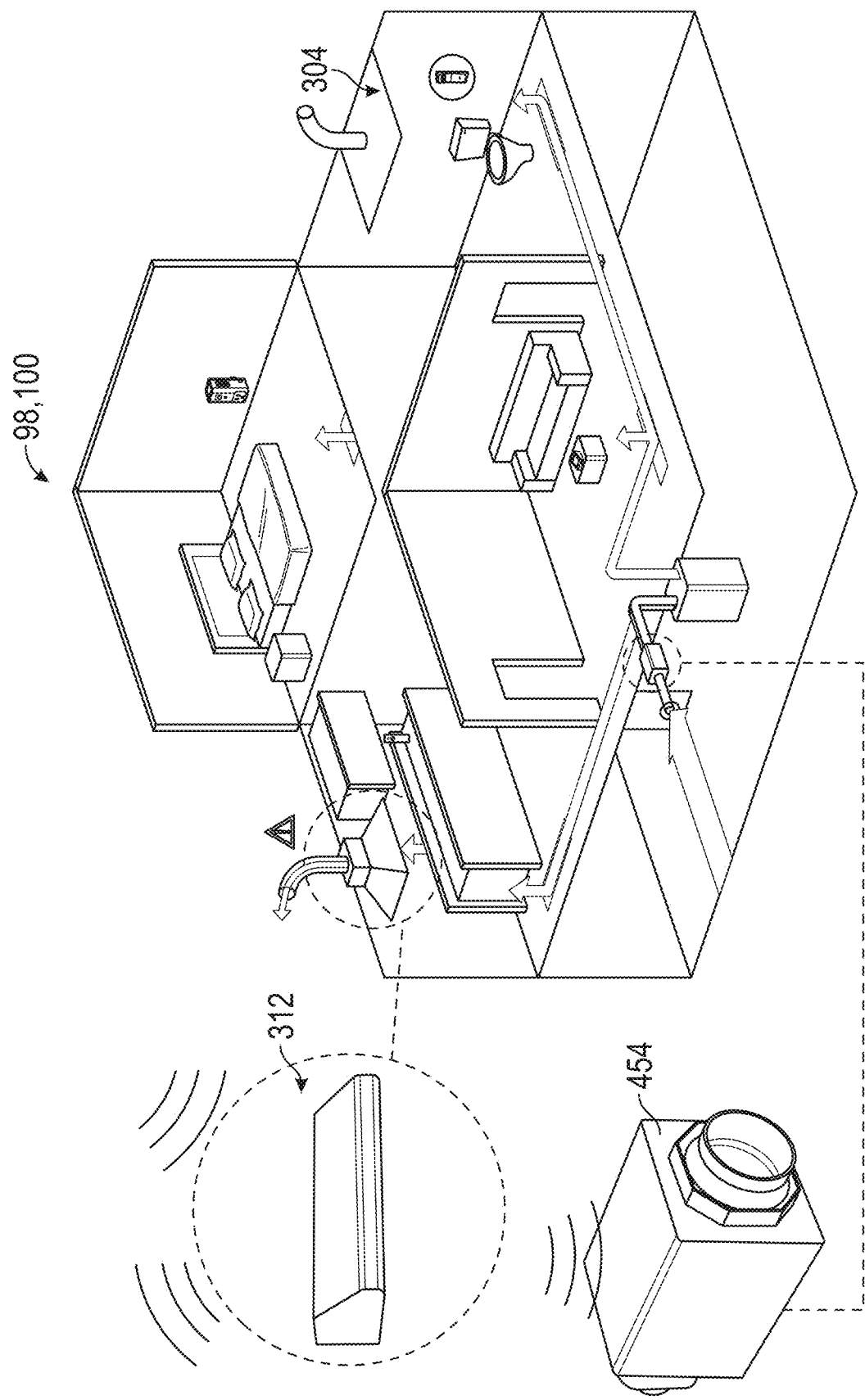
Figure 55:
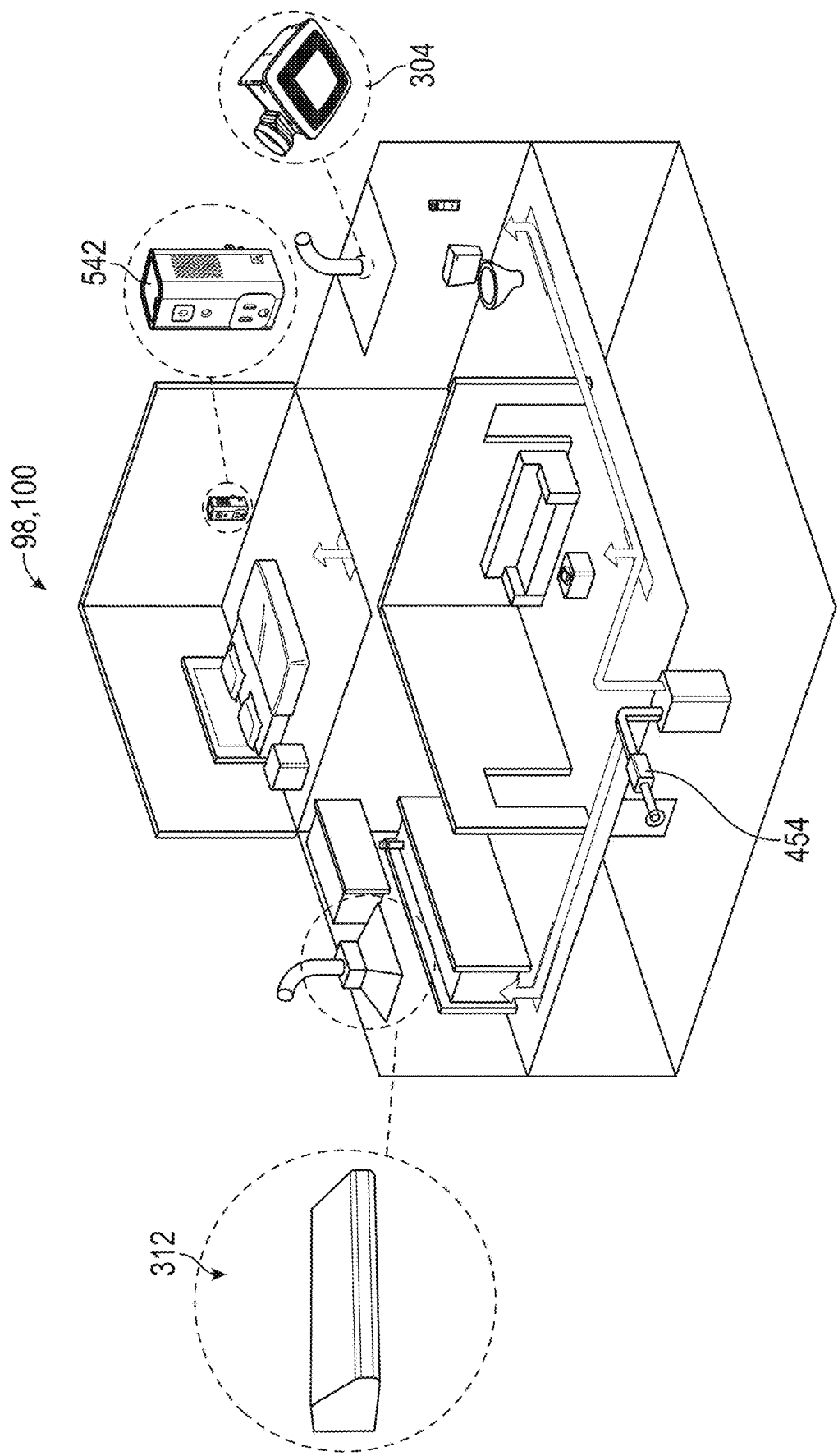

FIGS. 51-55 illustrate the operation of an exemplary IAQ system 10 operating under a fourth set of conditions. Here, in FIG. 51, air pollutant travels from the cooktop into the range hood 312. After a predetermined amount of time, the concentration of the air pollutant exceeds the predetermined threshold value. As shown in FIG. 52, this environmental data is sent to the local server/database 110 from the connected range hood 312. After analysis of this data, the local server/database 110 determines that the air pollutant is above a predetermined threshold value. The local server/database 110 then sends an alert to the alerting unit 114. Upon further analysis of the collected environmental data, the local server/database 110, determines that a local connected range hood 312 can reduce the air pollutant below a predetermined threshold value. Here, the IAQ system 10 only turns on the local connected range hood 312, as shown in FIG. 53. In other words, system 10 selectively turned on the appliance 106 that could efficiently resolve the issue at hand. After the local connected range hood 312 has been running for a predefined amount of time, the IAQ system 10 determines that air needs to be brought into the house to ensure that the structure 100 is balanced. Thus, as shown in FIG. 54, the local server/database 110 sends a signal to the CIAQ device 50 that is coupled to the non-connected supply fan 454 to turn ON this device. The IAQ system 10 will continue to monitor the levels of the air pollutant and once these levels are brought within their predetermined sensor thresholds, the system will turn OFF the local connected range hood 312, which is shown in FIG. 55.

Another alternative description of the scenario shown in FIGS. 51-55 may include the fact that the IAQ system 10 may not send the environmental data to the local server/database 110 and instead the connected range hood 312 simply determines that the level of the air pollutant is too high to warrant additional analysis from the local server/database 110. In this alternative description, the connected range hood 312 sends an alert to the alerting unit 114 and turns on the connected range hood 312.

13) Exemplary Flowcharts Showing Operation of the System

FIGS. 56-72 contains flow charts describing how an exemplary embodiment of the IAQ system 10 functions. It should be understood from the start that this is only an exemplary embodiment and as such, the IAQ system 10 may function in other or alternative ways. For example, the flowcharts shown on pages 57-59 could be omitted without affecting the functionality of the IAQ system 10. Additionally, steps could be added to these flowcharts. For example, if additional monitoring devices 102 and/or appliances 106 were added to the system, then the flowcharts would be altered to account for these changes. Further, it should be understood that a flowchart contained within one figure may reference one or multiple other flowcharts.

FIG. 56 describes the main system 10 algorithms 3000 that references or calls the other IAQ algorithms contained within the IAQ system 10. This main system algorithm 3000 is preferably called less than every 10 minutes, more preferably less than every minute, and most preferably every 5 seconds. The first step 3002 in this main system algorithm 3000 is to check if the user has enabled the do not disturb mode, which was described above in connection with FIG. 34. If do not disturb mode is enabled, then the system 10 will perform no additional steps in 3004. However, if do not disturb mode is not enabled, then the system 10 will proceed down to check all connected bathroom fans 314 and/or in-wall monitoring devices 502, 504 that are contained within bathrooms in steps 3006. In other words, the bathroom algorithm 3010 is performed for each and every bathroom that contains a connected bathroom fan 314 and/or in-wall monitoring devices 502, 504. Proceeding to FIG. 60 that contains the bathroom algorithm 3010, this algorithm 3010 again checks to ensure that the do not disturb mode is not enabled in step 3012. If do not disturb mode is enabled, then no additional steps are performed. However, if do not disturb mode 3012 is not enabled, then the system 10 checks to see if the system 10 has collected new data from the sensors in step 3014. The system 10 needs to check to see if there is new data because of the frequency that this algorithm 3010 is performed. If there is no new data, then the system 10 does not perform any additional steps within this algorithm. However, if the system did collect new data, then additional steps within this algorithm 3010 will be performed.

Next, the bathroom algorithm 3010 compares the derivative of the relative humidity against a first derivative of the relative humidity threshold in step 3016. If the derivative of the relative humidity is greater than the first derivative of the relative humidity threshold, then the algorithm 3010 compares the derivative of the relative humidity against a second derivative of the relative humidity threshold in step 3018. If the derivative of the relative humidity is greater than the second derivative of the relative humidity threshold in step 3018, then the system 10 turns the connected bathroom fan 314 to level number 2 or the highest level in step 3020. Alternatively, if the derivative of the relative humidity is less than the second derivative of the relative humidity threshold in step 3018, then the system 10 turns the connected bathroom fan 314 to level number 1 or the lowest level in step 3022.

If the derivative of the relative humidity is less than the first derivative of the relative humidity threshold in step 3016, then the algorithm 3010 compares $CO_2$ levels from the sensors 200 against a first $CO_2$ threshold in step 3024. If the $CO_2$ level is greater than the first $CO_2$ threshold, then the algorithm 3010 compares the $CO_2$ level against a second $CO_2$ threshold in step 3026. If the $CO_2$ level is greater than the second $CO_2$ threshold in step 3026, then the system 10 turns the connected bathroom fan 314 to level number 2 or the highest level in step 3028. Alternatively, if the $CO_2$ level is less than the second $CO_2$ threshold in step 3026, then the system 10 turns the connected bathroom fan 314 to level number 1 or the lowest level in step 3022.

If the $CO_2$ level is less than the first $CO_2$ threshold in step 3024, then the algorithm 3010 compares the relative humidity levels from sensors 200 against a first relative humidity threshold in step 3032. If the relative humidity level is greater than the first relative humidity threshold, then the algorithm 3010 compares the relative humidity level against a second relative humidity threshold in step 3034. If the relative humidity level is greater than the second relative humidity threshold in step 3034, then the system 10 turns the connected bathroom fan 314 to level number 2 or the highest level in step 3036. Alternatively, if the relative humidity level is less than the second relative humidity threshold in step 3034, then the system 10 turns the connected bathroom fan 314 to level number 1 or the lowest level in step 3038.

If the relative humidity level is less than the first relative humidity threshold in step 3032, then the algorithm 3010 compares the TVOC levels from sensors 200 against a first TVOC threshold in step 3040. If the TVOC level is greater than the first TVOC threshold, then the algorithm 3010 compares the TVOC level against a second TVOC threshold in step 3042. If the TVOC level is greater than the second TVOC threshold in step 3042, then the system 10 turns the connected bathroom fan 314 to level number 2 or the highest level in step 3046. Alternatively, if the TVOC level is less than the second TVOC threshold in step 3042, then the system 10 turns the connected bathroom fan 314 to level number 1 or the lowest level in step 3038. Last, if the TVOC level is less than the first TVOC threshold in step 3040, then the algorithm 3010 does not alter the fan speed and the algorithm is finished in step 3050.

Returning to FIG. 56, once the bathroom algorithm 3010 is performed for each and every bathroom that contains a connected bathroom fans 314 and/or in-wall monitoring devices 502, 504, then the range hood algorithm 3500 is performed for each and every room that contains a connected range hood 312 and/or in-line monitoring device 590 that is connected to a range hood in step 3490. Proceeding to FIG. 61 that contains the range hood algorithm 3500, this algorithm 3500 again checks to ensure that the do not disturb mode is not enabled in step 3512. If do not disturb mode is enabled, then no additional steps are performed. However, if do not disturb mode 3512 is not enabled, then the system 10 checks to see if the system 10 has collected new data from the sensors in step 3514. The system 10 needs to check to see if there is new data because of the frequency that this algorithm 3500 is performed. If there is no new data, then the system 10 does not perform any additional steps within this algorithm 3500. However, if the system did collect new data, then additional steps within this algorithm 3500 will be performed.

Next, the range hood algorithm 3500 compares the derivative of the TVOC against a first derivative of the TVOC threshold in step 3516. If the derivative of the TVOC is greater than the first derivative of the TVOC threshold, then the algorithm 3500 compares the derivative of the TVOC against a second derivative of the TVOC threshold in step 3518. If the derivative of the TVOC is greater than the second derivative of the TVOC threshold, then the algorithm 3500 compares the derivative of the TVOC against a third derivative of the TVOC threshold in step 3520. Alternatively, if the derivative of the TVOC is less than the second derivative of the TVOC threshold in step 3518, then the system 10 turns the connected range hood 312 to level number 1 or the lowest level in step 3522. If the derivative of the TVOC is greater than the third derivative of the TVOC threshold in step 3520, then the system 10 turns the connected range hood 312 to level number 3 or the highest level in step 3524. Alternatively, if the derivative of the TVOC is less than the third derivative of the TVOC threshold in step 3520, then the system 10 turns the connected range hood 312 to level number 2 or the middle level in step 3526.

If the derivative of the TVOC is less than the first derivative of the TVOC threshold in step 3516, then the algorithm 3500 compares $CO_2$ levels from the sensors 200 against a first $CO_2$ threshold in step 3530. If the $CO_2$ level is greater than the first $CO_2$ threshold, then the algorithm 3500 compares the $CO_2$ level against a second $CO_2$ threshold in step 3532. If the $CO_2$ level is greater than the second $CO_2$ threshold, then the algorithm 3500 compares the $CO_2$ level against a third $CO_2$ threshold in step 3534. Alternatively, if the $CO_2$ level is less than the second $CO_2$ threshold in step 3532, then the system 10 turns the connected range hood 312 to level number 1 or the lowest level in step 3522. If the $CO_2$ level is greater than the third $CO_2$ threshold in step 3534, then the system 10 turns the connected range hood 312 to level number 3 or the highest level in step 3536. Alternatively, if the $CO_2$ level is less than the third $CO_2$ threshold in step 3534, then the system 10 turns the connected range hood 312 to level number 2 or the middle level in step 3526.

If the $CO_2$ level is less than the first $CO_2$ threshold in step 3530, then the algorithm 3500 compares relative humidity levels from the sensors 200 against a first relative humidity threshold in step 3540. If the relative humidity level is greater than the first relative humidity threshold, then the algorithm 3500 compares the relative humidity level against a second relative humidity threshold in step 3542. If the relative humidity level is greater than the second relative humidity threshold, then the algorithm 3500 compares the relative humidity level against a third relative humidity threshold in step 3544. Alternatively, if the relative humidity level is less than the second relative humidity threshold in step 3542, then the system 10 turns the connected range hood 312 to level number 1 or the lowest level in step 3546. If the relative humidity level is greater than the third relative humidity threshold in step 3544, then the system 10 turns the connected range hood 312 to level number 3 or the highest level in step 3548. Alternatively, if the relative humidity level is less than the third relative humidity threshold in step 3544, then the system 10 turns the connected range hood 312 to level number 2 or the middle level in step 3550.

If the relative humidity level is less than the first relative humidity threshold in step 3540, then the algorithm 3500 compares TVOC levels from the sensors 200 against a first TVOC threshold in step 3552. If the TVOC level is greater than the first TVOC threshold, then the algorithm 3500 compares the TVOC level against a second TVOC threshold in step 3554. If the TVOC level is greater than the second TVOC threshold, then the algorithm 3500 compares the TVOC level against a third TVOC threshold in step 3556. Alternatively, if the TVOC level is less than the second TVOC threshold in step 3554, then the system 10 turns the connected range hood 312 to level number 1 or the lowest level in step 3546. If the TVOC level is greater than the third TVOC threshold in step 3556, then the system 10 turns the connected range hood 312 to level number 3 or the highest level in step 3560. Alternatively, if the TVOC level is less than the third TVOC threshold in step 3556, then the system 10 turns the connected range hood 312 to level number 2 or the middle level in step 3550. Last, if the TVOC level is less than the first TVOC threshold in step 3552, then the algorithm 3500 does not alter the fan speed and the algorithm is finished in step 3562.

Returning to FIG. 56, once the range hood algorithm 3500 is performed for each and every connected range hood 312 and/or in-line monitoring device 590 that is connected to a range hood, then the AQ algorithm 3710 is performed for all room sensors in step 3700. Proceeding to FIG. 62 that contains kitchen algorithm 4000, a bathroom algorithm 5000, and a living room/bedroom algorithm 6000. Like before, the AQ algorithm 3710 again checks to ensure that the do not disturb mode is not enabled in step 3712. If do not disturb mode is enabled, then no additional steps are performed. However, if do not disturb mode 3712 is not enabled, then the system 10 checks to see if the system 10 has collected new data from the sensors in step 3714. The system 10 needs to check to see if there is new data because of the frequency that this algorithm 3700 is performed. If there is no new data, then the system 10 does not perform any additional steps within this algorithm 3700. However, if the system collects new data, then additional steps within this algorithm 3700 will be performed.

The kitchen algorithm 4000 first determines if a kitchen monitoring device 102 is connected to a range hood in step 4010. If the kitchen monitoring device 102 is connected to a range hood, then the kitchen range hood algorithm 4100 is performed. This algorithm is almost identical to the range hood algorithm 3500 that is discussed above in connection with FIG. 61. The only difference is that algorithm 4100 substitutes PM2.5 for the derivative of the TVOC. Thus, for the sake of brevity, algorithm 4100 will be shown in FIG. 63, but will not be described in additional detail herein. Alternatively, if the kitchen monitoring device 102 is not connected to a range hood, then the kitchen-house algorithm 4200 is performed. The kitchen-house algorithm 4200 is nearly identical to the kitchen range hood algorithm 4100. The only difference between these algorithms is the fact the kitchen-house algorithm 4200 changes the fan speed of the whole-house ventilation system, while the kitchen range hood algorithm 4100 only changes the fan speed of the range hood. For the same reasons as discussed above and for the sake of brevity, algorithm 4200 will be shown in FIG. 64, but will not be described in additional detail herein.

The bathroom algorithm 5000 determines if a bathroom monitoring device 102 is connected to a bathroom fan in step 5010. If the bathroom monitoring device 102 is connected to a bathroom fan, then the bathroom fan algorithm 5100 is performed. This algorithm is almost identical to the range hood algorithm 3010 that is discussed above in connection with FIG. 60. The only difference is that algorithm 5100 substitutes PM2.5 for the derivative of the relative humidity. Thus, for the sake of brevity, algorithm 5100 will be shown in FIG. 65, but will not be described in additional detail herein. Alternatively, if the bathroom monitoring device 102 is not connected to a bathroom fan, then the bathroom-house algorithm 4200 is performed. The bathroom-house algorithm 5200 is identical to the kitchen-house algorithm 4200. For the same reasons as discussed above and for the sake of brevity, algorithm 5200 will be shown in FIG. 66, but will not be described in additional detail herein.

The living room/bedroom algorithm 6000 first checks to see if the structure 100 has a HERV in step 6010. If there is a HERV, then the system 10 runs the living room/bedroom-house algorithm 6200. The living room/bedroom house algorithm 6200 is identical to the kitchen-house algorithm 4200. For the same reasons as discussed above and for the sake of brevity, algorithm 6200 will be shown in FIG. 68, but will not be described in additional detail herein. Alternatively, if the structure 100 does not have an entire house ventilation system, then the system 10 will pick the bathroom fan that is closest to the monitoring device 102 in step 6012. The living room/bedroom fan algorithm 5100 is identical to the bathroom fan algorithm 5100. Thus, for the sake of brevity, algorithm 6100 will be shown in FIG. 67, but will not be described in additional detail herein.

Figure 70A:
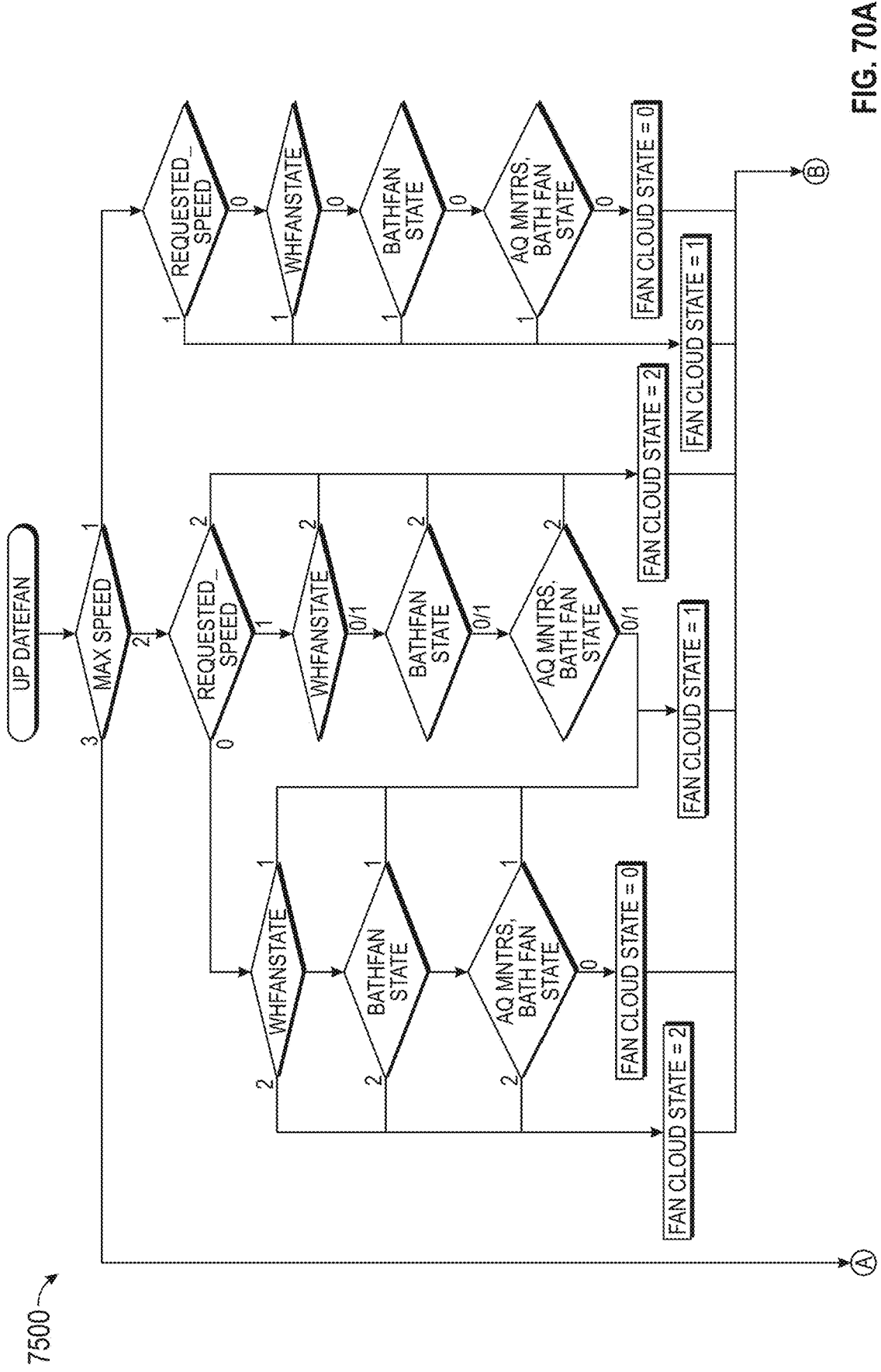
Figure 70B:
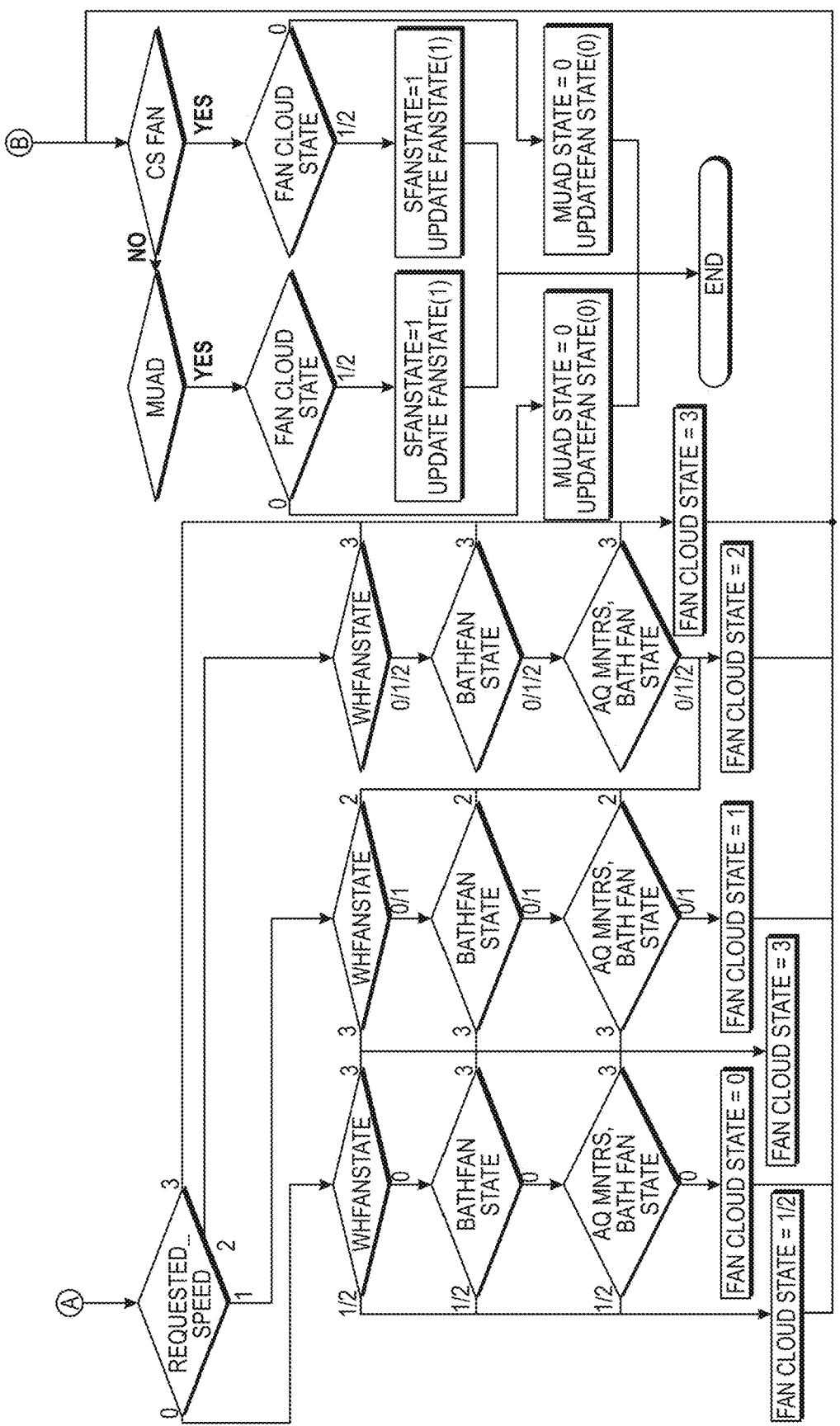
Figure 71:
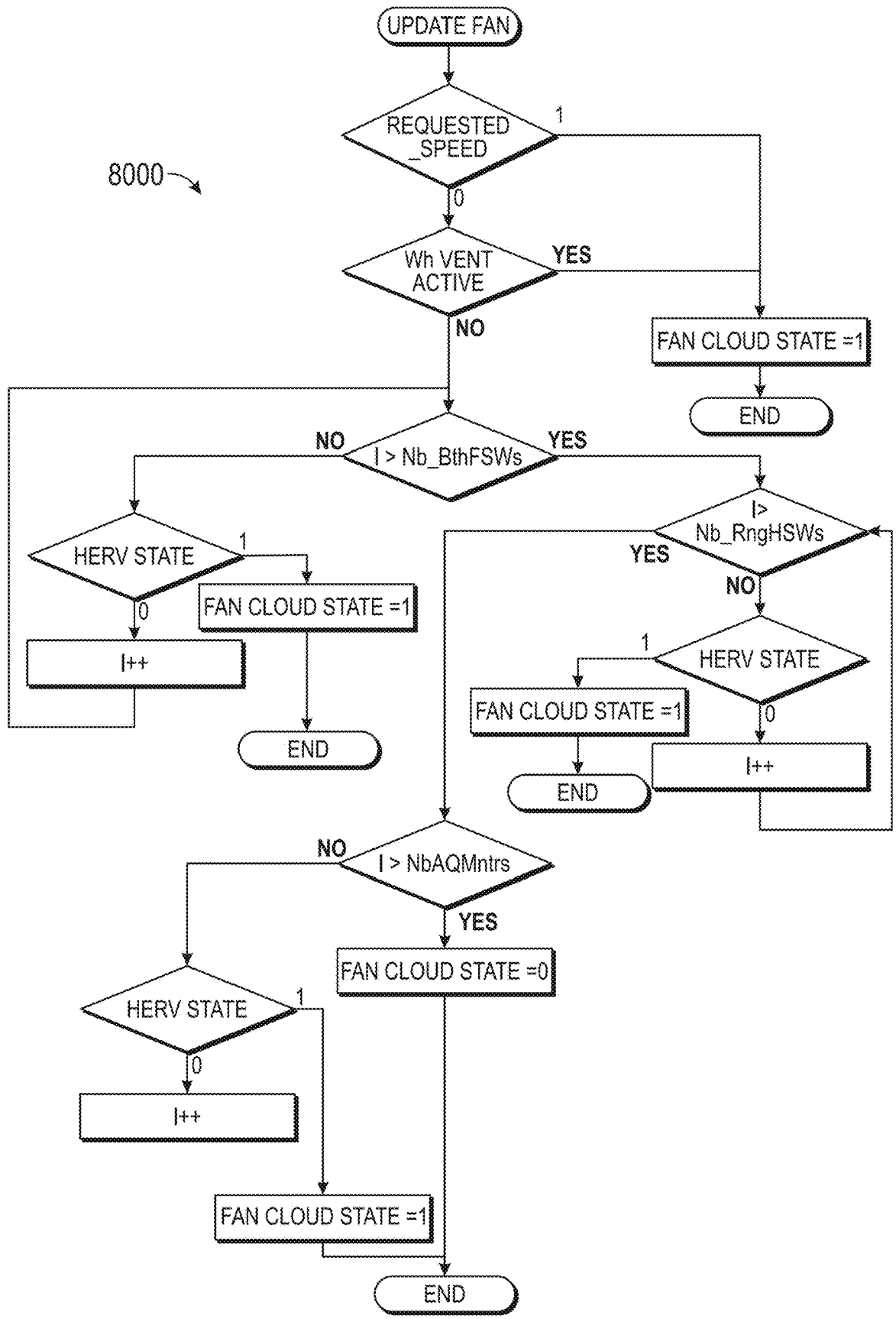
Figure 72:
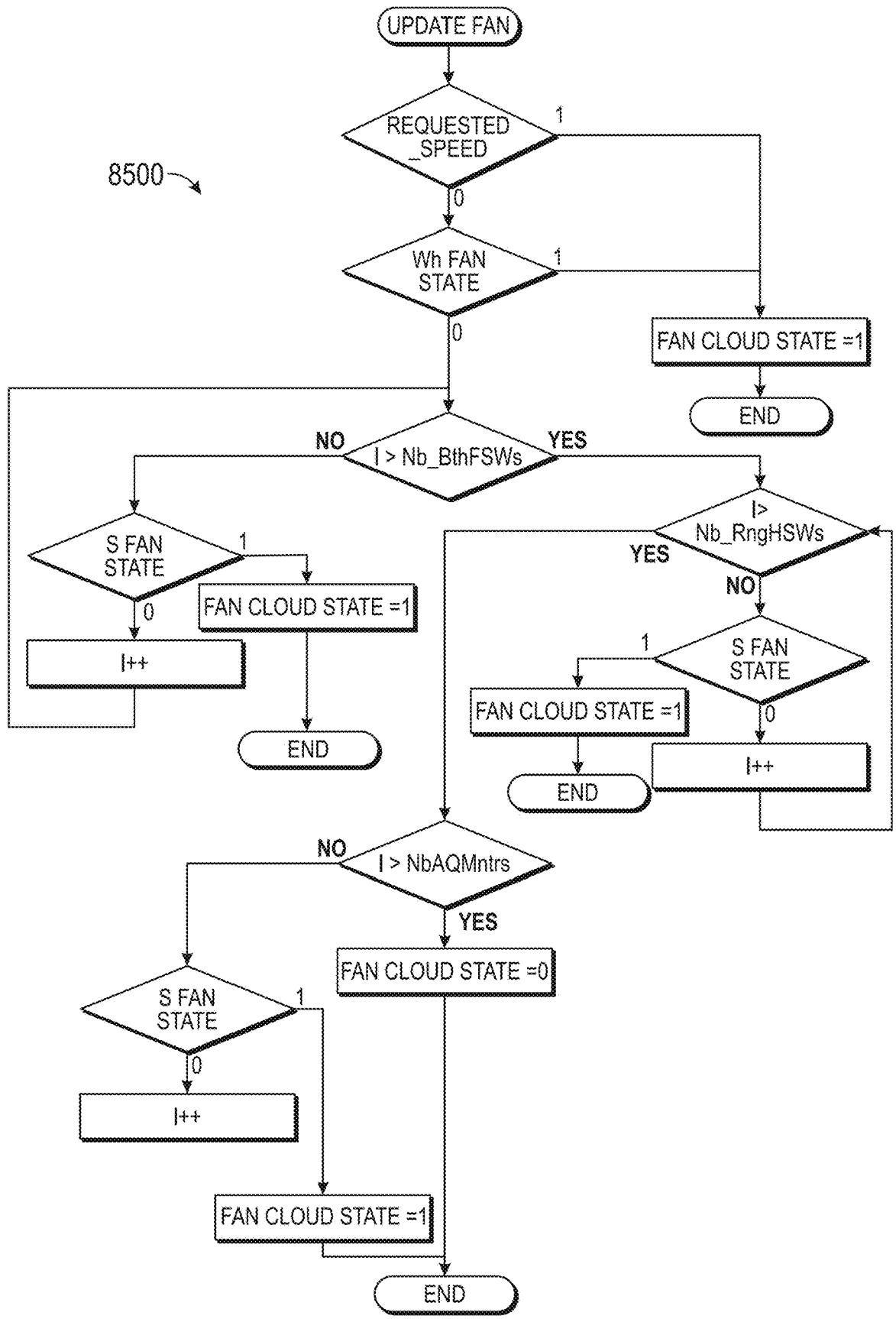

While system 10 is performing the above algorithms, the system 10 may receive multiple different requests from different monitoring devices 102. For example, the connected range hood may be instructing the fan speed to be equal to the max level, while the kitchen-room based sensor may be instructing the fan speed be equal to the lowest level. This is possible due to the concentration of pollutants in a single location. Thus, the algorithms shown in FIGS. 69-72 ensure that the highest fan speed is chosen for the selected device. Specifically, the algorithms shown in these figures compare all inputs from the monitoring devices 102 and then select the highest level. Specifically, the algorithm 7000 is shown in FIG. 69 is related to the bathroom fans, algorithm 7500 that is shown in FIG. 70 is related to the range hoods, algorithm 8000 that is shown in FIG. 71 is related to a HERV. Also, to balance the air exhaust from these devices, the system 10 utilizes a supply fan or make-up air damper to help ensure that the house stays balanced. Similar to how the monitoring devices 102 can have different levels, algorithms 7000, 7500, and 8000 can also have different requested levels from the supply fan. Thus, algorithm 8500 is utilized to ensure that the highest requested supply fan setting is utilized.

Figure 58A:
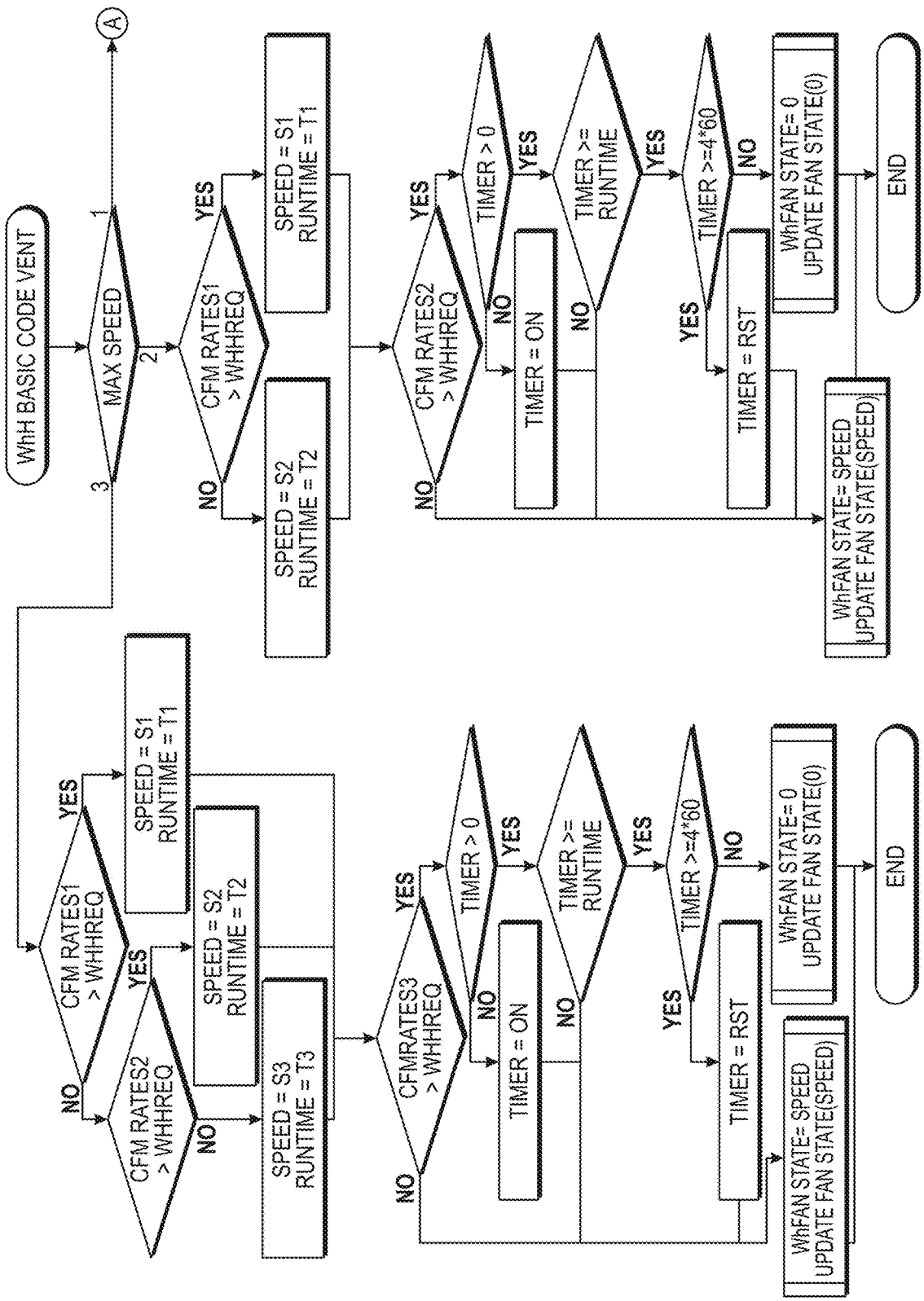
Figure 58B:
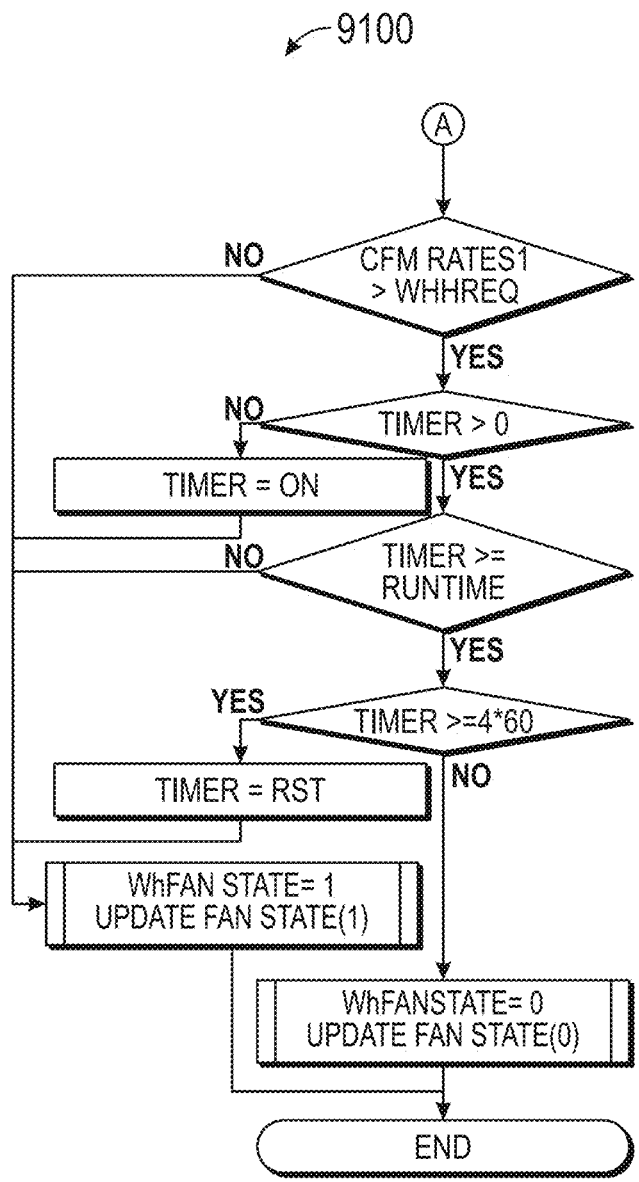

FIG. 57 contains the building code algorithm 9000 that ensures that more than a predefined amount of air is vented out of the structure 100 over a predefined amount of time. Similar to the other algorithms that are discussed above, building code algorithm 9000 first checks to see if the do not disturb setting is on in step 9010. If the do not disturb is on, then the building code algorithm 9000 does not perform any additional steps. However, if the do not disturb is off, then the building code algorithm 9000 checks to see if the system 10 utilizes the basic ventilation algorithm 9100 or the advanced algorithm 9500. Referring to FIG. 58, if the system 10 is set up to use the basic ventilation algorithm 9100, the system 10 first determines a fan speed and time that the whole house ventilation fan needs to run in order to meet the code requirements. For example, a lower fan speed will require additional running time. Next, the algorithm 9100 splits the total run time of the fan over four hour blocks and then runs the fan for that set amount of time. For example, if the daily run time of the fan was calculated to be 8 hours, then the fan would need to run for 1.33 hours out of every 4 hours. Unlike the basic algorithm 9100 shown in FIG. 59, the advanced algorithm 9500 shown in FIG. 59 gives credit for all ventilation devices (bathroom fans, range hoods, etc.) contained within the structure 100.

In an alternative embodiment, the building code algorithm 9000 may be replaced by the algorithms described within U.S. patent application Ser. No. 16/243,056 or 16/242,498, both of which are fully incorporated herein by reference.

Figure 59:
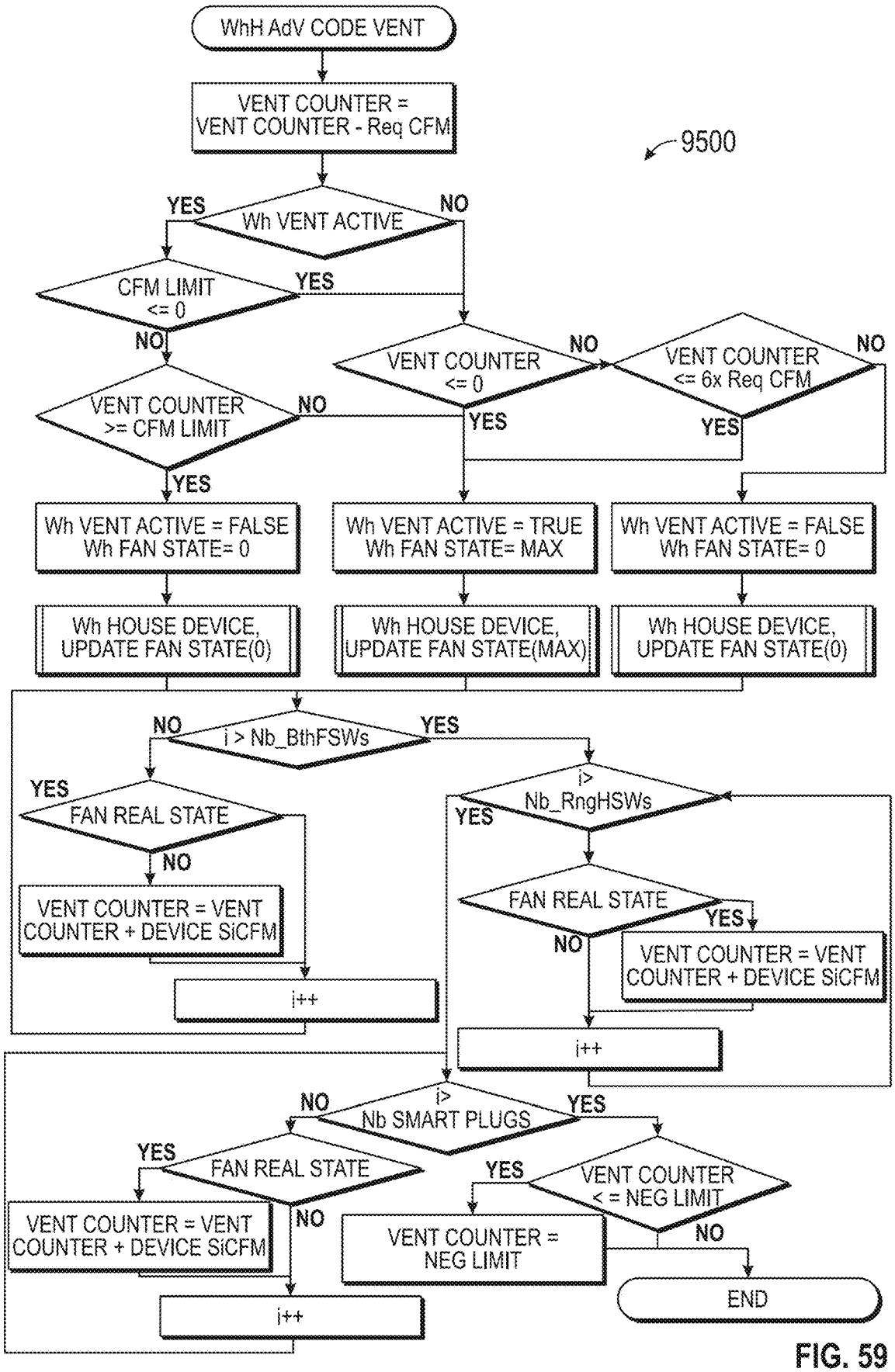
Figure 60:
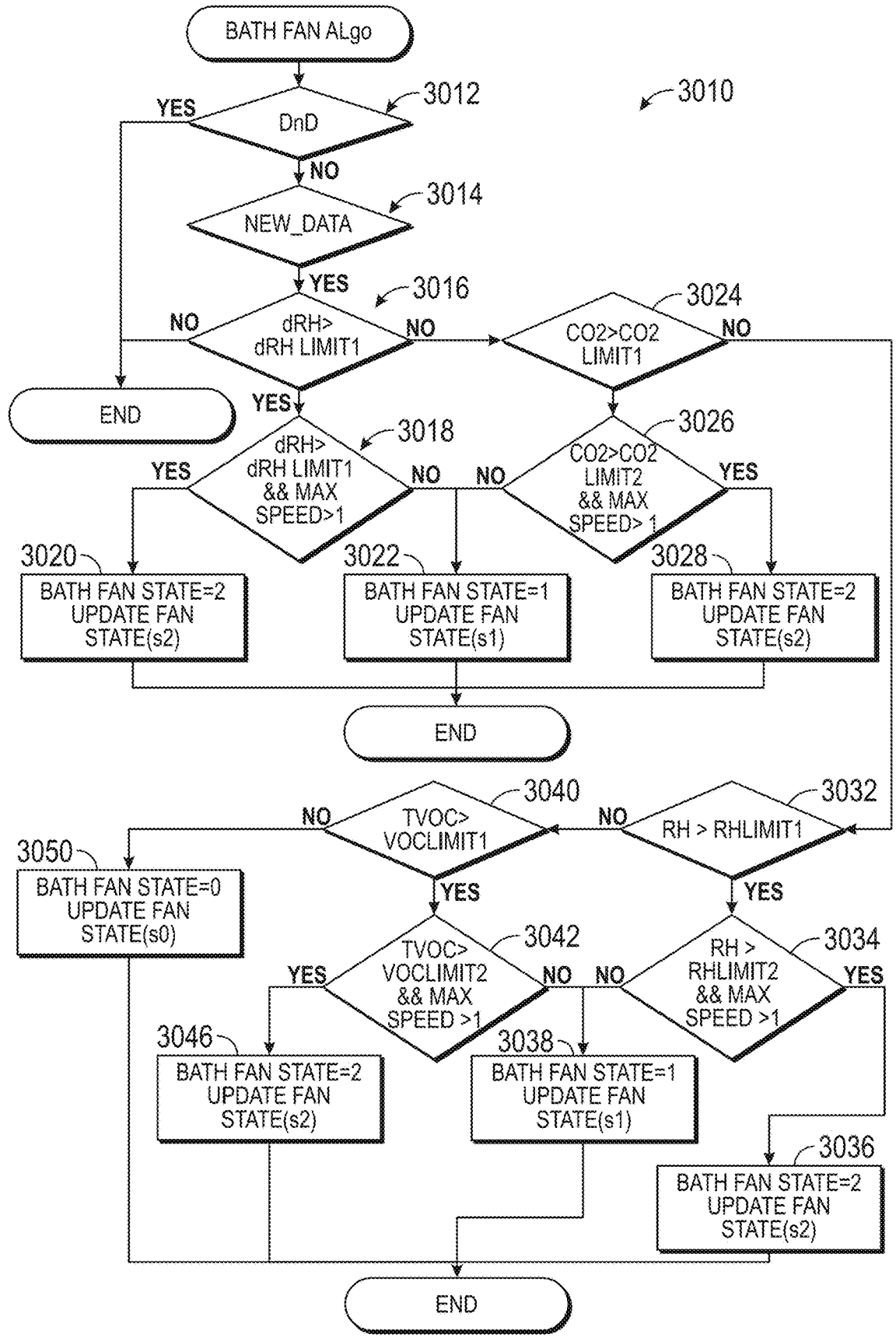
Figure 61A:
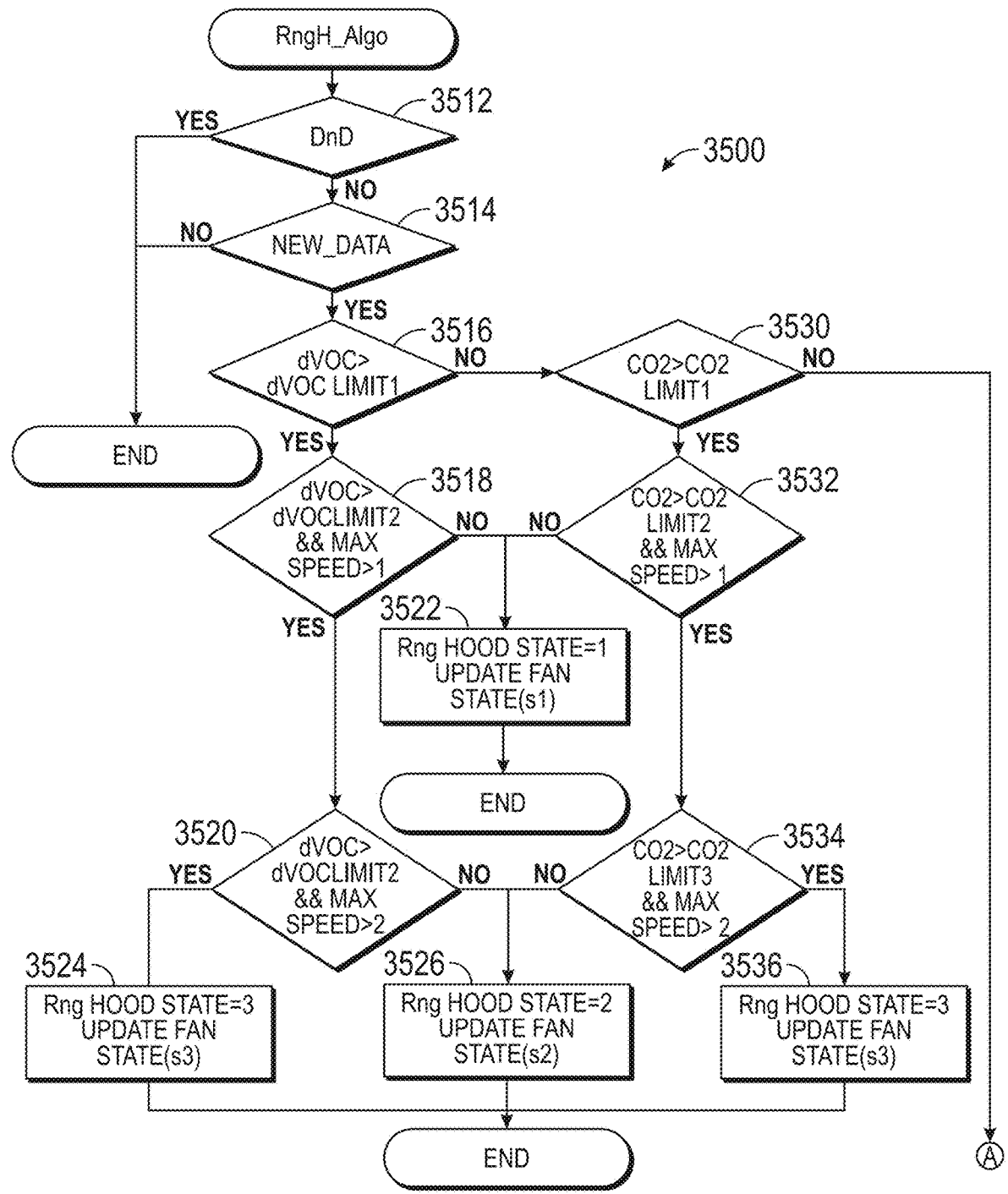
Figure 61B:
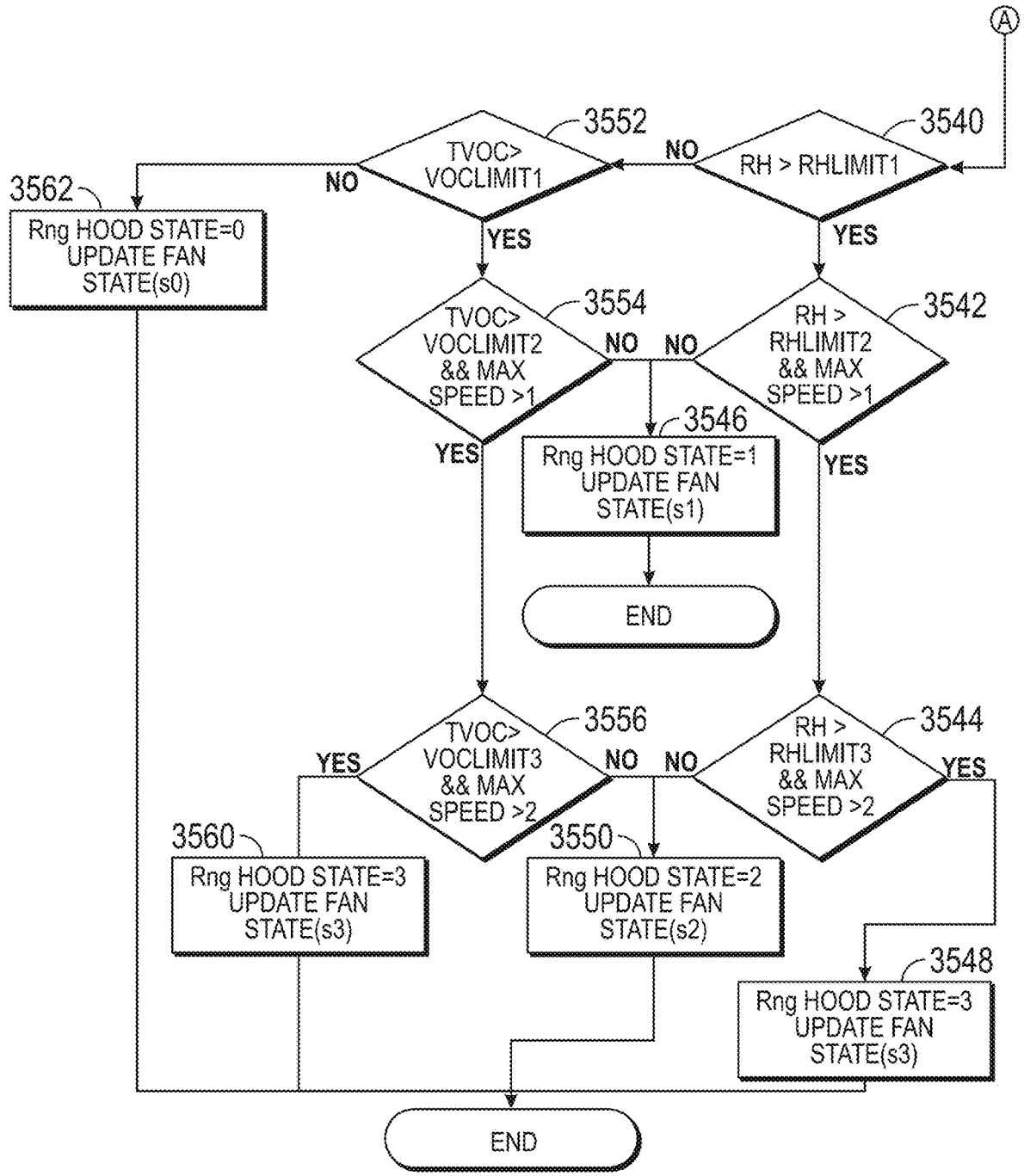
Figure 62:
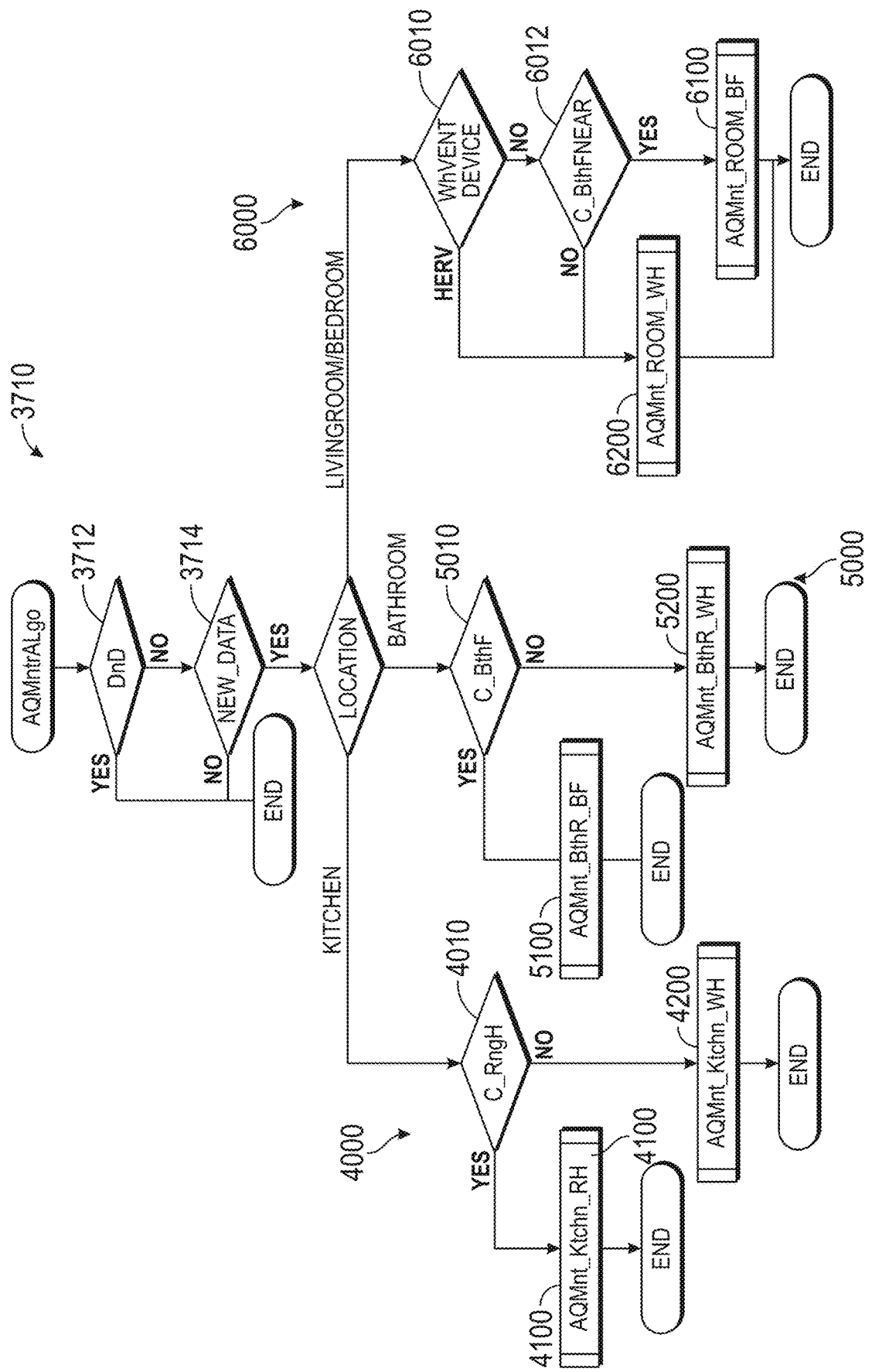
Figure 63:
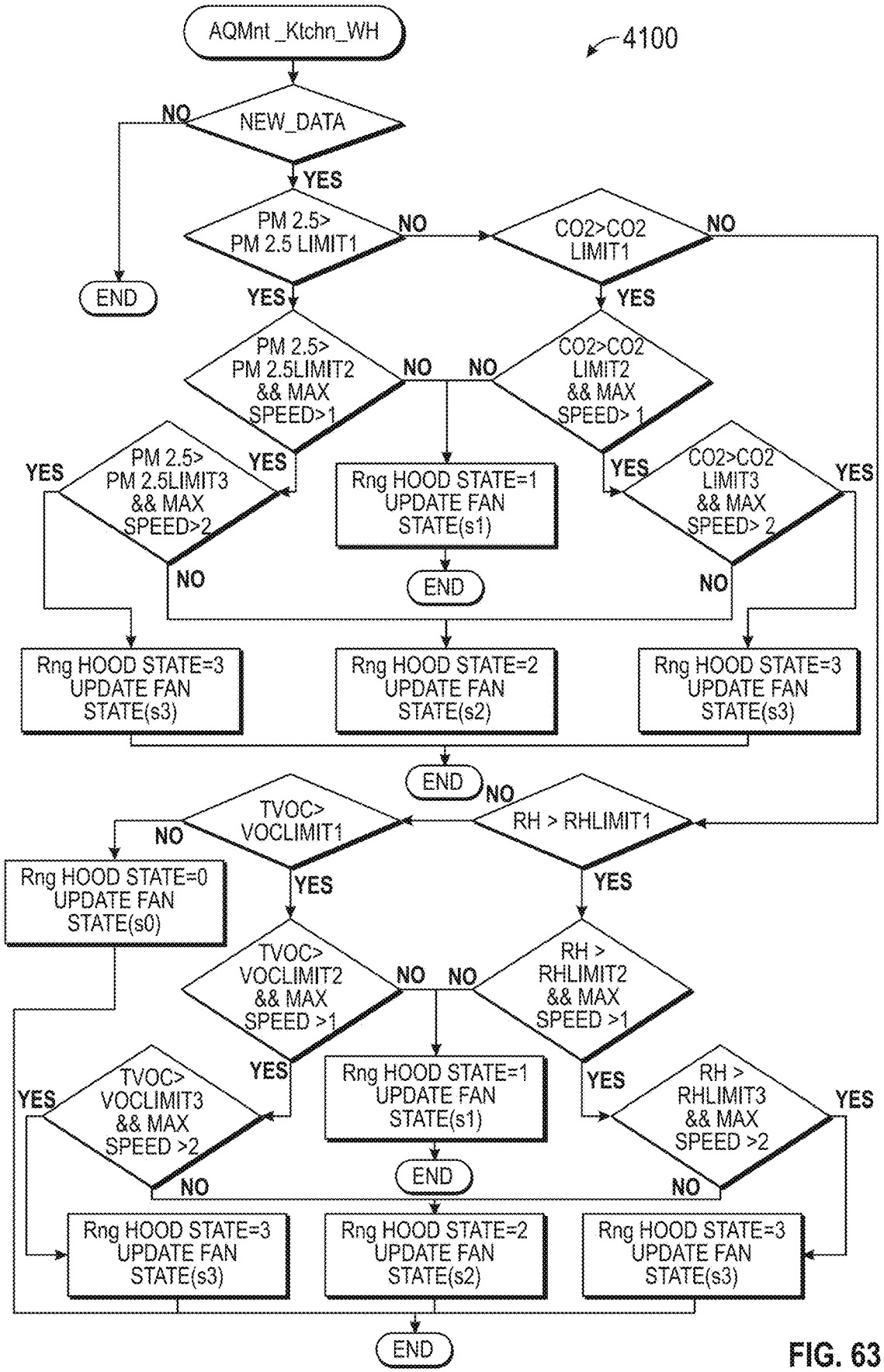
Figure 64A:
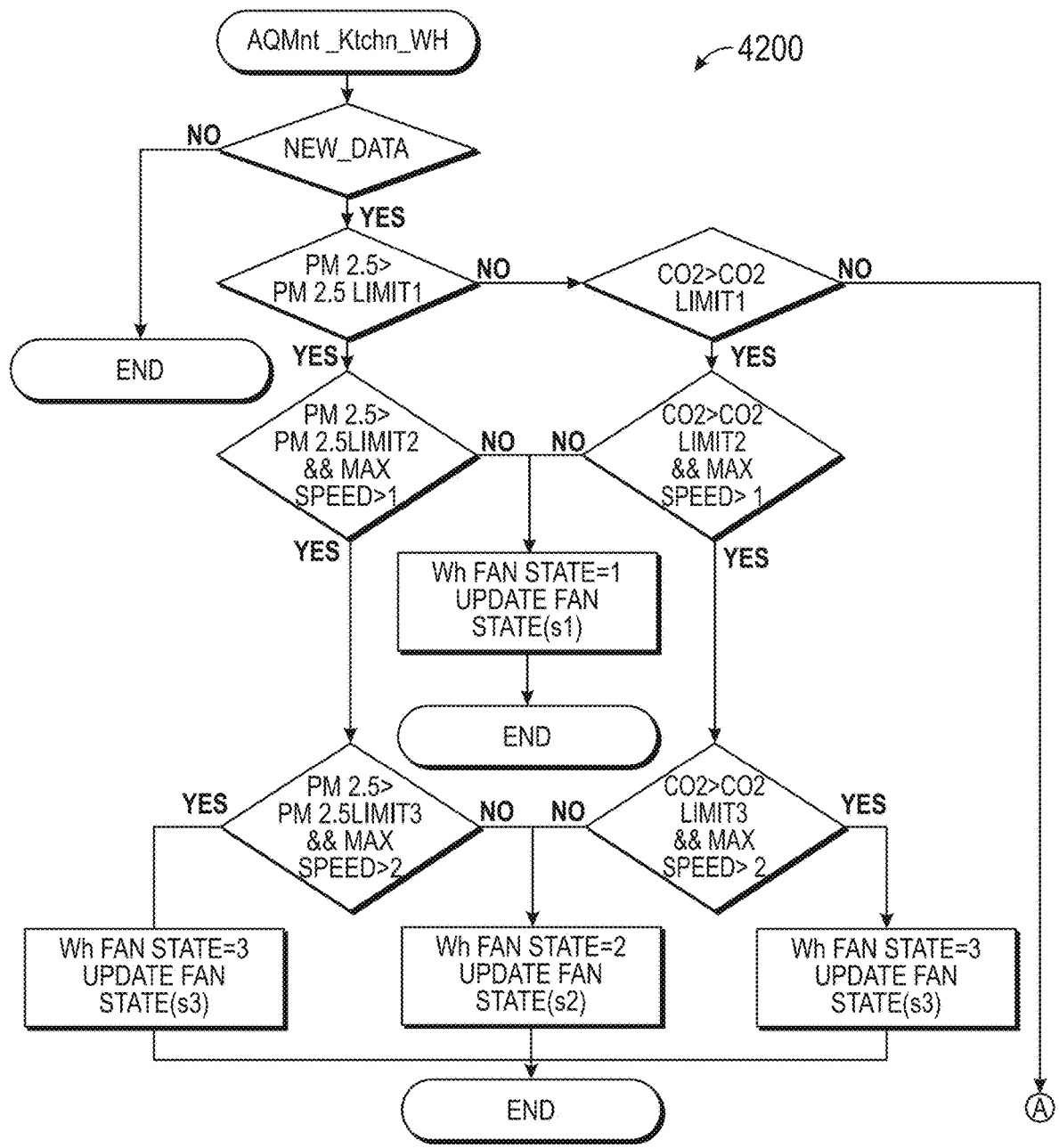
Figure 64B:
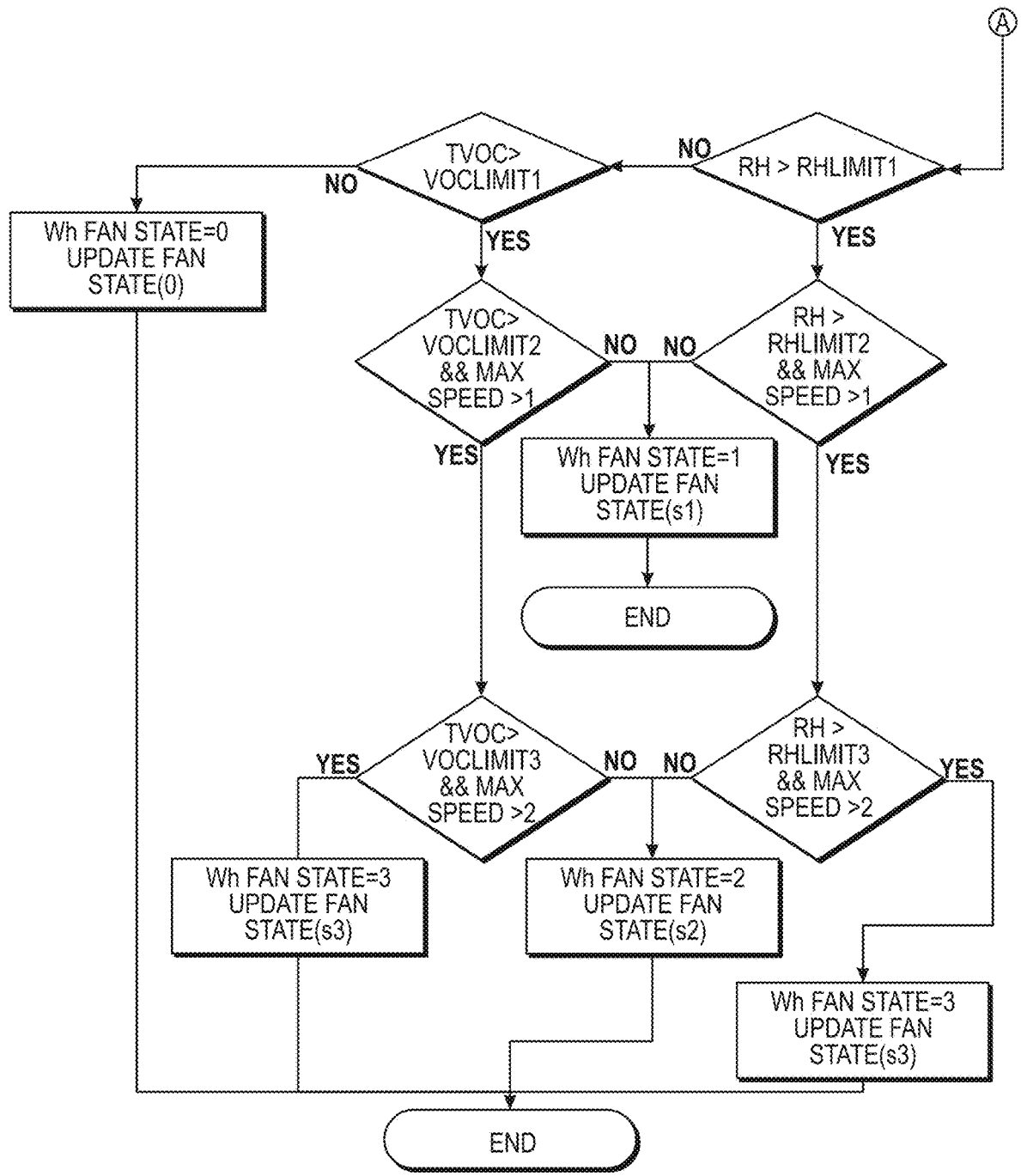
Figure 65:
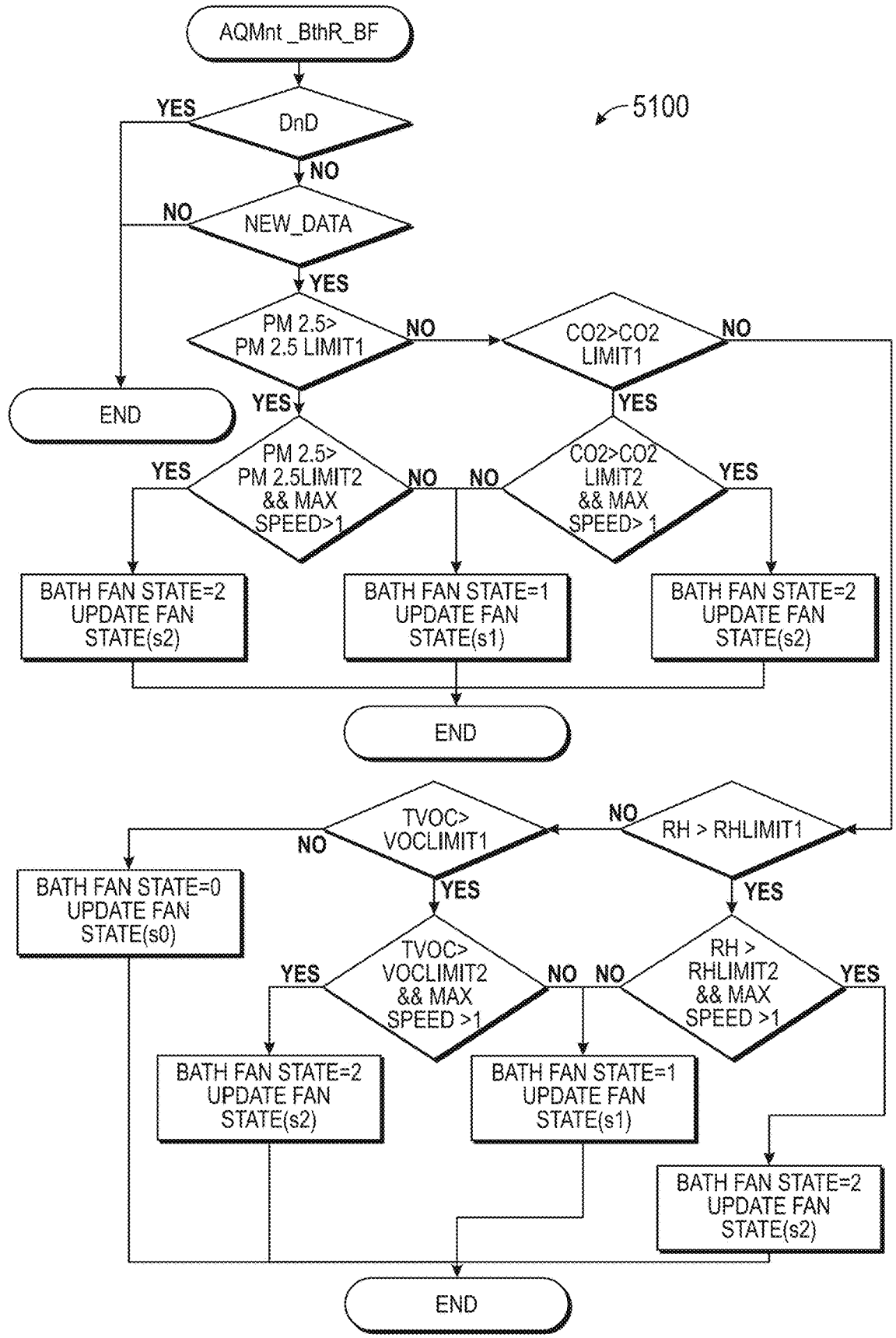
Figure 66A:
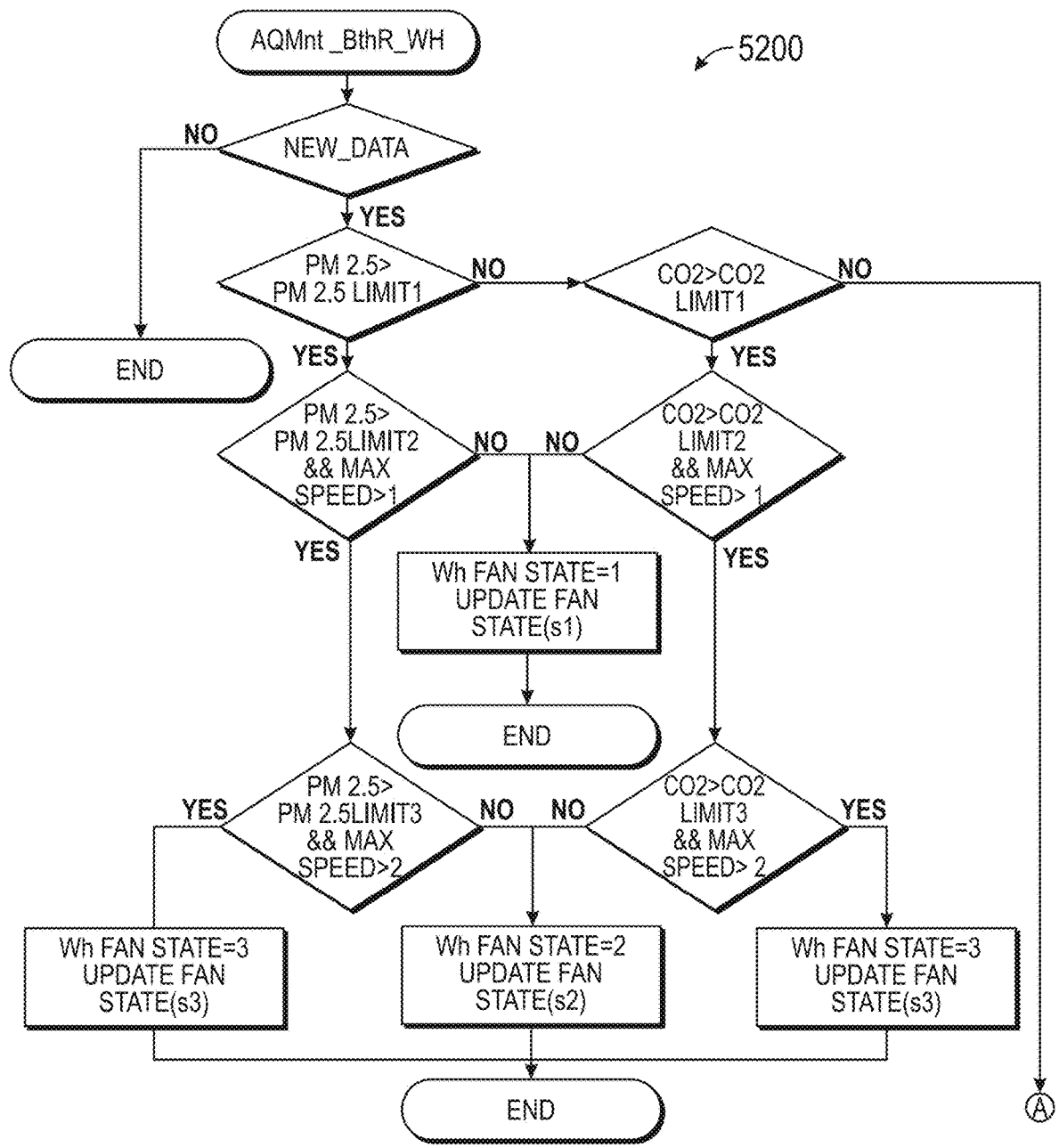
Figure 66B:
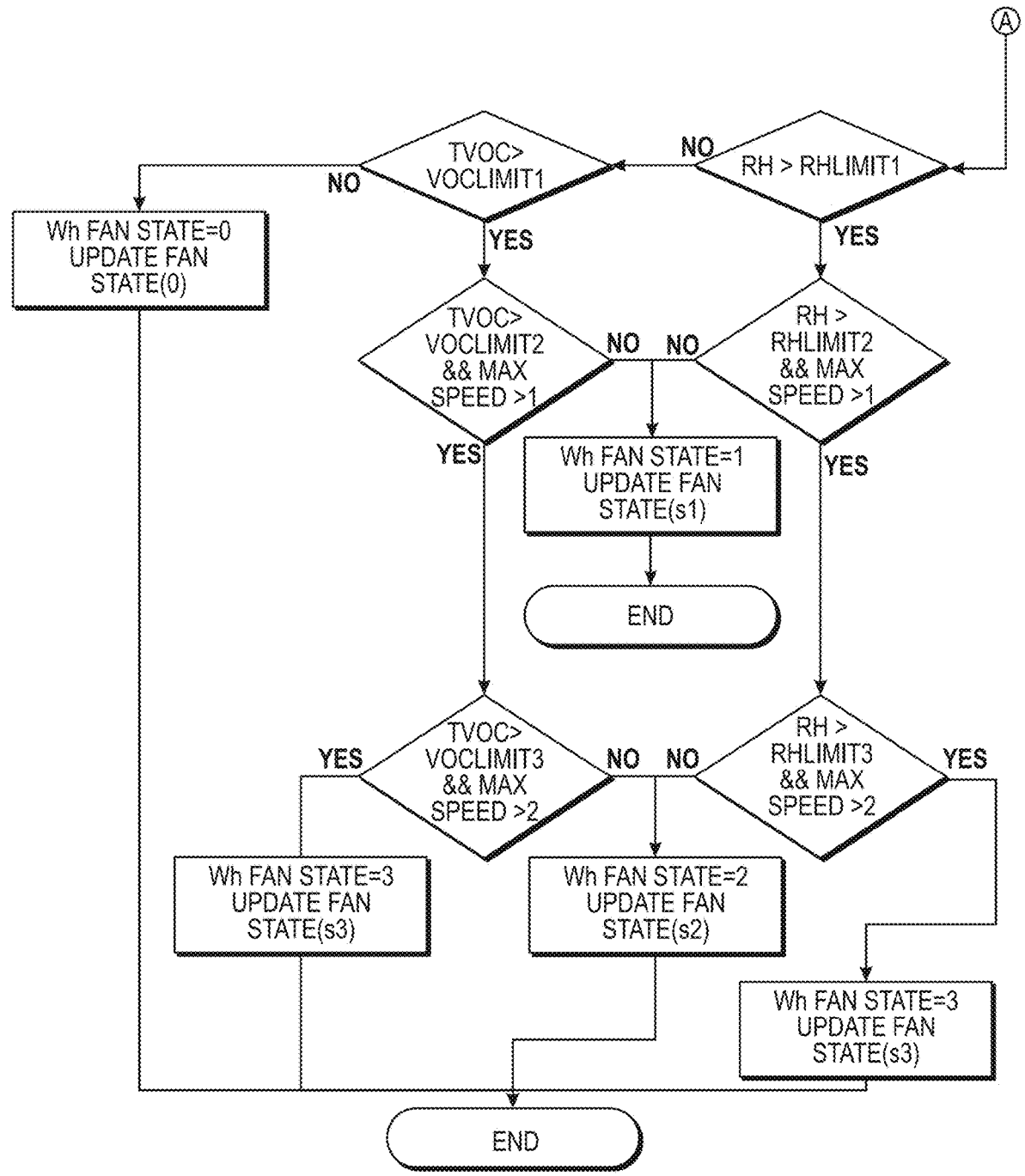
Figure 67:
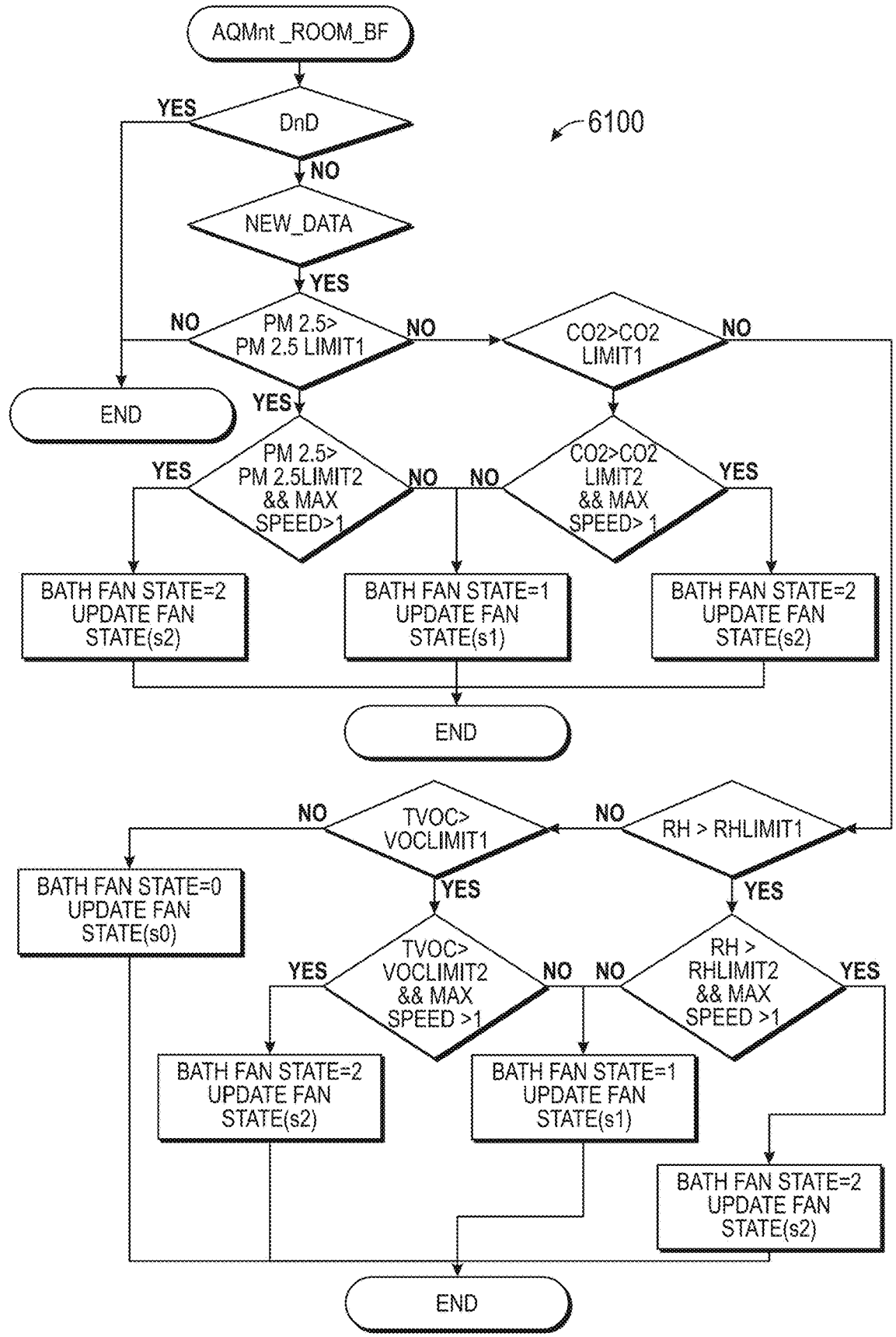
Figure 68A:
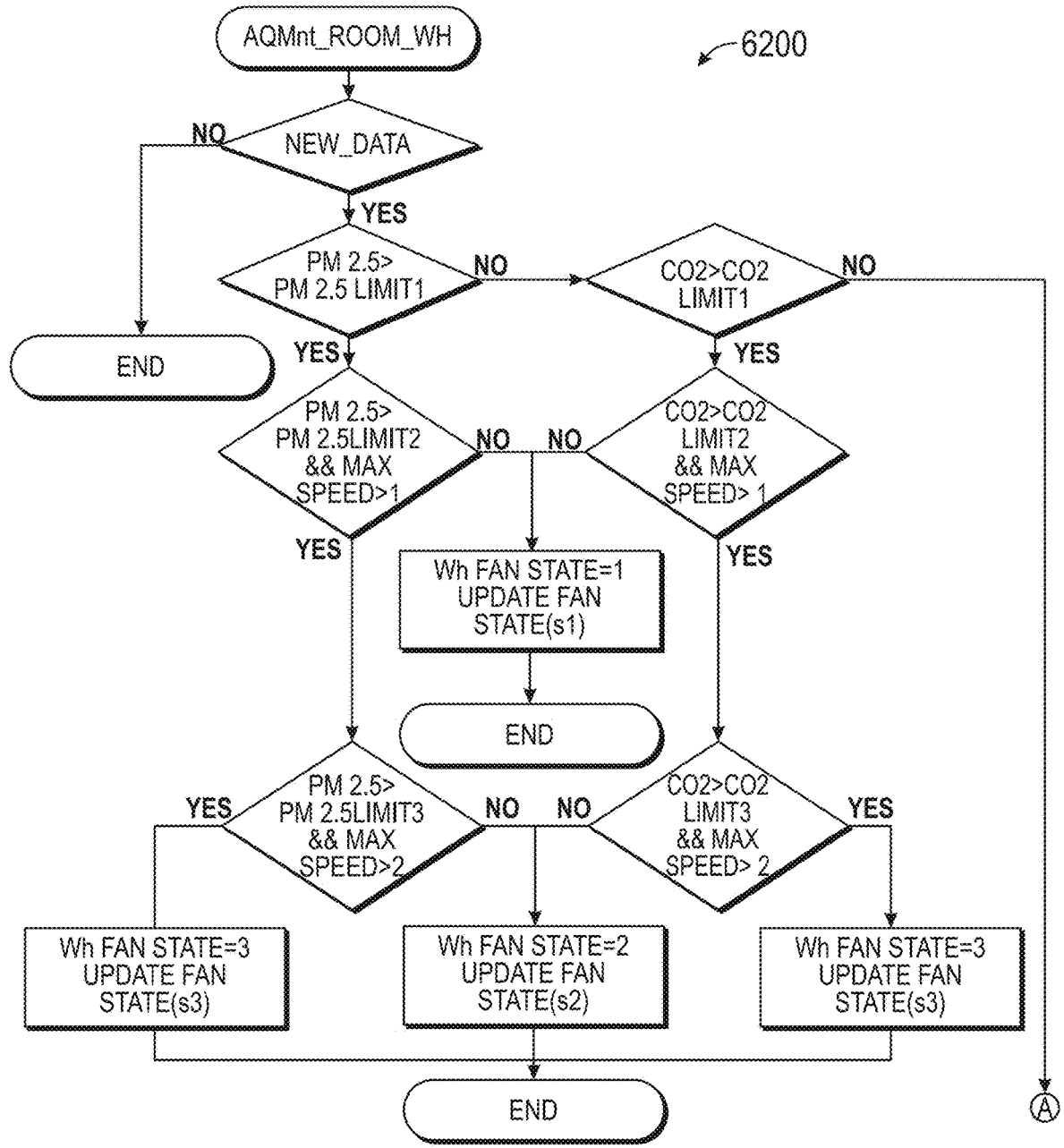
Figure 68B:
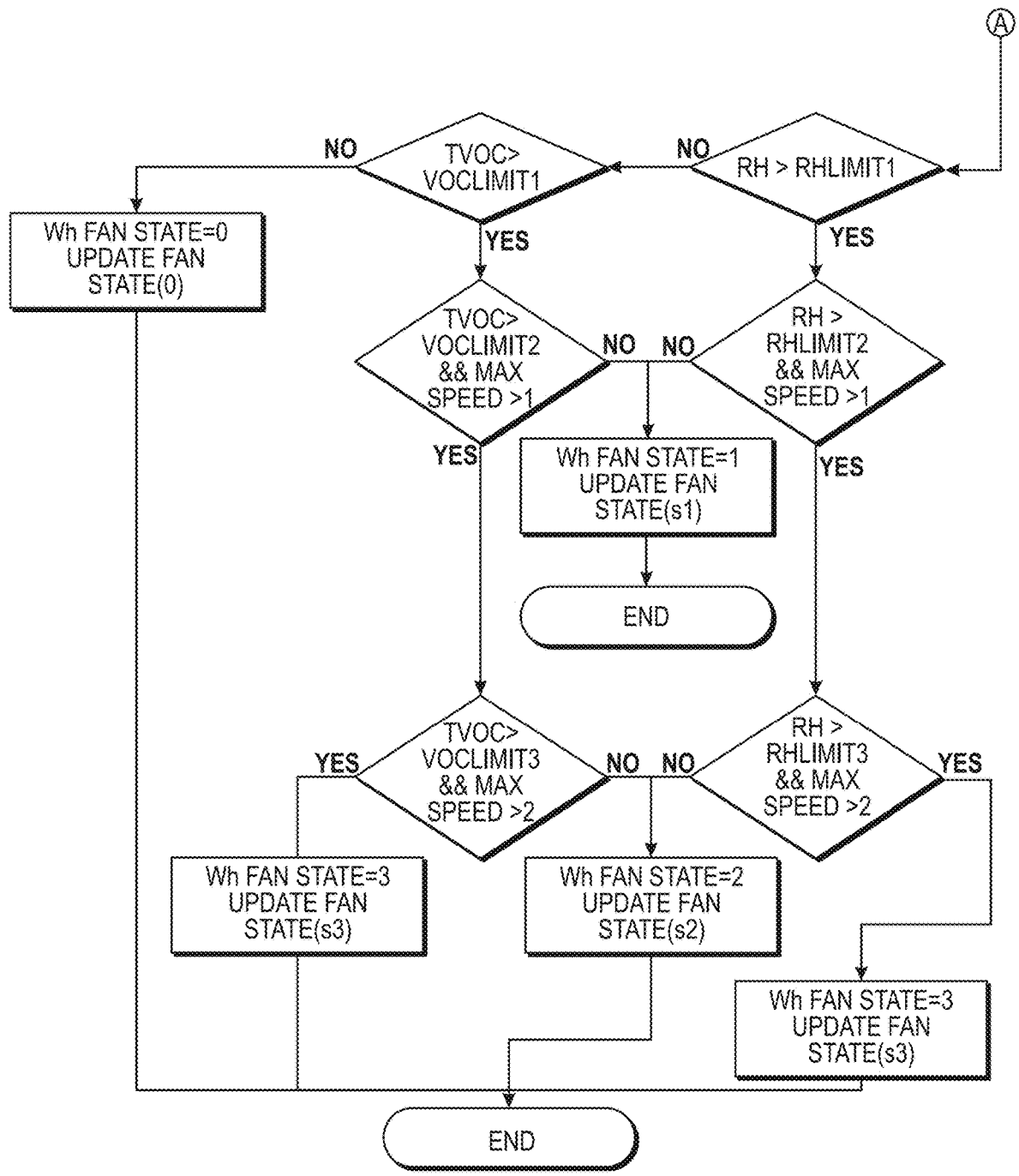

Below is a list of the acronyms that are used in connection with FIGS. 56-72:

| Acronym | Description |
|---|---|
| | FIG. 56 |
| IAQ_Algo | Indoor air quality main algorithm 3000 |
| DnD | Do not disturb mode for the entire system 3002 |
| NB_BthFSWs | Number of connected bath fan switches |
| BthF_Algo | Bath fan control algorithm 3010 |
| Nb_RngHSWs | Number of connected range hood switches |
| RngH_Algo | Range hood control algorithm 3490 |
| Nb_AQMntrs | Number of connected air quality monitors (Room Monitoring Devices 102) |
| AQMntr_Algo | Air quality monitor algorithm 3710 |
| | FIG. 57 |
| CodeVentHandler | Building code Algorithm 9000 |
| DnD | Do not disturb mode for the entire system 3010 |
| CodeMode | User preference on code mode |
| WhHBasicCodeVent | Algorithm for basic whole house ventilation mode 9100 |
| WhHAdvCodeVent | Algorithm for advanced whole house ventilation mode 9500 |
| | FIG. 58 |
| WhHBasicCodeVent | Algorithm for basic whole house ventilation mode 9100 |
| maxSpeed | Maximum speed available on the ventilation device |
| WhHReq | The ventilation requirement for the whole house as calculated by the building code's equations |
| RunTime | The required portion of time to run the ventilation device |
| WhVentcfm | Airflow rate of the whole house ventilation device |
| CfmRateS1 | Airflow rate of the whole house ventilation device at speed 1 |
| CfmRateS2 | Airflow rate of the whole house ventilation device at speed 2 |
| CfmRateS3 | Airflow rate of the whole house ventilation device at speed 3 |
| S1 | set device to first speed |
| S2 | set device to second speed |
| S3 | set device to third speed |
| T1 | The required portion of time based on the air flow rate for speed 1 |
| T2 | The required portion of time based on the air flow rate for speed 2 |
| T3 | The required portion of time based on the air flow rate for speed 3 |
| Timer | A running timer for reference |
| WhFanState | The recommended whole house ventilation device's state based on the whole house ventilation algorithm |
| UpdateFanState | A call of central algorithm to handle updating the fan state for a the whole house ventilation device |
| Rst | Reset the reference timer |
| | FIG. 59 |
| WhHAdvCodeVent | Algorithm for advanced whole house ventilation mode |
| VentCounter | A counter of the accumalated airflow rate from the whole house ventilation device as well as other connected ventilation devices |
| ReqCFM | The ventilation requirement for the whole house as calculated by the building code's equations |
| WhHouseDevice | The ventilation device set as the whole house ventilation device |
| Max | Maximum speed available on the whole houseventilation device |
| CFMLimit | The limit needed for the counter to reach to allow the whole house ventilation device to be turned off |
| WhVentActive | Is the whole house ventilation device running |
| WhFanState | The recommended whole house ventilation device's state based on the whole house ventilation algorithm |
| UpdateFanState | A call of central algorithm to handle updating the fan state for a the whole house ventilation device |
| Nb_BthFSWs | Number of connected bath fan switches |
| Nb_RngHSWs | Number of connected range hood switches |

| Acronym | Description |
| --- | --- |
| NbSmartPlugs | Number of devices connected to a smart plug |
| FanRealState | The current state of the device's fan as reported by the hardware |
| DeviceSiCFM | The device's airflow rate |
| NegLimit | The negative limit before reseting the counter |

FIG. 60

| Acronym | Description |
| --- | --- |
| BathFanAlgo | Air quality algorithm for a bath fan switch 3010 |
| DnD | Do not disturb mode for this device 3012 |
| New_Data | was the sensor data updated since the last execution 3014 |
| dRH | Derivative of the relative humidity |
| dRHLIMIT1 | First threshold for the derivative of the relative humidity |
| dRHLIMIT2 | Second threshold for the derivative of the relative humidity |
| CO2 | CO2 level from the sensor data |
| CO2LIMIT1 | First threshold for the CO2 level |
| CO2LIMIT2 | Second threshold for the CO2 level |
| TVOC | TVOC level from the sensor data |
| VOCLIMIT1 | First threshold for the TVOC level |
| VOCLIMIT2 | Second threshold for the TVOC level |
| RH | Relative Humidity level from the sensor data |
| RHLIMIT1 | First threshold for the relative humidity |
| RHLIMIT2 | Second threshold for the relative humidity |
| BathFanState | The recommended bath fan state based on the air quality algorithm |
| UpdateFanState | A call of central algorithm to handle updating the fan state for a bathfan switch |
| s1 | set device to first speed |
| s2 | set device to second speed |
| s3 | set device to third speed |
| maxSpeed | Maximum speed available on the ventilation device |

FIG. 61

| Acronym | Description |
| --- | --- |
| RngH_Algo | Air quality algorithm for a range hood switch 3500 |
| DnD | Do not disturb mode for this device 3512 |
| New_Data | was the sensor data updated since the last execution 3514 |
| dVOC | Derivative of the relative humidity |
| dVOCLIMIT1 | First threshold for the derivative of the TVOC |
| dVOCLIMIT2 | Second threshold for the derivative of TVOC |
| dVOCLIMIT3 | Third threshold for the derivative of TVOC |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| RngHoodState | The recommended range hood state based on the air quality algorithm |
| UpdateFanState | A call of central algorithm to handle updating the fan state for a rangehood switch |
| s1 | set device to first speed |
| s2 | set device to second speed |
| s3 | set device to third speed |
| maxSpeed | Maximum speed available on the ventilation device |

FIG. 62

| Acronym | Description |
| --- | --- |
| AQMntrAlgo | Air quality algorithm for an AQ Monitor 3710 |
| DnD | Do not disturb mode for this device 3712 |
| NewData | was the sensor data updated since the last execution 2714 |
| Location | The current location of the AQ monitor |
| C_RngH | Is there a connected range hood in this kitchen 4010 |
| C_BthF | Is there a connected bath fan in this bathroom 5010 |
| WhVentDevice | The ventilation device set as the whole house ventilation device 6010 |
| C_BthFNear | Is there a linked bath fan set by the user 6012 |
| AQMnt_Ktchn_RH | Air quality algorithm for an AQ Monitor in a Kitchen with range hood 4100 |
| AQMnt_Ktchn_WH | Air quality algorithm for an AQ Monitor in a Kitchen without range hood 4200 |
| AQMnt_BthR_BF | Air quality algorithm for an AQ Monitor in a bathroom with bath fan 5100 |

-continued

| Acronym | Description |
| --- | --- |
| AQMnt_BthR_WH | Air quality algorithm for an AQ Monitor in a bathroom without bath fan 5200 |
| AQMnt_Room_WH | Air quality algorithm for an AQ Monitor in a room without user linked bath fan 6200 |
| AQMnt_Room_BF | Air quality algorithm for an AQ Monitor in a room with user linked bath fan 6100 |

FIG. 63

| Acronym | Description |
| --- | --- |
| AQMnt_Ktchn_RH | Air quality algorithm for an AQ Monitor in a Kitchen with range hood 4100 |
| NewData | Do not disturb mode for this device |
| PM2.5 | PM2.5 level from the sensor data |
| PM2.5LIMIT1 | First threshold for the PM2.5 level |
| PM2.5LIMIT2 | Second threshold for the PM2.5 level |
| PM2.5LIMIT3 | Third threshold for the PM2.5 level |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| RngHoodState | The recommended range hood state based on the air quality algorithm |
| UpdateFanState | A call of central algorithm to handle updating the fan state for a rangehood switch |
| s1 | set device to first speed |
| s2 | set device to second speed |
| s3 | set device to third speed |
| maxSpeed | Maximum speed available on the ventilation device |

FIG. 64

| Acronym | Description |
| --- | --- |
| AQMnt_Ktchn_WH | Air quality algorithm for an AQ Monitor in a Kitchen without range hood 4200 |
| NewData | Do not disturb mode for this device |
| PM2.5 | PM2.5 level from the sensor data |
| PM2.5LIMIT1 | First threshold for the PM2.5 level |
| PM2.5LIMIT2 | Second threshold for the PM2.5 level |
| PM2.5LIMIT3 | Third threshold for the PM2.5 level |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| WhFanState | The recommended whole house ventilation device's fan state based on the air quality algorithm |
| UpdateFanState | A call of central algorithm to handle updating the fan state for a the whole house ventilation device |
| s1 | set device to first speed |
| s2 | set device to second speed |
| s3 | set device to third speed |
| maxSpeed | Maximum speed available on the ventilation device |

FIG. 65

| Acronym | Description |
| --- | --- |
| AQMnt_BthR_BF | Air quality algorithm for an AQ Monitor in a bathroom with bath fan 5100 |
| NewData | Do not disturb mode for this device |
| PM2.5 | PM2.5 level from the sensor data |
| PM2.5LIMIT1 | First threshold for the PM2.5 level |
| PM2.5LIMIT2 | Second threshold for the PM2.5 level |
| PM2.5LIMIT3 | Third threshold for the PM2.5 level |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |

-continued

| Acronym | Description |
| --- | --- |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| BathFanState | The recommended bath fan state based on the air quality algorithm |
| UpdateFanState | A call of central algorithm to handle updating the fan state for a bathfan switch |
| s1 | set device to first speed |
| s2 | set device to second speed |
| s3 | set device to third speed |
| maxSpeed | Maximum speed available on the ventilation device |

FIG. 66

| Acronym | Description |
| --- | --- |
| AQMnt_BthR_WH | Air quality algorithm for an AQ Monitor in a bathroom without bath fan 5200 |
| NewData | Do not disturb mode for this device |
| PM2.5 | PM2.5 level from the sensor data |
| PM2.5LIMIT1 | First threshold for the PM2.5 level |
| PM2.5LIMIT2 | Second threshold for the PM2.5 level |
| PM2.5LIMIT3 | Third threshold for the PM2.5 level |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| WhFanState | The recommended whole house ventilation device's fan state based on the air quality algorithm |
| UpdateFanState | A call of central algorithm to handle updating the fan state for a the whole house ventilation device |
| s1 | set device to first speed |
| s2 | set device to second speed |
| s3 | set device to third speed |
| maxSpeed | Maximum speed available on the ventilation device |

FIG. 67

| Acronym | Description |
| --- | --- |
| AQMnt_Room_BF | Air quality algorithm for an AQ Monitor in a room with user linked bath fan 6100 |
| NewData | Do not disturb mode for this device |
| PM2.5 | PM2.5 level from the sensor data |
| PM2.5LIMIT1 | First threshold for the PM2.5 level |
| PM2.5LIMIT2 | Second threshold for the PM2.5 level |
| PM2.5LIMIT3 | Third threshold for the PM2.5 level |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| BathFanState | The recommended bath fan state based on the air quality algorithm |
| UpdateFanState | A call of central algorithm to handle updating the fan state for a bathfan switch |
| s1 | set device to first speed |
| s2 | set device to second speed |
| s3 | set device to third speed |
| maxSpeed | Maximum speed available on the ventilation device |

FIG. 68

| Acronym | Description |
| --- | --- |
| AQMnt_Room_WH | Air quality algorithm for an AQ Monitor in a room without user linked bath fan 6200 |

| Acronym | Description |
| --- | --- |
| NewData | Do not disturb mode for this device |
| PM2.5 | PM2.5 level from the sensor data |
| PM2.5LIMIT1 | First threshold for the PM2.5 level |
| PM2.5LIMIT2 | Second threshold for the PM2.5 level |
| PM2.5LIMIT3 | Third threshold for the PM2.5 level |
| CO2 | CO2 level from the sensor data |
| CO2LIMIT1 | First threshold for the CO2 level |
| CO2LIMIT2 | Second threshold for the CO2 level |
| CO2LIMIT3 | Third threshold for the CO2 level |
| TVOC | TVOC level from the sensor data |
| VOCLIMIT1 | First threshold for the TVOC level |
| VOCLIMIT2 | Second threshold for the TVOC level |
| VOCLIMIT3 | Third threshold for the TVOC level |
| RH | Relative Humidity level from the sensor data |
| RHLIMIT1 | First threshold for the relative humidity |
| RHLIMIT2 | Second threshold for the relative humidity |
| RHLIMIT3 | Third threshold for the relative humidity |
| WhFanState | The recommended whole house ventilation device's fan state based on the air quality algorithm |
| UpdateFanState | A call of central algorithm to handle updating the fan state for a the whole house ventilation device |
| s1 | set device to first speed |
| s2 | set device to second speed |
| s3 | set device to third speed |
| maxSpeed | Maximum speed available on the ventilation device |

FIG. 69

| Acronym | Description |
| --- | --- |
| UpdateFan | Central algorithm to handle updating the fan state for a switch controlled bathfan 7000 |
| MaxSpeed | Maximum speed available on the ventilation device |
| RequestedSpeed | The speed to update the ventilation device's fan to |
| WhFanState | The recommended whole house ventilation device's state based on the whole house ventilation algorithm (if applicable) |
| BathFanState | The recommended bath fan state based on the smart switch's air quality algorithm |
| AQMntrs.BathFanState | The recommended bath fan state based on the AQ Monitor's air quality algorithm |
| FanCloudState | The status of the fan's ventilation device on the cloud |
| CSFan | Is there a connected supply fan in this smart home system |
| MUAD | Is there a connected Make up Air Damper in this smart home system |
| SFanState | The recommended supply fan state by the exhaust ventilation device |
| MUADState | The recommended MUAD state by the exhaust ventilation device |
| UpdateFanState | Central algorithm to handle updating the device's (Sfan or MUAD) fan state |

FIG. 70

| Acronym | Description |
| --- | --- |
| UpdateFan | Central algorithm to handle updating the fan state for a switch controlled rangehood 7500 |
| MaxSpeed | Maximum speed available on the ventilation device |
| RequestedSpeed | The speed to update the ventilation device's fan to |
| WhFanState | The recommended whole house ventilation device's state based on the whole house ventilation algorithm (if applicable) |
| RangeHoodState | The recommended range hood state based on the smart switch's air quality algorithm |
| AQMntrs.RangeHoodState | The recommended range hood state based on the AQ Monitor's air quality algorithm |
| FanCloudState | The status, on the cloud, of the fan's ventilation device |
| CSFan | Is there a connected supply fan in this smart home system |
| MUAD | Is there a connected Make up Air Damper in this smart home system |
| SFanState | The recommended supply fan state by the exhaust ventilation device |
| MUADState | The recommended MUAD state by the exhaust ventilation device |
| UpdateFanState | Central algorithm to handle updating the device's (Sfan or MUAD) fan state |

FIG. 71

| Acronym | Description |
| --- | --- |
| UpdateFan | Central algorithm to handle updating the fan state for a HERV 8000 |
| RequestedSpeed | The speed to update the ventilation device's fan to |
| WhFanState | The recommended whole house ventilation device's state based on the whole house ventilation algorithm (if applicable) |

-continued

| Acronym | Description |
| --- | --- |
| NB_BthFSWs | Number of connected bath fan switches |
| Nb_RngHSWs | Number of connected range hood switches |
| Nb_AQMntrs | Number of connected air quality monitors (Room sensors) |
| HERVState | The state of the HERV as recommended by each device |
| FanCloudState | The status, on the cloud, of the fan's ventilation device |

FIG. 72

| | |
| --- | --- |
| UpdateFan | Central algorithm to handle updating the fan state for a supply fan 8500 |
| RequestedSpeed | The speed to update the ventilation device's fan to |
| WhFanState | The recommended whole house ventilation device's state based on the whole house ventilation algorithm (if applicable) |
| NB_BthFSWs | Number of connected bath fan switches |
| Nb_RngHSWs | Number of connected range hood switches |
| Nb_AQMntrs | Number of connected air quality monitors (Room sensors) |
| SFanState | The state of the supply fan as recommended by each device |
| FanCloudState | The status, on the cloud, of the fan's ventilation device |

14) Exemplary Historical Measurements

Figure 75:
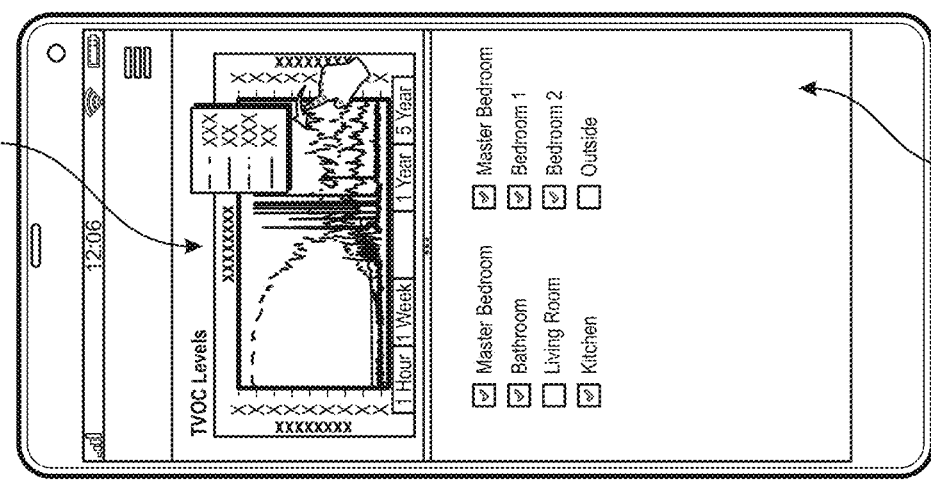
FIGS. 73-80 show screens, contained within the GUI, that display historical environmental measurements that were recorded by the IAQ system over a predefined amount of time.
Figure 74:
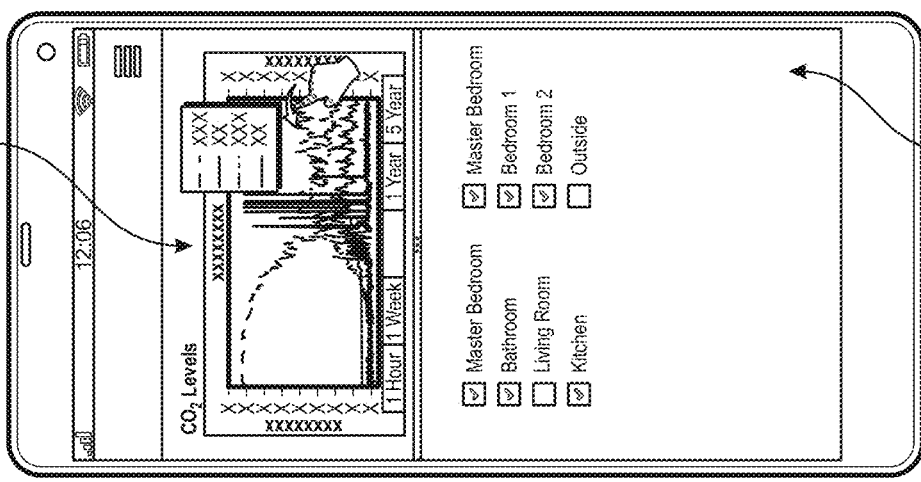
Figure 73:
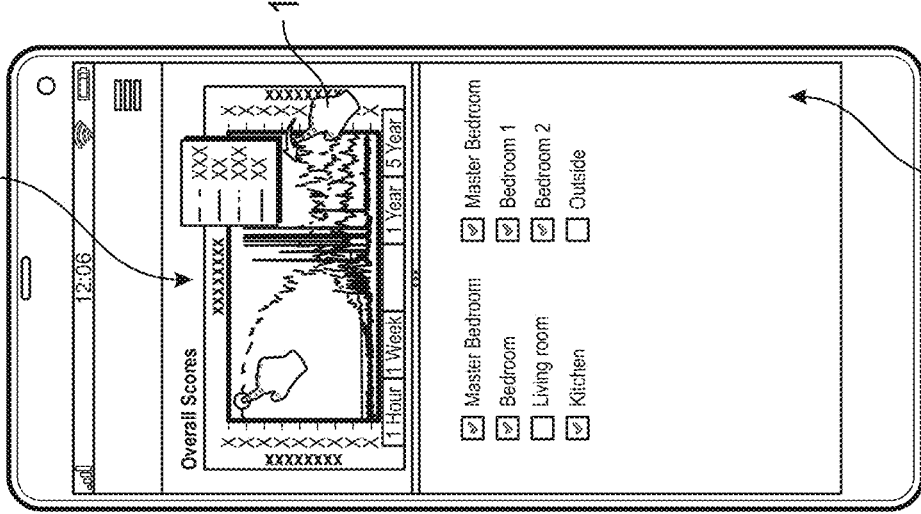
Figure 77:
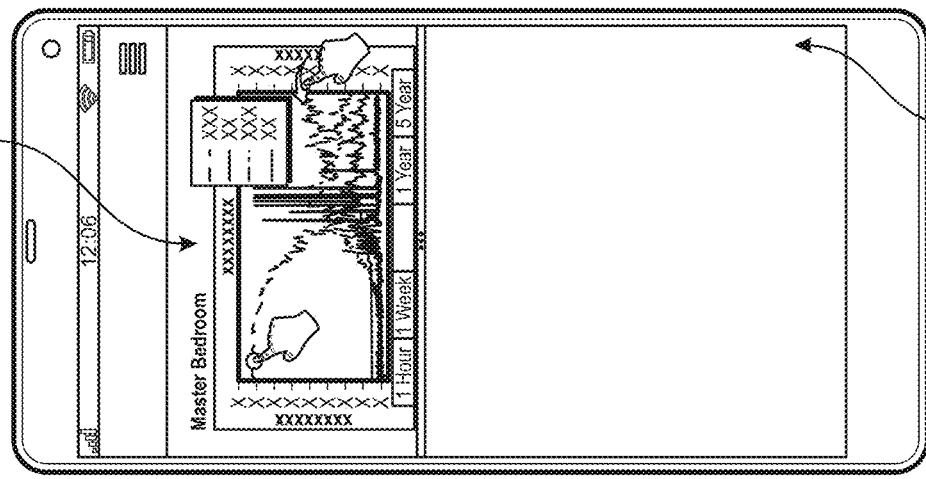
Figure 76:
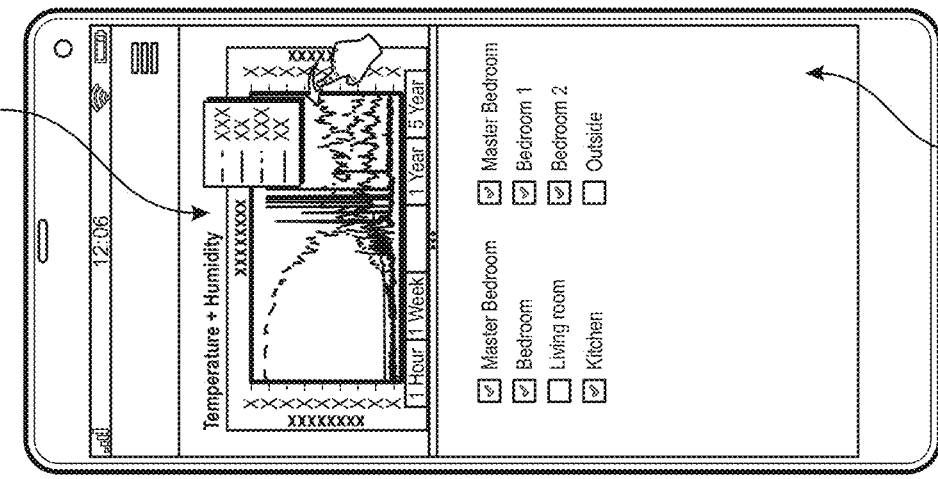
Figures 78, 79, 80:
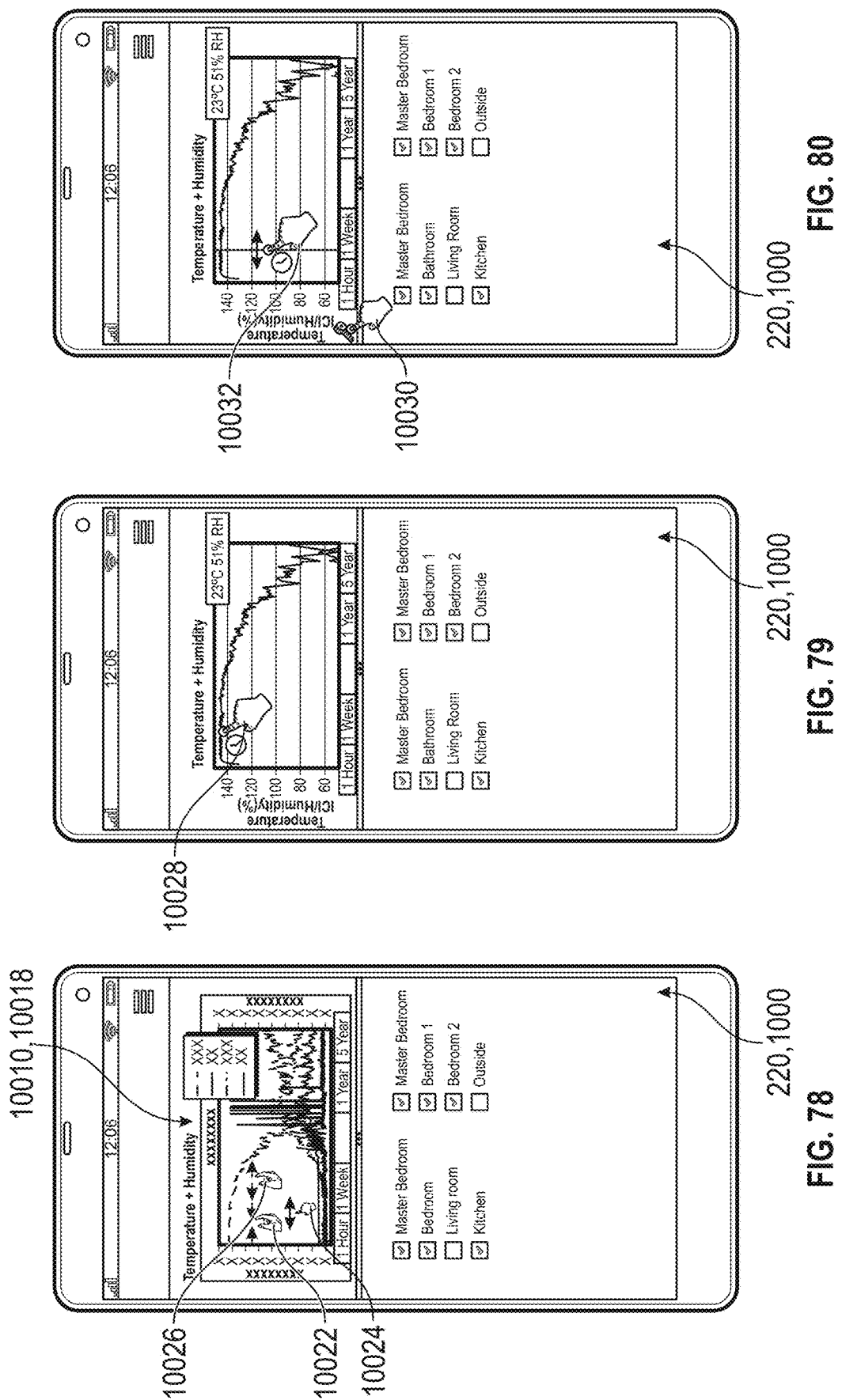
Figure 81:
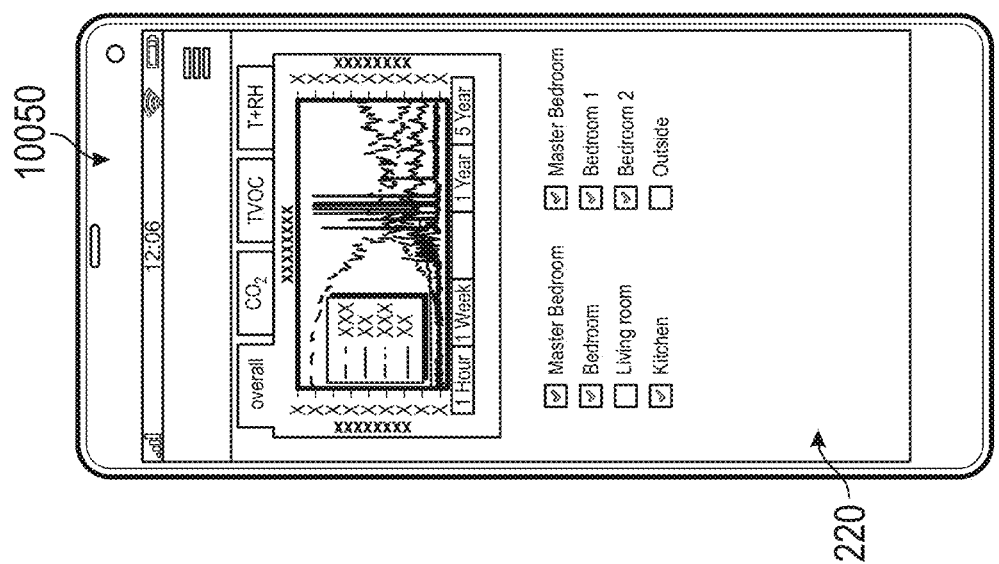
FIG. 81 shows a first alternative embodiment of a screen, contained within the GUI, that displays historical environmental measurements that were recorded by the IAQ system over a predefined amount of time.

FIGS. 73-80 show screens, contained within the GUI 1000, that display historical environmental measurements that were recorded by the IAQ system 10 over a predefined amount of time. Specifically, FIGS. 73-76 show swiping left 10000 or right on: (i) the display 220 of the central unit 104 or (ii) on a display contained within an Internet enabled device that is signed in to the system as an authorized user can show graphs 10010 that contain different information about the environmental measurements that were recorded by the IAQ system 10. Specifically, FIG. 73 shows an overall score 10012, FIG. 74 shows $CO_2$ levels 10014, FIG. 75 shows TVOC levels 10016, and FIG. 76 shows Temperature+Humidity levels 10018. FIG. 77 then shows how the authorized user can display the environmental measurements 10020 that were recorded by the IAQ system 10 for a single room (e.g., master bedroom) within the structure 100. Next, FIGS. 78-80 shows how a user can zoom in to a specific time period or can scroll through different time periods by using various guessers 10022, 10024, 10026, 10028, 10030, 10032. It should be understood that these historical environmental measurements that were recorded by the IAQ system 10 may be displayed to the user in different formats or may be emailed to the user after a predefined amount of time. For example, two different embodiments 10050, 10100 of how the environmental measurements that were recorded by the IAQ system 10 can be displayed to the user are shown in FIGS. 81 and 82.

It should be understood that this GUI 1000 provides a significant improvement in the efficiency of using the system 10 by bringing together and effectively visually presenting a limited list of high priority information without requiring the user to navigate through multiple screens in order to obtain this information. This in turn improves the efficiency of using the system 10 because it saves the user form navigating to a selected screen, manipulating the data associated with that screen, and then trying to interpret the resulting data. These factors tangibly improve the functionality of the system 10, particularly the user interface, and more particularly effectively displaying the user interface on a central device 104 that has a small screen (e.g., mobile phone).

15) Industrial Design

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Other implementations are also contemplated.

While some implementations have been illustrated and described, numerous modifications come to mind without significantly departing from the spirit of the disclosure; and the scope of protection is only limited by the scope of the accompanying claims. Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An indoor air quality ("IAQ") system for operating an exhaust fan in a structure having a first room and a second room adjacent to the first room, the IAQ system comprising:
a monitoring device for being located in the first room, the monitoring device includes: (i) an identity, (ii) a sensor and (iii) a connectivity module, wherein the sensor is configured to record environment data;
a server/database and a connectivity module configured to receive: (i) the monitoring device's identity and (ii) environmental data that has been recorded by the monitoring device;
a first exhaust fan for being located in the structure and a second exhaust fan for being located in the structure, each of the first and second exhaust fans selectively controlled by the server/database, wherein one of the first and second exhaust fans is located in one of the first and second rooms;
wherein the server/database is configured to (i) assign the monitoring device to whichever of the first and second exhaust fans is located in the first room, and (ii) if neither the first or second exhaust fan is in the first room, then assign the monitoring device to whichever of the first and second exhaust fans is located in the second room; and
wherein the server/database is configured to: (i) analyze the received environmental data from the monitoring device and (ii) selectively control, based on the received environmental data, whichever of the first and second exhaust fans is assigned to the monitoring device.

2. The IAQ system of claim 1, wherein the monitoring device is not electrically or directly connected to one of the first and second exhaust fans.

3. The IAQ system of claim 1, wherein the server/database turn ON the assigned one of the first and second exhaust fans when a level of an air component contained within the environmental data is over a predefined threshold value.

4. The IAQ system of claim 3, wherein the predefined threshold value is set by a regulatory body, government agency, private group or standard setting body.

5. The IAQ system of claim 4, wherein the predefined threshold value is set: (i) using the sensor to record environmental data over a predefined amount of time and (ii) adjusting the predefined threshold value in light of the recorded environmental data.

6. The IAQ system of claim 1, wherein the sensor measures levels of at least one of the following: CO, CO2, NO, NO2, NOX, PM2.5, ultrafine particles, radon, volatile organic compounds, ozone, dust particulates, lead particles, acrolein, biological pollutants, pesticides, or formaldehyde.

7. The IAQ system of claim 1, further comprising a plurality of monitoring devices, wherein each monitoring device within the plurality of monitoring devices is assigned to at least one of the first and second exhaust fans.

8. The IAQ system of claim 1, wherein controlling the assigned one of the first and second exhaust fans includes: (i) turning the assigned one of the first and second exhaust fans to a first setting if a level contained within the environmental data is over a first predetermined threshold, (ii) turning the assigned one of the first and second exhaust fans to a second setting if the level contained within the environmental data is over a second predetermine threshold, and (ii) turning the assigned one of the first and second exhaust fans to a third setting if the level contained within the environmental data is over a third predetermine threshold.

9. The IAQ system of claim 1, further includes an internet enabled device that is configured to display environmental data that has been collected over a predefined amount of time.

10. The IAQ system of claim 1, wherein the assigned one of the first and second exhaust fans is an exhaust ventilation device, a supply fan or an air exchanger.

11. The IAQ system of claim 1, wherein the assigned one of the first and second exhaust fans is one of the following: a range hood, a bathroom fan, or a supply fan.

12. The IAQ system of claim 1, wherein the server/database uses an indoor positioning system to determine whether one of the first and second exhaust fans is positioned in the first room.

13. The IAQ system of claim 1, wherein the server/database uses user input to determine whether one of the first and second exhaust fans is positioned in the first room.

14. A method for operating an exhaust fan within a structure, the method comprising:
providing a monitoring device for being located in a first room of the structure, the monitoring device includes: (i) an identity and (ii) a sensor that records environment data;
receiving, at a server/database: (i) the monitoring device's identity and (ii) environmental data that has been recorded by the monitoring device;
providing a first exhaust fan for being located in the structure and a second exhaust fan for being located in the structure, wherein at least one of the first and second exhaust fans is located in either the first room or a room adjacent to the first room, each of the first and second exhaust fans having a plurality of operation modes;
determining whether or not one of the first and second exhaust fans is in the first room, and
if one of the first and second exhaust fans is in the first room, then assigning to the monitoring device that one of the first and second exhaust fans,
but if neither of the first and second exhaust fans is in the first room, then assigning to the monitoring device whichever of the first and second exhaust fans is the room adjacent to the first room; and
using the server/database to control the operation mode of the one of the first and second exhaust fans assigned to the monitoring device, wherein the operation mode is selected based on a comparison of the environment data with predetermined threshold values.

15. The method of claim 14, wherein the selected operation mode is not directly determined by the monitoring device.

16. The method of claim 14, wherein the operation mode is set to ON, when a level contained within the environmental data is over a predefined threshold value.

17. The method of claim 16, wherein the predefined threshold value is set by a regulatory body, government agency, private group or standard setting body.

18. The method of claim 14, further comprising the following steps:
receiving a first set of environmental data that includes one level that is above a predefined threshold value;
selecting one of the first and second exhaust fans that can bring the level within the environmental data below the predefined threshold value;

sending a signal from the server/database to turn ON the selected one of the first and second exhaust fans;
receiving a second set of environmental data that includes one level that is below a predefined threshold value;
sending a signal from the server/database to turn OFF the selected one of the first and second exhaust fans.

19. The method of claim 18, wherein the step of selecting the one of the first and second exhaust fans that can bring the level of the level within the environmental data below the predefined threshold value includes selecting the one of the first and second exhaust fans that is assigned to the monitoring device.

20. The method of claim 14, further comprising the step of displaying the recorded environmental data on an internet enabled device.

21. The method of claim 14, wherein an indoor positioning system is used to determine whether one of the first and second exhaust fans is positioned in the first room.

22. The method of claim 14, wherein user input is used to determine whether one of the first and second exhaust fans is positioned in the first room.

23. A method for operating one of a plurality of exhaust ventilation devices within a structure having a first room and a second room adjacent to the first room arranged so that one of the plurality of exhaust ventilation devices is located in one of the first and second rooms, the method comprising:
monitoring levels of components of air within the structure using a monitoring device having at least one sensor in the first room of the structure;
determining that a level of an air component is above a predefined threshold range for that air component;
analyzing data from other sensors to determine if the other sensors measured the level for that air component is above a predefined threshold range;
determining whether one of a plurality of exhaust ventilation devices located in the structure is in the first room and
if one of the plurality of exhaust ventilation devices is in the first room, then assigning to the monitoring device that one of the plurality of exhaust ventilation devices,
but if none of the plurality of exhaust ventilation devices is in the first room, then assigning to the monitoring device any of the plurality of exhaust ventilation devices in the second room;
generating a plan designed to return the level of the air component within the predefined threshold range, wherein the plan comprises instructing the one of the plurality of exhaust ventilation devices assigned to the at least one monitoring device to turn ON;
informing a user of the generate plan; and
performing the generated plan.

24. The method of claim 23, wherein the step of performing the generated plan includes: (i) instructing the one of exhaust ventilation devices assigned to the at least one monitoring device to turn ON and (ii) instructing the one of exhaust ventilation devices assigned to the at least one monitoring device to turn OFF, when the level is within the predefined threshold range.

25. The method of claim 23, wherein an indoor positioning system is used to determine whether one one of the plurality of exhaust ventilation devices is positioned in the first room.

26. The method of claim 23, wherein user input is used to determine whether one one of the plurality of exhaust ventilation devices is positioned in the first room.

27. An indoor air quality ("IAQ") system for operating an exhaust ventilation device in a structure having a first room and a second room adjacent to the first room, the IAQ system comprising:
a monitoring device for being located in the first room, the monitoring device includes: (i) an identity, (ii) a sensor and (iii) a connectivity module, wherein the sensor is configured to record environment data;
a server/database and a connectivity module configured to receive: (i) the monitoring device's identity and (ii) environmental data that has been recorded by the monitoring device;
a plurality of exhaust ventilation devices that are selectively controlled by the server/database, wherein at least one of the plurality of exhaust ventilation devices is located in one of the first and second rooms; and
wherein the server/database is configured to: (i) analyze the received environmental data (ii) identify which one of the plurality of exhaust ventilation devices is located in the first room and assign that one of the plurality of exhaust ventilation devices to the monitoring device, and if none of the plurality of exhaust ventilation devices located in the first room, then assign the monitoring device to whichever of the plurality of exhaust ventilation devices located in the second room and (iii) selectively control the one of the plurality of exhaust ventilation devices assigned to the monitoring device based on the received environmental data.

28. The IAQ system of claim 27, wherein the exhaust ventilation device assigned to the monitoring device is a range hood.

29. The IAQ system of claim 27, wherein an indoor positioning system is used to determine whether one of the plurality of exhaust ventilation devices is positioned in the first room.

30. The IAQ system of claim 27, wherein user input is used to determine whether one of the plurality of exhaust ventilation devices is positioned in the first room.

* * * * *